United States Patent
Yang et al.

(10) Patent No.: US 9,577,536 B2
(45) Date of Patent: Feb. 21, 2017

(54) SYSTEM AND METHOD PROVIDING RELIABLE OVER CURRENT PROTECTION FOR POWER CONVERTER

(71) Applicant: ON-BRIGHT ELECTRONICS (SHANGHAI) CO., LTD., Shanghai (CN)

(72) Inventors: Dongze Yang, Shanghai (CN); Xiaomin Huang, Shanghai (CN); Xiaozhi Kang, Shanghai (CN); Yuan Lin, Shanghai (CN); Huawei Lyu, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 14/639,607

(22) Filed: Mar. 5, 2015

(65) Prior Publication Data

US 2016/0226239 A1    Aug. 4, 2016

(30) Foreign Application Priority Data

Feb. 2, 2015    (CN) .......................... 2015 1 0053255

(51) Int. Cl.
H02M 3/335    (2006.01)
H02M 1/32    (2007.01)
(Continued)

(52) U.S. Cl.
CPC .......... *H02M 3/33507* (2013.01); *H02H 7/12* (2013.01); *H02M 1/32* (2013.01); *H02M 3/33523* (2013.01); *H02H 9/025* (2013.01)

(58) Field of Classification Search
CPC .. H02M 3/335; H02M 3/156; H02M 3/33523; Y02B 70/1433
(Continued)

(56) References Cited

U.S. PATENT DOCUMENTS 3,913,002 A    10/1975    Steigerwald et al.
4,356,542 A    10/1982    Bruckner et al.
(Continued)

FOREIGN PATENT DOCUMENTS

CN    2552047 Y    5/2003
CN    1430314 A    7/2003
(Continued)

OTHER PUBLICATIONS

Chinese Patent Office, Office Action mailed Aug. 1, 2014, in Application No. 201310015152.4.
(Continued)

*Primary Examiner* — Rajnikant Patel
(74) *Attorney, Agent, or Firm* — Jones Day

(57) ABSTRACT

System controller and method for protecting a power converter. The system controller includes a first controller terminal configured to output a drive signal to a switch to affect a first current flowing through a primary winding of a power converter. The power converter further includes a secondary winding coupled to the primary winding, and the drive signal is associated with one or more switching periods. Additionally, the system controller includes a second controller terminal configured to receive a sensing voltage from a sensing resistor. The sensing voltage represents a magnitude of the first current flowing through the primary winding of the power converter. The system controller is configured to process information associated with the sensing voltage and a reference voltage, and determine whether an average output current of the power converter is larger than a current threshold.

38 Claims, 20 Drawing Sheets

(51) Int. Cl.
*H02H 7/12* (2006.01)
*H02H 9/02* (2006.01)

(58) Field of Classification Search
USPC ........ 363/21.05, 21.08, 21.12, 21.16, 21.18;
361/18, 93, 103.115
See application file for complete search history.

(56) References Cited

U.S. PATENT DOCUMENTS

| | | | |
|---|---|---|---|
| 4,952,853 A * | 8/1990 | Archer | G01R 15/185 318/284 |
| 4,975,820 A | 12/1990 | Szepesi | |
| 5,416,689 A | 5/1995 | Silverstein et al. | |
| 5,550,702 A | 8/1996 | Schmidt et al. | |
| 5,578,908 A * | 11/1996 | Persson | H05B 41/3924 315/194 |
| 5,796,595 A | 8/1998 | Cross | |
| 5,867,379 A | 2/1999 | Maksimovic et al. | |
| 5,917,714 A * | 6/1999 | Ogawa | H02M 3/33523 348/E5.127 |
| 6,084,783 A | 7/2000 | Rascon Martinez et al. | |
| 6,292,376 B1 | 9/2001 | Kato | |
| 6,469,917 B1 | 10/2002 | Ben-Yaakov | |
| 6,515,876 B2 | 2/2003 | Koike et al. | |
| 6,611,439 B1 | 8/2003 | Yang et al. | |
| 6,714,425 B2 | 3/2004 | Yamada et al. | |
| 6,839,247 B1 | 1/2005 | Yang et al. | |
| 6,842,350 B2 | 1/2005 | Yamada et al. | |
| 6,903,536 B2 | 6/2005 | Yang | |
| 6,914,789 B2 * | 7/2005 | Kinoshita | H02M 3/33507 363/21.12 |
| 6,947,298 B2 | 9/2005 | Uchida | |
| 6,954,367 B2 | 10/2005 | Yang et al. | |
| 7,027,313 B2 * | 4/2006 | Amei | H02M 3/33507 363/21.01 |
| 7,061,225 B2 | 6/2006 | Yang et al. | |
| 7,099,164 B2 | 8/2006 | Zhu et al. | |
| 7,149,098 B1 | 12/2006 | Chen | |
| 7,362,592 B2 | 4/2008 | Yang et al. | |
| 7,362,593 B2 | 4/2008 | Yang et al. | |
| 7,391,630 B2 | 6/2008 | Acatrinei | |
| 7,394,634 B2 | 7/2008 | Fang et al. | |
| 7,522,431 B2 | 4/2009 | Huynh et al. | |
| 7,679,938 B2 | 3/2010 | Ye et al. | |
| 7,684,220 B2 | 3/2010 | Fang et al. | |
| 7,738,227 B2 | 6/2010 | Fang et al. | |
| 7,746,615 B2 | 6/2010 | Zhu et al. | |
| 7,759,891 B2 | 7/2010 | Serizawa et al. | |
| 7,778,049 B2 | 8/2010 | Morota | |
| 7,791,903 B2 * | 9/2010 | Zhang | H02M 3/33592 363/127 |
| 8,004,112 B2 * | 8/2011 | Koga | H04B 3/54 307/1 |
| 8,018,745 B2 | 9/2011 | Fang et al. | |
| 8,098,502 B2 * | 1/2012 | Mao | H02M 1/44 363/21.03 |
| 8,102,676 B2 | 1/2012 | Huynh et al. | |
| 8,416,596 B2 * | 4/2013 | Huang | H02M 3/33507 363/21.11 |
| 8,482,946 B2 | 7/2013 | Fang et al. | |
| 8,488,342 B2 | 7/2013 | Zhang et al. | |
| 8,559,152 B2 | 10/2013 | Cao et al. | |
| 8,680,884 B2 | 3/2014 | Chobot | |
| 8,824,173 B2 | 9/2014 | Fang et al. | |
| 8,917,527 B2 | 12/2014 | Fang et al. | |
| 9,088,218 B2 | 7/2015 | Zhang et al. | |
| 9,401,648 B2 | 7/2016 | Li | |
| 2002/0131279 A1 | 9/2002 | Tang | |
| 2003/0099119 A1 | 5/2003 | Yamada et al. | |
| 2003/0156433 A1 | 8/2003 | Gong et al. | |
| 2003/0174520 A1 | 9/2003 | Bimbaud | |
| 2004/0201369 A1 | 10/2004 | Perrier et al. | |
| 2004/0218405 A1 | 11/2004 | Yamada et al. | |
| 2005/0036342 A1 | 2/2005 | Uchida | |
| 2005/0099164 A1 | 5/2005 | Yang | |
| 2006/0055433 A1 | 3/2006 | Yang et al. | |
| 2006/0291258 A1 | 12/2006 | Zhu et al. | |
| 2008/0157742 A1 | 7/2008 | Martin et al. | |
| 2008/0198638 A1 | 8/2008 | Reinberger et al. | |
| 2008/0257397 A1 | 10/2008 | Glaser et al. | |
| 2008/0298099 A1 | 12/2008 | Huang et al. | |
| 2008/0309380 A1 | 12/2008 | Yang et al. | |
| 2008/0316781 A1 | 12/2008 | Liu | |
| 2009/0021233 A1 | 1/2009 | Hsu | |
| 2009/0219070 A1 | 9/2009 | Zhang et al. | |
| 2010/0253250 A1 | 10/2010 | Marvelly et al. | |
| 2011/0058287 A1 | 3/2011 | Conseil | |
| 2011/0095733 A1 | 4/2011 | Park et al. | |
| 2011/0101953 A1 | 5/2011 | Cheng et al. | |
| 2011/0110126 A1 | 5/2011 | Morrish | |
| 2012/0008352 A1 | 1/2012 | Huang et al. | |
| 2012/0013367 A1 | 1/2012 | Chen et al. | |
| 2012/0043954 A1 | 2/2012 | Lin et al. | |
| 2012/0075891 A1 | 3/2012 | Zhang et al. | |
| 2012/0147630 A1 | 6/2012 | Cao et al. | |
| 2012/0194227 A1 | 8/2012 | Lin et al. | |
| 2012/0206117 A1 | 8/2012 | Yang et al. | |
| 2012/0224397 A1 | 9/2012 | Yeh | |
| 2012/0281438 A1 | 11/2012 | Fang et al. | |
| 2013/0003421 A1 | 1/2013 | Fang | |
| 2013/0083562 A1 | 4/2013 | Wu et al. | |
| 2013/0100715 A1 | 4/2013 | Lin et al. | |
| 2013/0121044 A1 | 5/2013 | Gao et al. | |
| 2013/0135775 A1 | 5/2013 | Yao et al. | |
| 2013/0258723 A1 | 10/2013 | Fang et al. | |
| 2013/0294121 A1 | 11/2013 | Fang et al. | |
| 2013/0301302 A1 | 11/2013 | Wu et al. | |
| 2013/0336029 A1 | 12/2013 | Cao et al. | |
| 2014/0016366 A1 | 1/2014 | Su et al. | |
| 2014/0016378 A1 | 1/2014 | Ke et al. | |
| 2014/0029315 A1 | 1/2014 | Zhang et al. | |
| 2015/0023069 A1 | 1/2015 | Zhu et al. | |
| 2015/0085540 A1 | 3/2015 | Huang et al. | |
| 2015/0180328 A1 | 6/2015 | Yao et al. | |
| 2015/0303787 A1 | 10/2015 | Zhai et al. | |
| 2015/0303898 A1 | 10/2015 | Zhai et al. | |
| 2015/0340952 A1 | 11/2015 | Manohar et al. | |
| 2015/0340957 A1 | 11/2015 | Fang et al. | |
| 2015/0357912 A1 | 12/2015 | Perreault et al. | |

FOREIGN PATENT DOCUMENTS

| | | |
|---|---|---|
| CN | 2567850 Y | 8/2003 |
| CN | 1448005 A | 10/2003 |
| CN | 1459903 A | 12/2003 |
| CN | 1497827 A | 5/2004 |
| CN | 1815838 A | 8/2006 |
| CN | 1917322 A | 2/2007 |
| CN | 101282078 A | 10/2008 |
| CN | 101295872 A | 10/2008 |
| CN | 101340149 A | 1/2009 |
| CN | 101499713 A | 8/2009 |
| CN | 101552570 | 10/2009 |
| CN | 100559678 C | 11/2009 |
| CN | 101662223 A | 3/2010 |
| CN | 101295872 B | 4/2010 |
| CN | 201477463 U | 5/2010 |
| CN | 101800417 A | 8/2010 |
| CN | 101924536 A | 12/2010 |
| CN | 101964647 A | 2/2011 |
| CN | 101997412 A | 3/2011 |
| CN | 202009514 U | 10/2011 |
| CN | 102364990 A | 2/2012 |
| CN | 102412727 A | 4/2012 |
| CN | 102487246 A | 6/2012 |
| CN | 102545567 A | 7/2012 |
| CN | 102624237 A | 8/2012 |
| CN | 102638169 A | 8/2012 |
| CN | 102651613 A | 8/2012 |
| CN | 102761255 A | 10/2012 |
| CN | 102790531 A | 11/2012 |
| CN | 102801300 A | 11/2012 |
| CN | 103078489 | 5/2013 |

(56) References Cited

FOREIGN PATENT DOCUMENTS

| | | |
|---|---|---|
| CN | 103166198 | 6/2013 |
| CN | 103167665 A | 6/2013 |
| CN | 103401424 A | 11/2013 |
| CN | 103781256 | 5/2014 |
| CN | 103781257 | 5/2014 |
| CN | 203747681 | 7/2014 |
| CN | 104853493 A | 8/2015 |
| CN | 104967328 A | 10/2015 |
| EP | 0871328 B1 | 8/2003 |
| EP | 1317052 B1 | 10/2006 |
| JP | 2003-333839 A | 11/2003 |
| JP | 2006-237519 A | 9/2006 |
| JP | 2006-237619 A | 9/2006 |
| JP | 4064296 | 3/2008 |
| JP | 2009-36750 A | 2/2009 |
| TW | 200411364 | 7/2004 |
| TW | I 225588 | 12/2004 |
| TW | 200713733 | 4/2007 |
| TW | I 310256 | 5/2009 |
| TW | 200929824 | 7/2009 |
| TW | M400069 | 3/2011 |
| TW | 201117670 | 5/2011 |
| TW | 201218860 | 5/2012 |
| TW | 201225495 | 6/2012 |
| TW | 201241591 | 10/2012 |
| TW | 201325304 | 6/2013 |
| TW | I403875 | 8/2013 |
| TW | I434500 | 4/2014 |
| TW | 201429132 | 7/2014 |
| TW | I458232 | 10/2014 |
| TW | 201541845 | 11/2015 |
| WO | WO 2012/147453 | 11/2012 |

OTHER PUBLICATIONS

Chinese Patent Office, Office Action mailed Jan. 17, 2014, in Application No. 201310306106.X.
Chinese Patent Office, Office Action mailed Jan. 3, 2014, in Application No. 201010587658.9.
Taiwan Intellectual Property Office, Office Action mailed Mar. 13, 2014, in Application No. 100101960.
United Stated Patent and Trademark, Office Action mailed Mar. 9, 2015, in U.S. Appl. No. 13/967,276.
Taiwan Intellectual Property Office, Office Action mailed May 5, 2015, in Application No. 102131370.
United Stated Patent and Trademark, Office Action mailed May 14, 2015, in U.S. Appl. No. 13/900,430.
United Stated Patent and Trademark, Office Action mailed Jun. 17, 2015, in U.S. Appl. No. 13/749,516.
Chinese Patent Office, Office Action mailed Sep. 2, 2015, in Application No. 201310450298.1.
United States Patent and Trademark Office, Office Action mailed Aug. 31, 2015, in U.S. Appl. No. 14/075,303.
Chinese Patent Office, Office Action mailed Nov. 26, 2015, in Application No. 201410134395.4.
Chinese Patent Office, Office Action mailed Dec. 4, 2015, in Application No. 201410198140.4.
United Stated Patent and Trademark, Notice of Allowance mailed Nov. 13, 2015, in U.S. Appl. No. 13/749,516.
United Stated Patent and Trademark, Notice of Allowance mailed Nov. 6, 2015, in U.S. Appl. No. 13/900,430.
United Stated Patent and Trademark, Notice of Allowance mailed Jan. 20, 2016, in U.S. Appl. No. 14/334,553.
United Stated Patent and Trademark, Office Action mailed Oct. 13, 2015, in U.S. Appl. No. 13/967,276.
United Stated Patent and Trademark, Office Action mailed Oct. 30, 2015, in U.S. Appl. No. 13/969,281.
United Stated Patent and Trademark, Office Action mailed Jan. 5, 2016, in U.S. Appl. No. 14/272,323.
Chinese Patent Office, Office Action mailed Jan. 25, 2016, in Application No. 201410157557.6.
Taiwan Patent Office, Office Action mailed Mar. 8, 2015, in Application No. 102140501.
United Stated Patent and Trademark, Notice of Allowance mailed Mar. 16, 2016, in U.S. Appl. No. 13/749,516.
United Stated Patent and Trademark, Notice of Allowance mailed Mar. 21, 2016, in U.S. Appl. No. 13/900,430.
United Stated Patent and Trademark, Notice of Allowance mailed Feb. 23, 2016, in U.S. Appl. No. 14/334,553.
Chinese Patent Office, Office Action mailed May 12, 2016, in Application No. 201310450298.1.
United States Patent and Trademark Office, Notice of Allowance mailed Mar. 15, 2016, in U.S. Appl. No. 14/075,303.
Chinese Patent Office, Office Action mailed Aug. 17, 2016, in Application No. 201510053255.9.
United States Patent and Trademark Office, Supplemental Notice of Allowability mailed Jun. 16, 2016, in U.S. Appl. No. 14/075,303.
Taiwan Intellectual Property Office, Office Action mailed May 18, 2016, in Application No. 103121063.
Taiwan Intellectual Property Office, Office Action mailed May 24, 2016, in Application No. 104110694.
Taiwan Intellectual Property Office, Office Action mailed May 23, 2016, in Application No. 104132444.
Taiwan Intellectual Property Office, Approval Report mailed May 26, 2016, in Application No. 104125785.
Taiwan Intellectual Property Office, Office Action mailed Jul. 29, 2016, in Application No. 105106390.
United Stated Patent and Trademark, Notice of Allowance mailed Jun. 24, 2016, in U.S. Appl. No. 13/749,516.
United Stated Patent and Trademark, Notice of Allowance mailed Jul. 11, 2016, in U.S. Appl. No. 13/900,430.
United Stated Patent and Trademark, Notice of Allowance mailed Jul. 14, 2016, in U.S. Appl. No. 14/272,323.
United Stated Patent and Trademark, Notice of Allowance mailed May 26, 2016, in U.S. Appl. No. 14/334,553.
United Stated Patent and Trademark, Notice of Allowance mailed May 27, 2016, in U.S. Appl. No. 13/967,276.
United Stated Patent and Trademark, Office Action mailed May 24, 2016, in U.S. Appl. No. 13/969,281.
United Stated Patent and Trademark, Office Action mailed Jul. 12, 2016, in U.S. Appl. No. 14/753,079.
Chinese Patent Office, Office Action mailed Nov. 2, 2016, in Application No. 201510249026.4.
United States Patent and Trademark, Notice of Allowance mailed Sep. 14, 2016, in U.S. Appl. No. 13/749,516.
United States Patent and Trademark, Notice of Allowance mailed Sep. 28, 2016, in U.S. Appl. No. 13/900,430.
United States Patent and Trademark, Notice of Allowance mailed Sep. 12, 2016, in U.S. Appl. No. 14/272,323.
United States Patent and Trademark, Notice of Allowance mailed Sep. 9, 2016, in U.S. Appl. No. 14/334,553.
United States Patent and Trademark, Notice of Allowance mailed Sep. 26, 2016, in U.S. Appl. No. 13/967,276.
United States Patent and Trademark, Notice of Allowance mailed Oct. 12, 2016, in U.S. Appl. No. 14/817,081.
United States Patent and Trademark, Notice of Allowance mailed Nov. 22, 2016, in U.S. Appl. No. 13/969,281.

* cited by examiner

SYSTEM AND METHOD PROVIDING RELIABLE OVER CURRENT PROTECTION FOR POWER CONVERTER

1. CROSS-REFERENCES TO RELATED APPLICATIONS

This application claims priority to Chinese Patent Application No. 201510053255.9, filed Feb. 2, 2015, incorporated by reference herein for all purposes.

Additionally, U.S. patent application Ser. Nos. 13/749,516 and 14/075,303 are incorporated by reference herein for all purposes.

2. BACKGROUND OF THE INVENTION

Certain embodiments of the present invention are directed to integrated circuits. More particularly, some embodiments of the invention provide control systems and methods for reliable over-current protection. Merely by way of example, some embodiments of the invention have been applied to power converters. But it would be recognized that the invention has a much broader range of applicability.

Power converters are widely used for consumer electronics such as portable devices. The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level.

The power converters include linear converters and switch-mode converters. The switch-mode converters often use pulse-width-modulated (PWM) or pulse-frequency-modulated mechanisms. These mechanisms are usually implemented with a switch-mode controller including various protection components. These components can provide over-voltage protection, over-temperature protection, over-current protection (OCP), and over-power protection (OPP). These protections can often prevent the power converters and connected circuitries from suffering permanent damage.

For example, a power converter includes a switch and transformer winding that is in series with the switch. The current flowing through the switch and transformer winding may be limited by an OCP system. If the OCP system is not effective, the current can reach a level at which damage to the switch is imminent due to excessive current and voltage stress at switching or thermal run-away during operation. For example, this current level can be reached when the output short circuit or over loading occurs. Consequently, the rectifier components on the transformer secondary side are subject to permanent damage due to excessive voltage and current stress in many offline flyback converters. Hence an effective OCP system is important for a reliable switch-mode converter.

FIG. 1 is a simplified conventional switch-mode converter with over-current protection. A switch-mode converter 100 includes an OCP comparator 110, a PWM controller component 120, a gate driver 130, a switch 140, resistors 150, 152, 154, and 156, and a primary winding 160. The OCP comparator 110, the PWM controller component 120, and the gate driver 130 are parts of a chip 180 for PWM control.

For example, the PWM controller component 120 generates a PWM signal 122, which is received by the gate driver 130. In yet another example, the OCP comparator 110 receives and compares an over-current threshold signal 112 (e.g., $V_{th\_oc}$) and a current sensing signal 114 (e.g., $V_{CS}$), and sends an over-current control signal 116 to the PWM controller component 120. When the current of the primary winding is greater than a limiting level, the PWM controller component 120 turns off the switch 140 and shuts down the switch-mode power converter 100.

For switch-mode converter, a cycle-by-cycle or pulse-by-pulse control mechanism is often used for OCP. For example, the cycle-by-cycle control scheme limits the maximum current and thus the maximum power delivered by the switch-mode converter. This limitation on maximum power can protect the power converter from thermal run-away. Some conventional OCP systems use an adjustable OCP threshold value based on line input voltage, but the actual limitation on maximum current and thus maximum power is not always constant over a wide range of line input voltage. Other conventional OCP systems use additional resistors 152 and 154 that are external to the chip 180 and inserted between $V_{in}$ and the resistor 150 as shown in FIG. 1. But the resistor 152 consumes significant power, which often is undesirable for meeting stringent requirements on low standby power. For example, the resistor 152 of 2 MΩ can dissipate about 70 mW with input AC voltage of 264 volts.

As shown in FIG. 1, the current limit is expressed as follows:

$$I_{Limit} = \frac{V_{in}}{L_p} \times t_{on} = \frac{V_{th\_oc}}{R_s} \quad \text{(Equation 1)}$$

where $I_{Limit}$ represents the current limit. For example, the current limit is the current threshold for triggering over-current protection. Additionally, $V_{in}$ is a bulk voltage (e.g., associated with the line input voltage VAC) at node 190, and $V_{th\_oc}$ is the voltage level at an input terminal 112 of the OCP comparator 110. $R_s$ is the resistance of the resistor 150, and $L_p$ is the inductance of the primary winding 160. Moreover, $t_{on}$ represents on time of the switch 140 for each cycle. Accordingly, the maximum energy $\epsilon$ stored in the primary winding 160 is $$\epsilon = 1/2 \times L_p \times I_{Limit}^2 \times PT \quad \text{(Equation 2)}$$

where T represents the clock period, and P represents the maximum power. So the maximum power P can be expressed as follows:

$$P = \frac{L_p \times I_{Limit}^2}{2T} = \frac{V_{in}^2 \times t_{on}^2}{2 \times L_p \times T} \quad \text{(Equation 3)}$$

Therefore the power can be limited by controlling the current limit $I_{Limit}$. But Equation 3 does not take into account the "delay to output" that includes the propagation delay through a current sense path to the switch 140. For example, the propagation delay includes propagation delays through the OCP comparator 110, the PWM controller component 120, the gate driver 130, and the response delay of turning off of the switch 140. During the "delay to output," the switch 140 remains on, and the input current through the switch 140 keeps ramping up despite the current has already reached the threshold level of the OCP comparator 110. The extra current ramping amplitude, Δl, due to the "delay to output" is proportional to the bulk voltage $V_{in}$ as follows:

$$\Delta I = \frac{V_{in}}{L_p} \times T_{delay} \quad \text{(Equation 4)}$$

where $T_{delay}$ represents the "delay to output."

FIG. 2 is a simplified diagram showing conventional relationship between extra current ramping amplitude and bulk voltage. As shown in FIG. 2, the actual maximum current $I_{PEAK1}$ that corresponds to higher $V_{in}$ is larger than the actual maximum current $I_{PEAK2}$ that corresponds to lower $V_{in}$. Accordingly, the actual maximum power is not constant over a wide range of bulk voltage. Hence the actual maximum power is expressed as follows:

$$P = \frac{L_P \times (I_{Limit} \times \Delta I)^2}{2T} = \frac{V_{in}^2 \times (t_{on} + T_{delay})^2}{2 \times L_p \times T} \quad \text{(Equation 5)}$$

For example, $T_{delay}$ depends on internal delays, gate charges, and circuitry related to the gate driver 130. In another example, for the predetermined switch-mode converter 100, $T_{delay}$ is constant, and hence the actual maximum power depends on the bulk voltage. To compensate for variations of the actual maximum power, the threshold for over-current protection should be adjusted based on the bulk voltage.

FIG. 3 is a simplified diagram showing conventional relationship between current threshold and bulk voltage. The bulk voltage $V_{in2}$ is lower than the bulk voltage $V_{in1}$, and the current threshold $I_{th\_oc\_vin2}$ for $V_{in2}$ is larger than $I_{th\_oc\_vin1}$ for $V_{in1}$ as shown in FIG. 3. The current threshold decreases with increasing bulk voltage $V_{in}$. At the current threshold, the over-current protection is triggered. The resulting maximum current $I_{PEAK1}$ for higher $V_{in}$ is the same as the resulting maximum current $I_{PEAK2}$ for lower $V_{in}$.

For example, the current threshold has the following relationship with the bulk voltage:

$$I_{th\_oc} \approx I_{th\_oc}(V_{in1}) - \frac{V_{in} - V_{in1}}{L_p} T_{delay} \quad \text{(Equation 6)}$$

where $I_{th\_oc}$ is the current threshold, $V_{in}$ is the bulk voltage, $L_p$ is the inductance of the primary winding, and $T_{delay}$ is the "delay to output." Additionally, $I_{th\_oc}(V_{in1})$ is the current threshold that is predetermined for the bulk voltage $V_{in1}$. For example, $V_{in1}$ is the minimum bulk voltage. In another example, the current is sensed that flows through the switch and the primary winding. If the sensed current reaches $I_{th\_oc}$, the PWM controller component sends a signal to turn off the switch. After "delay to output," the switch is turned off.

In Equation 6, the second term $$\frac{V_{in} - V_{in1}}{L_p} T_{delay}$$

represents a threshold offset to compensate for the effects of "delay to output." FIG. 4 is a simplified diagram showing conventional relationship between threshold offset and bulk voltage. As shown in FIG. 4, the term $$\frac{T_{delay}}{L_p}$$

is the slope that depends on the "delay to output" and the inductance of primary winding. As shown in FIG. 4, the current threshold decreases with increasing bulk voltage.

There are at least two conventional approaches to implement the current threshold as a function of bulk voltage according to FIG. 4. In one example, the bulk voltage is sensed to generate an offset DC voltage proportional to bulk voltage in order to compensate for the effects of "delay to output" as shown in Equation 6.

In another example, the bulk voltage is sensed based on the maximum width of the PWM signal. The PWM signal is applied to the gate of a switch in series to the primary winding of a power converter. FIG. 5 is a simplified diagram showing conventional relationship between PWM signal maximum width and bulk voltage. As shown in FIG. 5, the maximum current is constant with respect to bulk voltage, and the maximum width of PWM signal varies with bulk voltage. The maximum current $I_{PEAK1}$ equals the maximum current $I_{PEAK2}$. The maximum current $I_{PEAK1}$ corresponds to a higher bulk voltage and a PWM signal 510, and the maximum current $I_{PEAK2}$ corresponds to a lower bulk voltage and a PWM signal 520. As shown in FIG. 5, the maximum width for the PWM signal 510 is narrower for higher bulk voltage, and the maximum width for the PWM signal 520 is wider for lower bulk voltage. The bulk voltage is represented by the maximum width of the PWM signal if the maximum current is constant with respect to bulk voltage. Accordingly, the maximum width of the PWM signal can be used to determine the threshold offset to compensate for the effects of "delay to output" as shown in Equation 6.

According to FIG. 5, the compensation can be realized by generating a current threshold, $I_{th\_oc}$, which is a function of the maximum width of the PWM signal. For example, the current threshold is equal to $I_{th\_oc\_1}$ for the PWM signal 510 and $I_{th\_oc\_2}$ for the PWM signal 520. In another example, the slope of $I_{th\_oc}$ with respect to the maximum width is properly chosen to compensate for the effects of "delay to output" as shown in Equation 6. The selected slope takes into account information about power converter components that are external to the chip for PWM control. The external components may include the primary winding, a current sensing resistor and a power MOSFET.

Additionally, to achieve high efficiency, a power converter usually works in CCM mode at low bulk voltage and works in DCM mode at high bulk voltage. FIG. 6 shows simplified conventional current profiles for primary winding in CCM mode and DCM mode. The current profiles describe current magnitudes as functions of time. As shown in FIG. 6(a), the current for primary winding increases from I_L to a current limit I_p1 within a pulse width at each cycle in DCM mode. For example, I_L is equal to zero. The energy delivered to the load at each cycle is $$\epsilon = 1/2 \times L_p \times (I\_p1)^2 \quad \text{(Equation 7)}$$

In contrast, as shown in FIG. 6(b), the current for primary winding increases from I_i2 to a current limit I_p2 within a pulse width at each cycle in CCM mode. For example, I_i2 is larger than zero. The energy delivered to the load at each cycle is $$\epsilon = 1/2 \times L_p \times [(I\_p2)^2 - (I\_i2)^2] \quad \text{(Equation 8)}$$

where the ratio of $$\frac{I\_i2}{I\_p2}$$

can vary with bulk voltage. For example, the ratio increases with decreasing bulk voltage. As described in Equations 7 and 8, if the two current limits I_p1 and I_p2 are equal, the amount of energy delivered to the load in DCM mode is higher than the amount of energy delivered to the load in CCM mode at each cycle.

FIG. 7 shows a simplified diagram for maximum energy delivered to load at each cycle as a conventional function of bulk voltage. As a function of bulk voltage, the current limit, which equals either I_p1 or I_p2, is adjusted to compensate for "delay to output" as shown in FIG. 4, but differences between Equations 7 and 8 have not been taken into account. Also, FIG. 7 does not appear to have taken into account the varying ratio of $$\frac{I\_i2}{I\_p2}.$$

Henence the maximum energy is not constant over the entire range of bulk voltage. For example, as shown by a curve 1300, the maximum energy decreases significantly with decreasing bulk voltage in CCM mode, even though the maximum energy appears substantially constant in the DCM mode.

FIGS. 8 and 9 are simplified conventional timing diagrams for a switch-mode converter in the DCM mode and in the CCM mode respectively. In FIG. 8, curves 810, 820, 830, and 840 represent the timing diagrams in the DCM mode for a secondary current (e.g., $i_s$) that flows through a secondary winding, a primary current (e.g., $i_p$) that flows through a primary winding, a drive signal (e.g., Gate) that is used to drive a switch, and a demagnetization signal (e.g., Demag) respectively. In FIG. 9, curves 910, 920, 930, and 940 represent the timing diagrams in the CCM mode for the secondary current (e.g., $i_s$) that flows through the secondary winding, the primary current (e.g., $i_p$) that flows through the primary winding, the drive signal (e.g., Gate) that is used to drive the switch, and the demagnetization signal (e.g., Demag) respectively. The secondary current (e.g., $i_s$) is equal to an output current of the switch-mode converter according to some embodiments.

In order to improve consistency of maximum energy in the CCM mode and the DCM mode, the compensation slope for the current threshold or the corresponding voltage threshold can be made different in different modes. Specifically, as shown in Equations 7 and 8, the compensation slope in the CCM mode is greater than the compensation slope in the DCM mode in magnitude. But the maximum energy of the power converter can also be affected by other characteristics of the system, such as inductance of the primary winding.

Hence it is highly desirable to improve techniques for over-current protection and over-power protection.

3. BRIEF SUMMARY OF THE INVENTION

Certain embodiments of the present invention are directed to integrated circuits. More particularly, some embodiments of the invention provide control systems and methods for reliable over-current protection. Merely by way of example, some embodiments of the invention have been applied to power converters. But it would be recognized that the invention has a much broader range of applicability.

According to one embodiment, a system controller for protecting a power converter includes a first controller terminal configured to output a drive signal to a switch to affect a first current flowing through a primary winding of a power converter. The power converter further includes a secondary winding coupled to the primary winding, and the drive signal is associated with one or more switching periods. Additionally, the system controller includes a second controller terminal configured to receive a sensing voltage from a sensing resistor. The sensing voltage represents a magnitude of the first current flowing through the primary winding of the power converter. The system controller is configured to process information associated with the sensing voltage and a reference voltage, determine whether an average output current of the power converter is larger than a current threshold, and in response to the average output current being larger than the threshold current, generate the drive signal to cause the switch open and remain open to protect the power converter. The average output current of the power converter is related to a second current flowing through the secondary winding. The current threshold is equal to a first ratio multiplied by a second ratio. The first ratio is equal to a first number of turns of the primary winding divided by a second number of turns of the secondary winding, and the second ratio is equal to the reference voltage divided by a resistance of the sensing resistor.

According to another embodiment, a system controller for protecting a power converter includes a modulation and drive component configured to generate a drive signal and output the drive signal to a switch to affect a first current flowing through a primary winding of a power converter. The power converter further includes a secondary winding coupled to the primary winding, and the drive signal is associated with one or more switching periods. Additionally, the system controller includes an over-current-protection component configured to receive the drive signal from the modulation and drive component, receive a sensing voltage from a sensing resistor, receive a demagnetization signal, and generate a protection signal based at least in part on the drive signal, the sensing voltage, and the demagnetization signal. The sensing voltage represents a magnitude of the first current flowing through the primary winding of the power converter, and the demagnetization signal is associated with one or more demagnetization periods. The over-current-protection component is further configured to determine whether an average output current of the power converter is larger than a current threshold based at least in part on the drive signal, the sensing voltage, and the demagnetization signal, and in response to the average output current of the power converter being determined to be larger than the current threshold, change the protection signal from a first logic level to a second logic level. The modulation and drive component is further configured to receive the protection signal, and in response to the protection signal being at the second logic level, generate the drive signal to cause the switch open and remain open to protect the power converter. The average output current of the power converter is related to a second current flowing through the secondary winding.

According to yet another embodiment, a system controller for a power converter includes a first controller terminal configured to provide a drive signal to a switch to affect a first current flowing through a primary winding of a power converter. The drive signal is associated with one or more switching periods. Additionally, the system controller includes a second controller terminal configured to receive one or more input signals during the one or more switching periods. The system controller is configured to process information associated with the one or more input signals, determine whether a temperature associated with the power converter is larger than a predetermined temperature threshold based at least in part on the one or more input signals, and in response to the temperature associated with the power converter being larger than the predetermined temperature threshold, generate the drive signal to cause the switch open and remain open to protect the power converter. Moreover, the system controller is further configured to process information associated with the one or more input signals, determine whether an output voltage associated with a secondary winding of the power converter is larger than a predetermined voltage threshold based at least in part on the one or more input signals, and in response to the output voltage associated with the secondary winding of the power converter being larger than the predetermined voltage threshold, generate the drive signal to cause the switch to open and remain open to protect the power converter. Also, the system controller is further configured to process information associated with the one or more input signals, and generate a demagnetization signal based at least in part on the one or more input signals. For each of the one or more switching periods, the demagnetization signal represents a demagnetization period related to a demagnetization process, and the demagnetization signal is at a first logic level during the demagnetization period and at a second logic level outside the demagnetization period.

According to yet another embodiment, a system controller for a power converter includes a modulation component configured to generate a modulation signal. The modulation signal is associated with one or more switching periods. Additionally, the system controller includes a drive component configured to receive the modulation signal and coupled to a first switch through a controller terminal in order to affect a first current flowing through a primary winding of a power converter, and a demagnetization detection component configured to receive the modulation signal from the modulation component, output a second current to the controller terminal, and generate a demagnetization signal based on at least information associated with the modulation signal and the second current. For each of the one or more switching periods, the demagnetization signal represents a demagnetization period related to a demagnetization process, and the demagnetization signal is at a first logic level during the demagnetization period and at a second logic level outside the demagnetization period.

According to yet another embodiment, a method for protecting a power converter includes outputting a drive signal to a switch to affect a first current flowing through a primary winding of a power converter. The power converter further includes a secondary winding coupled to the primary winding, and the drive signal is associated with one or more switching periods. Additionally, the method includes receiving a sensing voltage from a sensing resistor. The sensing voltage represents a magnitude of the first current flowing through the primary winding of the power converter. The outputting a drive signal to a switch includes processing information associated with the sensing voltage and a reference voltage, determining whether an average output current of the power converter is larger than a current threshold, and in response to the average output current being larger than the threshold current, generating the drive signal to cause the switch open and remain open to protect the power converter. The average output current of the power converter is related to a second current flowing through the secondary winding. The current threshold is equal to a first ratio multiplied by a second ratio. The first ratio is equal to a first number of turns of the primary winding divided by a second number of turns of the secondary winding, and the second ratio is equal to the reference voltage divided by a resistance of the sensing resistor.

According to yet another embodiment, a method for protecting a power converter includes generating a drive signal. The drive signal is associated with one or more switching periods. Additionally, the method includes outputting the drive signal to a switch to affect a first current flowing through a primary winding of a power converter. The power converter further includes a secondary winding coupled to the primary winding. Moreover, the method includes receiving the drive signal, a sensing voltage, and a demagnetization signal. The sensing voltage is generated by a sensing resistor and represents a magnitude of the first current flowing through the primary winding of the power converter. The demagnetization signal is associated with one or more demagnetization periods. Also, the method includes generating a protection signal based at least in part on the drive signal, the sensing voltage, and the demagnetization signal. The generating a protection signal including determining whether an average output current of the power converter is larger than a current threshold based at least in part on the drive signal, the sensing voltage, and the demagnetization signal, and in response to the average output current of the power converter being determined to be larger than the current threshold, changing the protection signal from a first logic level to a second logic level. Additionally, the method includes receiving the protection signal, and in response to the protection signal being at the second logic level, generating the drive signal to cause the switch open and remain open to protect the power converter. The average output current of the power converter is related to a second current flowing through the secondary winding.

According to yet another embodiment, a method for a power converter includes providing a drive signal to a switch to affect a first current flowing through a primary winding of a power converter. The drive signal is associated with one or more switching periods. Additionally, the method includes receiving one or more input signals during the one or more switching periods, processing information associated with the one or more input signals, determining whether a temperature associated with the power converter is larger than a predetermined temperature threshold based at least in part on the one or more input signals, and in response to the temperature associated with the power converter being larger than the predetermined temperature threshold, generating the drive signal to cause the switch open and remain open to protect the power converter. Moreover, the method includes determining whether an output voltage associated with a secondary winding of the power converter is larger than a predetermined voltage threshold based at least in part on the one or more input signals, and in response to the output voltage associated with the secondary winding of the power converter being larger than the predetermined voltage threshold, generating the drive signal to cause the switch to open and remain open to protect the power converter. Also, the method includes generating a demagnetization signal based at least in part on the one or more input signals. For each of the one or more switching periods, the demagnetization signal represents a demagnetization period related to a demagnetization process, and the demagnetization signal is at a first logic level during the demagnetization period and at a second logic level outside the demagnetization period.

According to yet another embodiment, a method for a power converter includes generating a modulation signal associated with one or more switching periods, receiving the modulation signal in order to affect a first current flowing through a primary winding of a power converter, outputting a second current based at least in part on the modulation signal, and generating a demagnetization signal based on at least information associated with the modulation signal and the second current. For each of the one or more switching periods, the demagnetization signal represents a demagnetization period related to a demagnetization process, and the demagnetization signal is at a first logic level during the demagnetization period and at a second logic level outside the demagnetization period.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide control systems and methods for reliable over-current protection. Merely by way of example, some embodiments of the invention have been applied to power converters. But it would be recognized that the invention has a much broader range of applicability.

As shown by Equations 6, 7, and 8, regardless of whether a power converter works in discontinuous conduction mode (DCM) for the entire range of bulk voltage or the power converter works in continuous conduction mode (CCM) at low bulk voltage and works in DCM mode at high bulk voltage, the adjustment of the threshold for over-current protection as a function of bulk voltage depends on one or more parameters (e.g., inductance of the primary winding) of the one or more components that are outside the chip for PWM control. For example, if the adjustment of the threshold for over-current protection as a function of bulk voltage is predetermined for a particular type of chip for PWM control, this predetermined function for adjustment of the threshold can ensure constant maximum energy over a range of bulk voltage for only a given inductance of the primary winding. In another example, the particular type of chip for PWM control are used in different converters that have different magnitudes of inductance for the primary winding; therefore in some converters, this predetermined function for adjustment causes over-compensation so that the maximum energy at high bulk voltage is lower than that at low bulk voltage, but in other converters, this predetermined function for adjustment causes under-compensation so that the maximum energy at high bulk voltage is higher than that at low bulk voltage.

Figure 1:
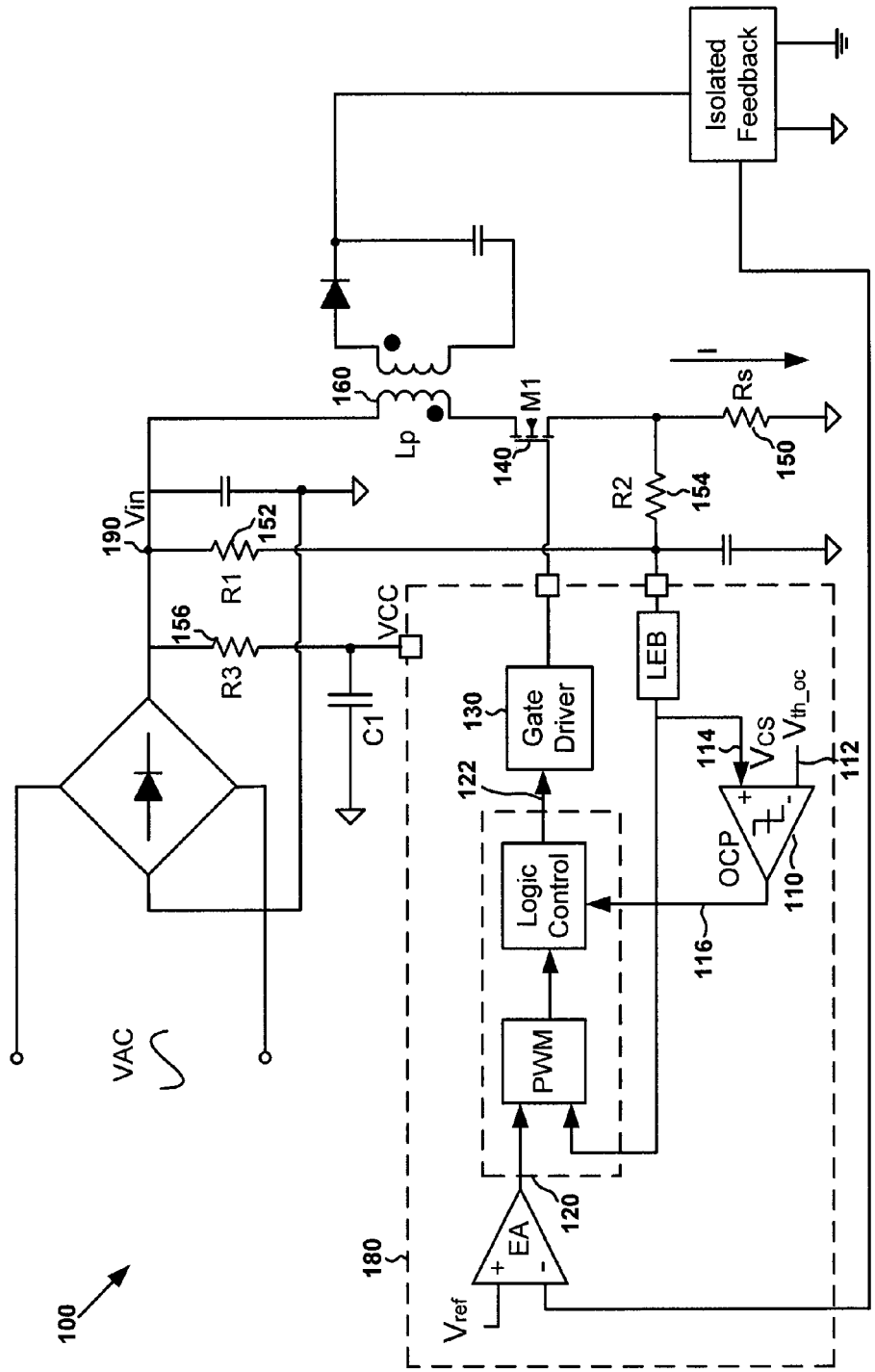
FIG. 1 is a simplified conventional switch-mode converter with over-current protection.
Figure 2:
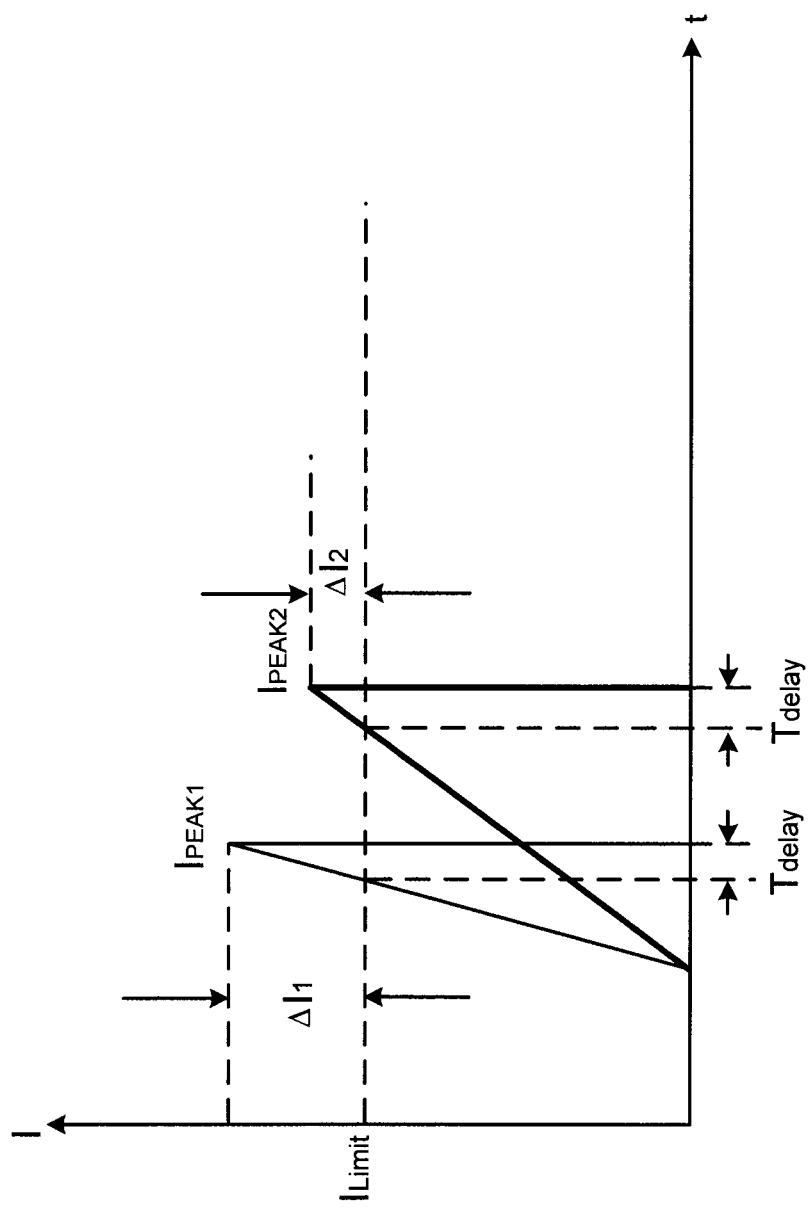
FIG. 2 is a simplified diagram showing conventional relationship between extra current ramping amplitude and bulk voltage.
Figure 3:
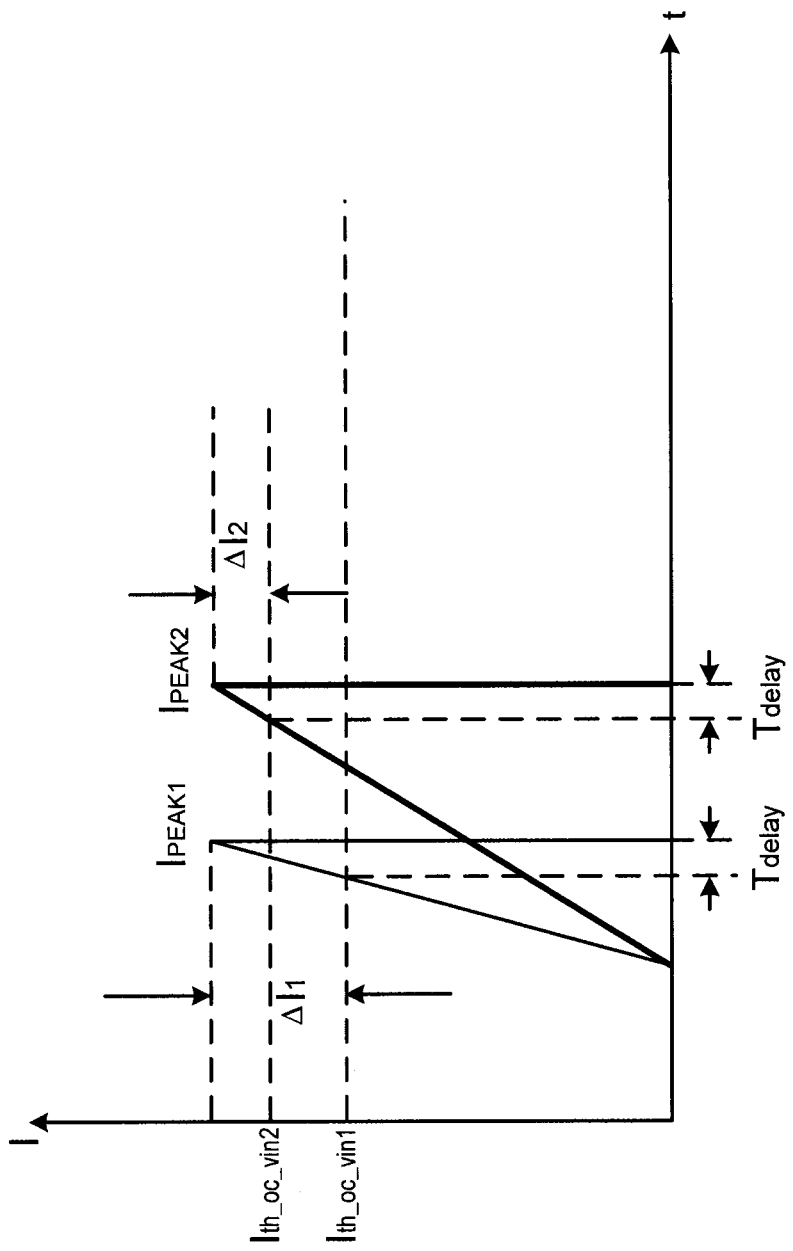
FIG. 3 is a simplified diagram showing conventional relationship between current threshold and bulk voltage.
Figure 4:
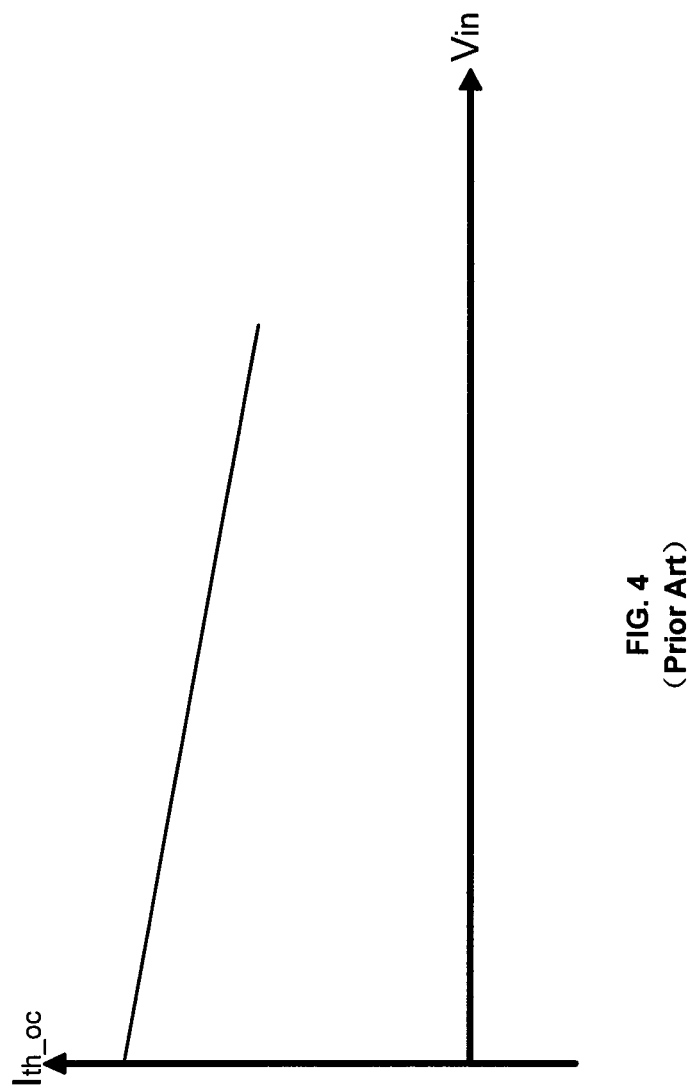
FIG. 4 is a simplified diagram showing conventional relationship between threshold offset and bulk voltage.
Figure 5:
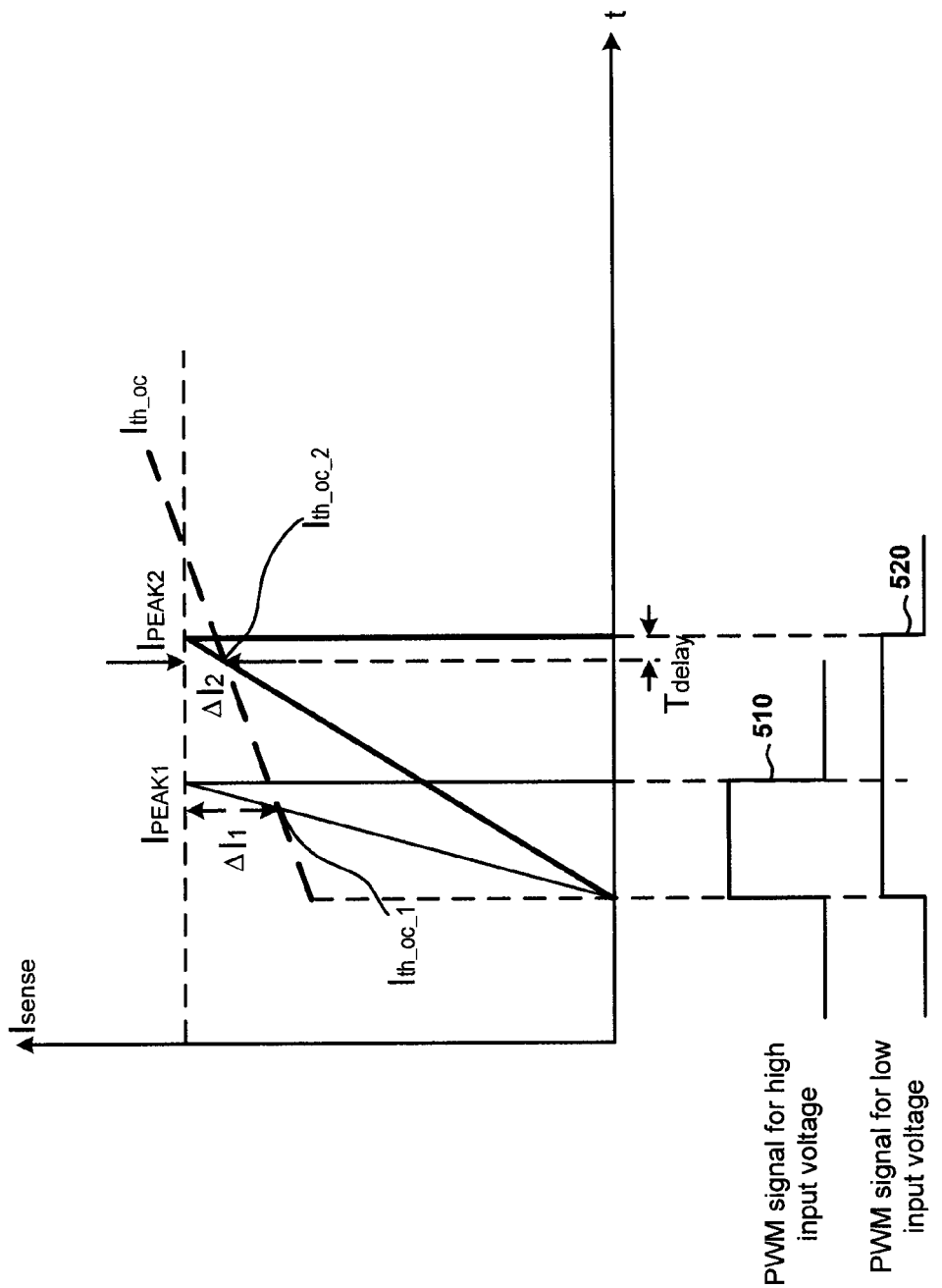
FIG. 5 is a simplified diagram showing conventional relationship between PWM signal maximum width and bulk voltage.
Figure 6:
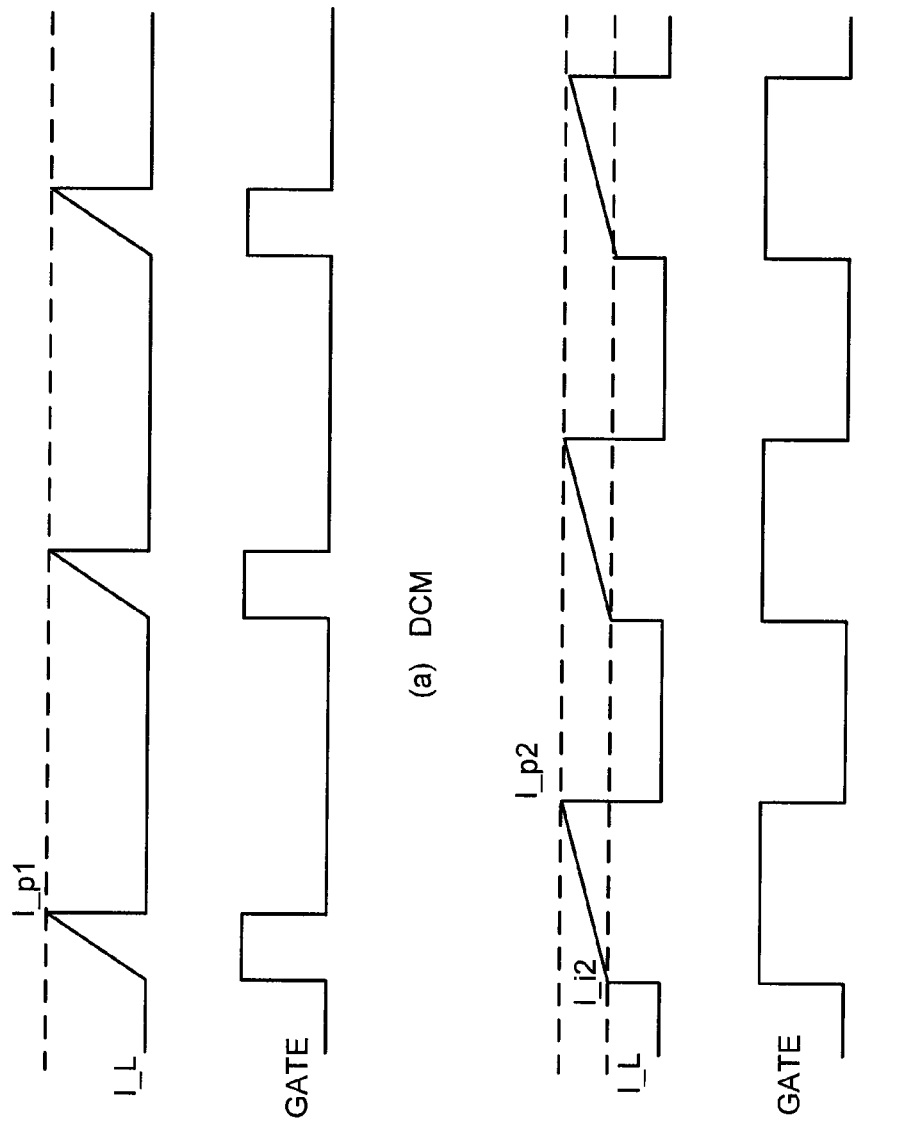
FIG. 6 shows simplified conventional current profiles for primary winding in CCM mode and DCM mode.
Figure 7:
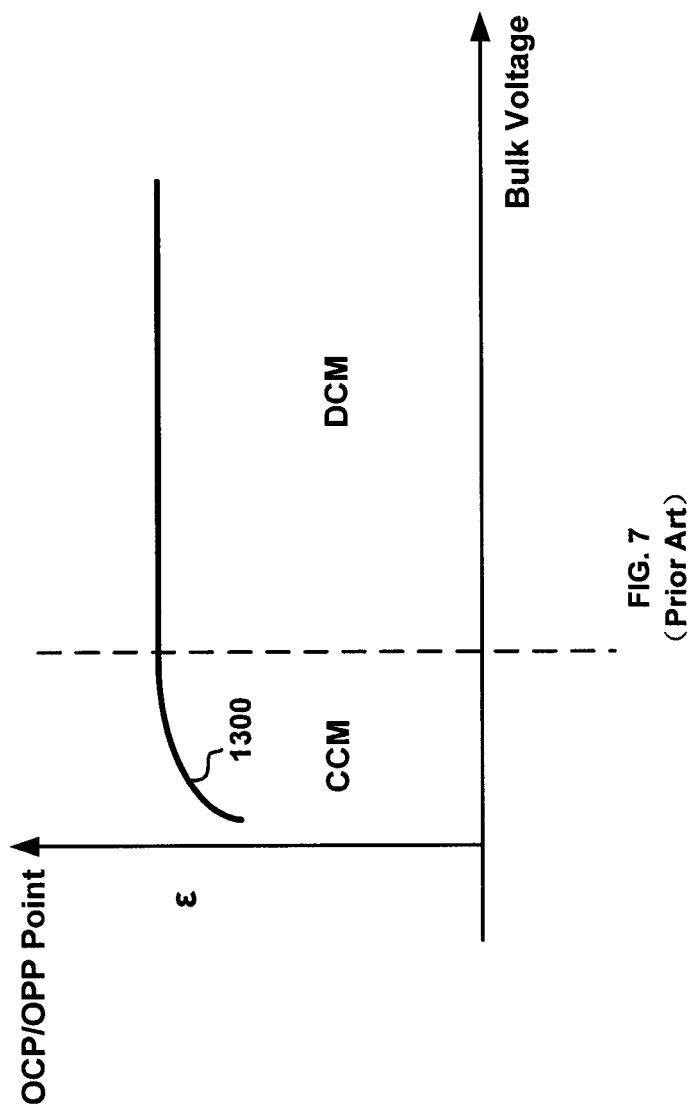
FIG. 7 shows a simplified diagram for maximum energy delivered to load at each cycle as a conventional function of bulk voltage.
Figure 8:
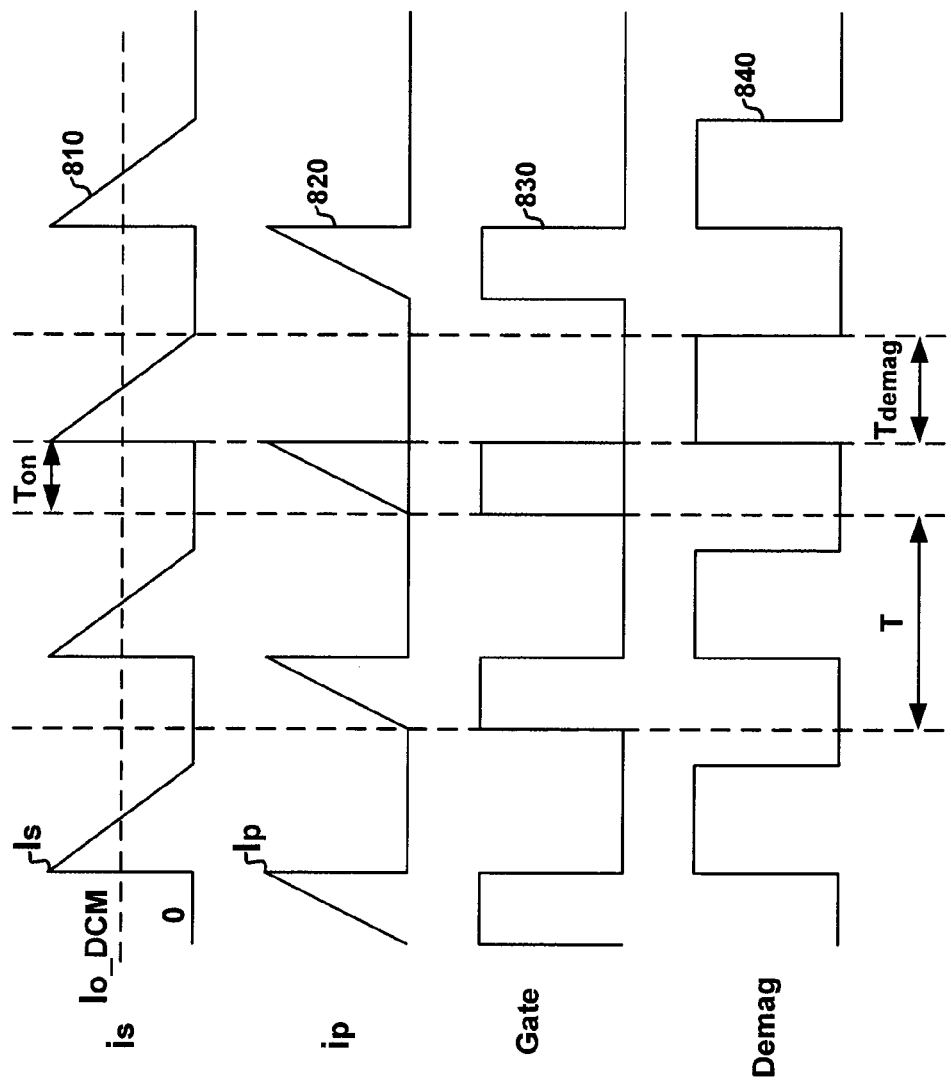
FIGS. 8 and 9 are simplified conventional timing diagrams for a switch-mode converter in the DCM mode and in the CCM mode respectively.

As shown in FIG. 8, the primary current (e.g., $i_p$) that flows through a primary winding has a peak magnitude (e.g., $I_p$), and the secondary current (e.g., $i_s$) that flows through a secondary winding has a peak magnitude (e.g., $I_s$). In one embodiment, in the DCM mode, the average output current for a power converter is determined by:

$$I_{o\_DCM} = \frac{1}{T} \int_0^T i_s \, dt = \frac{1}{T}\left( \int_0^{T_{demag}} \frac{1}{2} I_s \, dt + \int_{T_{demag}}^T 0 \, dt \right) = \frac{1}{2} I_s \frac{T_{demag}}{T} \quad \text{(Equation 9)}$$

where $I_{o\_DCM}$ represents the average output current in the DCM mode, T represents a period of the drive signal, $i_s$ represents the secondary current, $T_{demag}$ represents a demagnetization period, and $I_s$ represents a peak magnitude of the secondary current.

For example, the peak magnitude of the secondary current has the following relationship with a peak magnitude of the primary current:

$$I_s = I_p \frac{N_p}{N_s} \quad \text{(Equation 10)}$$

where $I_p$ represents the peak magnitude of the primary current, $N_p$ represents the number of turns of the primary winding, and $N_s$ represents the number of turns of the secondary winding. In another example, Equation 9 is combined with Equation 10 and hence becomes:

$$I_{o\_DCM} = \frac{1}{2} I_p \frac{N_p}{N_s} \times \frac{T_{demag}}{T} \quad \text{(Equation 11)}$$

Figure 9:
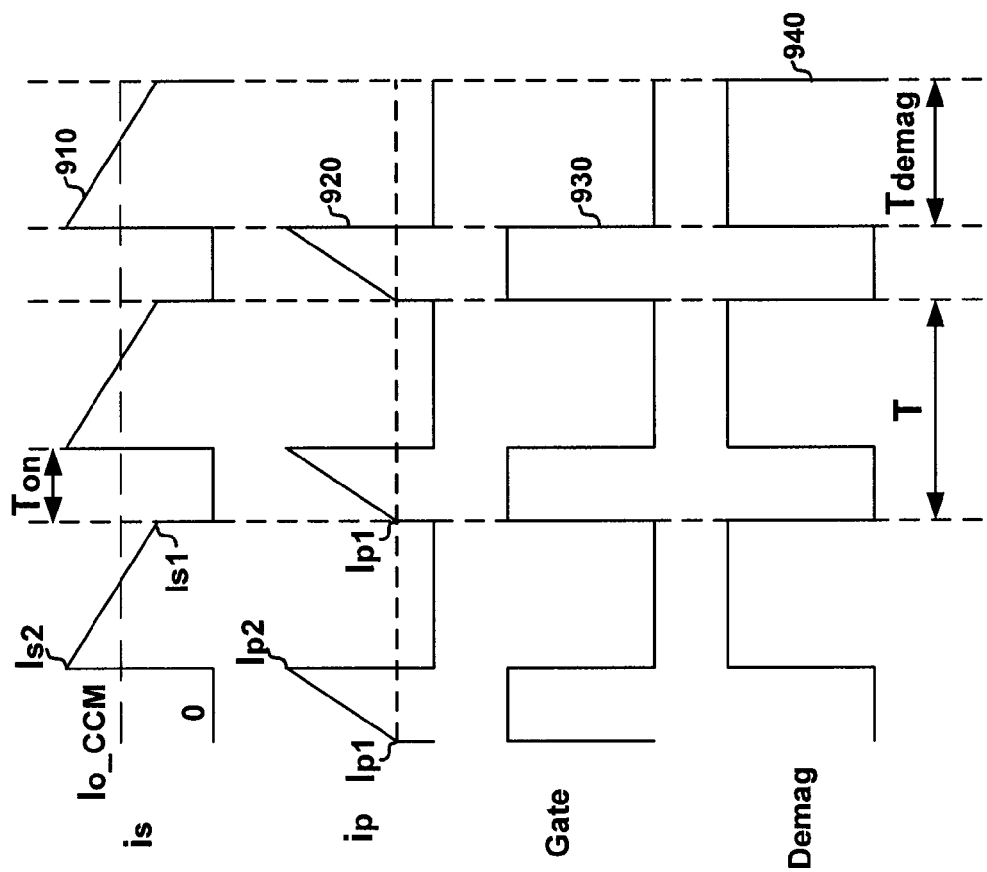

As shown in FIG. 9, the primary current (e.g., $i_p$) that flows through a primary winding increases from a first magnitude (e.g., $I_{p1}$) to a second magnitude (e.g., $I_{p2}$), and the secondary current (e.g., $i_s$) that flows through a secondary winding decreases from a first magnitude (e.g., $I_{s1}$) to a second magnitude (e.g., $I_{s2}$). In one embodiment, in the CCM mode, the average output current for a power converter is determined by:

$$I_{o\_CCM} = \quad \text{(Equation 12)}$$
$$\frac{1}{T}\int_0^T i_s \, dt = \frac{1}{T}\left( \int_0^{T_{demag}} \frac{1}{2}(I_{s2} + I_{s1}) \, dt + \int_0^{T_{demag}} 0 \, dt \right) = $$
$$\frac{1}{2}(I_{s2} + I_{s1}) \frac{T_{demag}}{T}$$

where $I_{o\_CCM}$ represents the average output current in the CCM mode, T represents the period of the drive signal, $i_s$ represents the secondary current, and $T_{demag}$ represents the demagnetization period. Additionally, $I_{s1}$ represents the first magnitude of the secondary current, and $I_{s2}$ represents the second magnitude of the secondary current.

For example, the first and second magnitudes of the secondary current have the following relationships with the corresponding first and second magnitudes of the primary current:

$$I_{s1} = I_{p1} \frac{N_p}{N_s} \quad \text{(Equation 13)}$$

$$I_{s2} = I_{p2} \frac{N_p}{N_s} \quad \text{(Equation 14)}$$

where $I_{p1}$ represents the first magnitude of the primary current, and $I_{p2}$ represents the second magnitude of the primary current. In another example, Equation 12 is combined with Equations 13 and 14 and hence becomes:

$$I_{o\_CCM} = \frac{1}{2}(I_{p2} + I_{p1}) \times \frac{N_p}{N_s} \times \frac{T_{demag}}{T} \quad \text{(Equation 15)}$$

According to certain embodiments, Equations 11 and 15 are both represented by the following equation:

$$I_o = I_{p\_mid} \times \frac{N_p}{N_s} \times \frac{T_{demag}}{T} = V_{CS\_mid} \times \frac{T_{demag}}{T} \times \frac{1}{R_{CS}} \times \frac{N_p}{N_s} \quad \text{(Equation 16)}$$

where $I_o$ represents the average output current in the DCM mode and in the CCM mode. Additionally, $I_{p\_mid}$ represents the magnitude of the primary current at the middle of an on time of the switch for each cycle (e.g., at the middle of $T_{on}$ as shown in FIGS. 8 and 9). For example, during the on time, the switch is closed (e.g., turned on). In another example, the middle of the on time corresponds to the middle of the pulse width of the drive signal as shown by the curves 830 and 930.

According to certain embodiments, Equation 16 becomes:

$$I_o = \left( V_{CS\_mid} \times \frac{T_{demag}}{T} \right) \times \frac{1}{R_{CS}} \times \frac{N_p}{N_s} \quad \text{(Equation 17)}$$

where $R_{CS}$ represents resistance of a current-sensing resistor, and $V_{CS\_mid}$ represents the voltage that is generated by the primary current flowing through the current-sensing resistor at the middle of the on time (e.g., at the middle of $T_{on}$ as shown in FIGS. 8 and 9). For example, $V_{cs\_mid}$, $T_{demag}$, and T are parameters that are determined by the given chip through measurement and/or calculation in real time.

According to some embodiments, the output-current threshold for over-current protection is:

$$I_{o\_th} = V_{ref} \times \frac{1}{R_{CS}} \times \frac{N_p}{N_s} \quad \text{(Equation 18)}$$

where $I_{o\_th}$ represents the threshold of the output current for over-current protection, and $V_{ref}$ represents a reference voltage. For example, $V_{ref}$ is a reference voltage that is predetermined for a given chip for PWM control. In another example, the threshold of the output current depends on the number of turns of the primary winding, the number of turns of the secondary winding, resistance of the current-sensing resistor, and the predetermined reference voltage. According to certain embodiments of the present invention, if the threshold of the output current for over-current protection is set according to Equation 18, the maximum output current does not depend on the inductance of the primary winding (e.g., $L_p$) or the clock period (e.g., T).

In one embodiment, with comparison between Equations 17 and 18, the following is obtained:

$$\text{If } V_{CS\_mid} \times \frac{T_{demag}}{T} < V_{ref} \quad \text{(Equation 19)}$$

$$\text{then } I_o < I_{0\_th} \quad \text{(Equation 20)}$$

In another embodiment, with comparison between Equations 17 and 18, the following is also obtained:

$$\text{If } V_{CS\_mid} \times \frac{T_{demag}}{T} > V_{ref} \quad \text{(Equation 21)}$$

$$\text{then } I_o > I_{0\_th} \quad \text{(Equation 22)}$$

Figure 10:
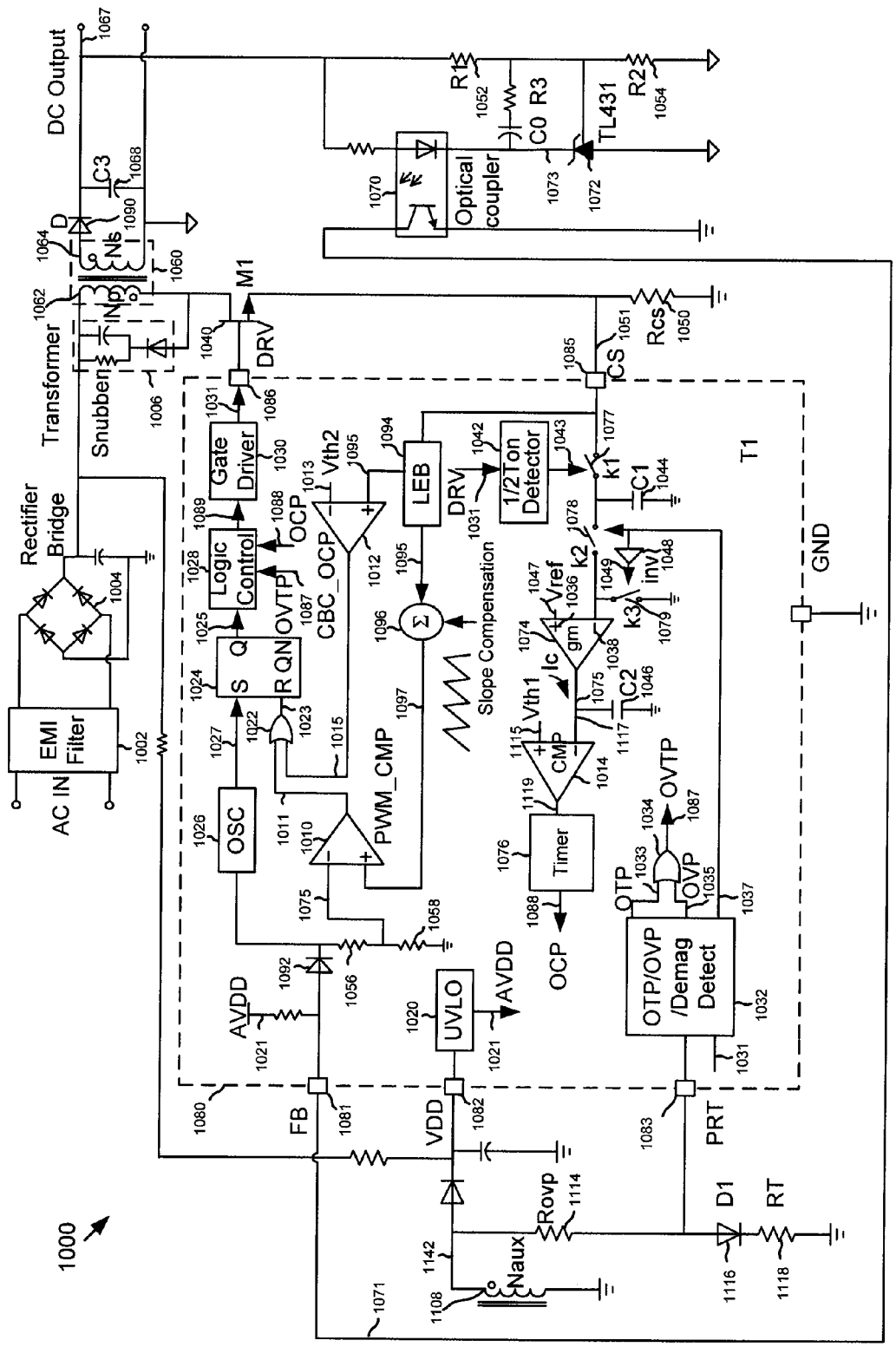
FIG. 10 is a simplified power converter with over-current protection according to one embodiment of the present invention.

FIG. 10 is a simplified power converter with over-current protection according to one embodiment of the present invention. This diagram is merely an example, which should not unduly limit the scope of the claims. One of ordinary skill in the art would recognize many variations, alternatives, and modifications. The power converter 1000 (e.g., a power conversion system) includes an EMI filer 1002, a rectifier bridge 1004, a snubber circuit 1006, comparators 1010, 1012, and 1014, an under-voltage lock-out (UVLO) component 1020, an OR gate 1022, a flip flop component 1024, an oscillator 1026, and a logic control component 1028, a gate driver 1030, a detection component 1032, an OR gate 1034, a switch 1040, a detector component 1042, capacitors 1044 and 1046, a NOT gate 1048, resistors 1050, 1052, 1054, 1056, and 1058, a transformer 1060, an output capacitor 1068, an optical coupler 1070, an adjustable regulator 1072 (e.g., TL431), a transconductance amplifier 1074, a timer component 1076, switches 1077, 1078, and 1079, diodes 1090 and 1092, a leading-edge-blanking (LEB) component 1094, a slope compensation component 1096, an auxiliary winding 1108, a diode 1116, and resistors 1114 and 1118.

For example, the switch 1040 includes a field effect transistor (e.g., a power MOSFET). In another example, the switch 1040 includes a bipolar junction transistor. In yet another example, the resistor 1050 is used as a current-sensing resistor. In yet another example, the transformer 1060 includes a primary winding 1062 and a secondary winding 1064, and the secondary winding 1064 is coupled to both the primary winding 1062 and the auxiliary winding 1108. In yet another example, the diode 1090 is used as a rectifying diode. In yet another example, the LEB component 1094 is removed from the power converter 1000. In yet another example, the diode 1116 is replaced with a number of diodes connected in series.

In one embodiment, the comparators 1010, 1012, and 1014, the resistors 1056 and 1058, the under-voltage lock-out (UVLO) component 1020, the OR gate 1022, the flip flop component 1024, the oscillator 1026, the logic control component 1028, the gate driver 1030, the detection component 1032, the OR gate 1034, the detector component 1042, the capacitors 1044 and 1046, the NOT gate 1048, the transconductance amplifier 1074, the timer component 1076, the switches 1077, 1078, and 1079, the diode 1092, and the slope compensation component 1096 are parts of a chip 1080 (e.g., a system controller) for PWM control. In another embodiment, the chip 1080 for PWM control includes a terminal 1081 (e.g., FB), a terminal 1082 (e.g., VDD), a terminal 1083 (e.g., PRT), a terminal 1084 (e.g., GND), a terminal 1085 (e.g., CS), and a terminal 1086 (e.g., DRV). For example, the under-voltage lock-out (UVLO) component 1020 of the chip 1080 receives a chip supply voltage at the terminal 1082, and in response, generates an internal supply voltage 1021 (e.g., AVDD). In another example, the internal supply voltage is equal to about 5 volts.

In yet another embodiment, the chip 1080 (e.g., a system controller) includes a modulation component that includes the flip flop component 1024 and the logic control component 1028, and the chip 1080 also includes a drive component that includes the gate driver 1030. In yet another embodiment, the chip 1080 (e.g., a system controller) includes an over-current-protection component that includes the comparator 1014, the detector component 1042, the capacitors 1044 and 1046, the NOT gate 1048, the transconductance amplifier 1074, the timer component 1076, and the switches 1077, 1078, and 1079. For example, a sample-and-hold component includes the detector component 1042, the capacitor 1044, and the switch 1077. In another example, an integration component includes the capacitor 1046, the NOT gate 1048, the transconductance amplifier 1074, and the switches 1078 and 1079.

According to one embodiment, the power converter 1000 generates an output voltage 1067 (e.g., a DC output voltage). For example, if the output voltage 1067 changes, this change of the output voltage 1067 is processed by a voltage divider including the resistors 1052 and 1054, and is conveyed to the adjustable regulator 1072 (e.g., TL431). In response, the adjustable regulator 1072 (e.g., TL431) generates a current signal 1073, which is received by the optical coupler 1070 according to one embodiment. The optical coupler 1070, in response, outputs a feedback signal 1071 to the chip 1080 through the terminal 1081 (e.g., FB) according to another embodiment. In another example, the feedback signal 1071 is converted into a signal 1075 by the diode 1092 and a voltage divider including the resistors 1056 and 1058.

According to another embodiment, when the switch 1040 is closed (e.g., turned on), the primary current of the primary winding 1062 flows through the resistor 1050 (e.g., a current-sensing resistor), which in response generates a voltage signal 1051. For example, the voltage signal 1051 is received by the LEB component 1094 of the chip 1080 through the terminal 1085 (e.g., CS). In another example, the LEB component 1094, in response, generates a signal 1095. According to yet another embodiment, the signal 1095 is received by both the comparator 1012 and the slope compensation component 1096. For example, the slope compensation component 1096 processes the signal 1095 and generates a signal 1097. In another example, the signals 1075 and 1097 are received by the comparator 1010, and the signal 1095 and a threshold voltage 1013 (e.g., $V_{th2}$) are received by the comparator 1012.

As shown in FIG. 10, in response, the comparator 1010 generates a comparison signal 1011, and the comparator 1012 generates a comparison signal 1015. For example, the comparison signals 1011 and 1015 are received by the OR gate 1022, which sends a signal 1023 to the flip flop component 1024. In another example, the flip flop component 1024 also receives a clock signal 1027 from the oscillator 1026, and sends a signal 1025 to the logic control component 1028.

In one embodiment, the logic control component 1028 also receives signals 1087 and 1088, and generates a signal 1089. For example, the signal 1089 is sent to the gate driver 1030, which in response generates a drive signal 1031. In another example, the drive signal 1031 is sent to the switch 1040 and used to drive (e.g., turn on or off) the switch 1040. In another embodiment, the comparison signals 1011 and 1015 are used to generate the signal 1023 to control duty cycle of the drive signal 1031. For example, the comparison signal 1011 is used to make the output voltage 1067 (e.g., a DC output voltage) stable. In another example, the comparison signal 1015 is used to ensure the peak magnitude of the primary current that flows through the switch 1040 and the resistor 1050 does not exceed a predetermined threshold during each switching cycle.

According to one embodiment, the terminal 1083 of the chip 1080 (e.g., a system controller) is used to achieve over-temperature protection (OTP), over-voltage protection (OVP), and demagnetization detection. For example, during a first time period (e.g., a switching period), the terminal 1083 is configured to receive a first input signal, and whether the OTP mechanism is triggered is determined based on at least information associated with the first input signal. In another example, during a second time period (e.g., another switching period) that is different from the first time period, the terminal 1083 is configured to receive a second input signal, and whether the OVP mechanism is triggered is determined based on at least information associated with the second input signal. In yet another example, during the first time period and the second time period, the terminal 1083 is configured to receive the first input signal and the second input signal respectively, and the demagnetization period is detected during the first time period based on at least information associated with the first input signal and is detected during the second time period based on at least information associated with the second input signal.

As shown in FIG. 10, the terminal 1083 is connected to the resistor 1114 (e.g., $R_{ovp}$) and the diode 1116 (e.g., the anode), and the resistor 1118 (e.g., $R_T$) is connected to the diode 1116 (e.g., the cathode). For example, the resistor 1114 is configured to receive a voltage signal 1142 from the auxiliary winding 1108. As an example, the voltage signal 1142 maps the output voltage 1067. In another example, the resistor 1118 is a thermal resistor (e.g., a thermistor) that changes its resistance with temperature. In yet another example, the resistor 1118 has a negative temperature coefficient, i.e., the resistance of the resistor 1118 decreases with increasing temperature.

In one embodiment, if the temperature of the power converter 1000 exceeds a temperature threshold, the OTP is triggered, and the chip 1080 (e.g., a system controller) outputs, at the terminal 1086, the drive signal 1031 to open (e.g., turn off) the switch 1040. For example, the power converter 1000 is shut down and the switch 1040 is kept open. In another example, after being shut down, the power converter 1000 restarts (e.g., automatically or manually) and starts modulation again. In yet another example, the switch 1040 is kept open for a first predetermined time period that is larger in duration than a switching period of the power converter 1000.

In another embodiment, if the voltage signal 1142 exceeds a voltage threshold, the OVP is triggered, and the chip 1080 (e.g., a system controller) outputs the drive signal 1031 to open (e.g., turn off) the switch 1040. For example, the power converter 1000 is shut down and the switch 1040 is kept open. In another example, after being shut down, the power converter 1000 restarts (e.g., automatically or manually) and starts modulation again. In yet another example, the switch 1040 is kept open for a second predetermined time period that is larger in duration than a switching period of the power converter 1000. In yet another example, the second predetermined time period is the same as the first predetermined time period.

As shown in FIG. 10, the detection component 1032 is configured to achieve over-temperature protection (OTP), over-voltage protection (OVP), and demagnetization detection. According to one embodiment, during the first time period (e.g., a switching period), the detection component 1032 receives the first input signal through the terminal 1083, and outputs a signal 1033 to indicate whether the OTP mechanism is triggered based on at least information associated with the first input signal. According to another embodiment, during the second time period (e.g., another switching period) that is different from the first time period, the detection component 1032 receives the second input signal through the terminal 1083, and outputs a signal 1035 to indicate whether the OVP mechanism is triggered based on at least information associated with the second input signal.

According to yet another embodiment, the signals 1033 and 1035 are received by the OR gate 1034, and in response, the OR gate 1034 generates the signal 1087 to indicate whether the OTP mechanism or the OVP mechanism is triggered. For example, if the OTP mechanism, the OVP mechanism, or both are triggered, the signal 1087 is at the logic high level. In another example, the signal 1087 is received by the logic control component 1028. In yet another example, if the signal 1087 is at the logic high level, the logic control component 1028 causes the power converter 1000 to shut down and causes the switch 1040 to be kept open. In yet another example, after being shut down, the power converter 1000 restarts (e.g., automatically or manually) and starts modulation again. In yet another example, the switch 1040 is kept open for a predetermined time period that is larger in duration than a switching period of the power converter 1000.

According to yet another embodiment, during the first time period and the second time period, the detection component 1032 uses the first input signal and the second input signal respectively in order to detect the demagnetization period for the first time period based on at least information associated with the first input signal and to detect the demagnetization period for the second time period based on at least information associated with the second input signal. For example, the detection component 1032 outputs a demagnetization signal 1037 related to a demagnetization process. In another example, the demagnetization signal 1037 is at a logic high level during the demagnetization period, and at a logic low level outside the demagnetization period.

As shown in FIG. 10, the detection component 1042 receives the drive signal 1031 and generates a signal 1043. For example, the detection component 1042 processes the drive signal 1031 in one or more previous cycles to determine the middle of the on time of a current cycle of the drive signal 1031, and the detection component 1042 also generates a pulse in the signal 1043 at the determined middle of the on time. In another example, the signal 1043 is received by the switch 1077, which is closed during the pulse of the signal 1043 in order to sample the voltage signal 1051 at the middle of the on time. In yet another example, the sampled voltage signal 1051 at the middle of the on time (e.g., $V_{CS\_mid}$) is held on the capacitor 1044.

In one embodiment, the demagnetization signal 1037 is received by the switch 1078 and the NOT gate 1048, and in response, the NOT gate 1048 outputs a signal 1049 to the switch 1079. For example, the demagnetization signal 1037 is at a logic high level during the demagnetization period, and is at a logic low level outside the demagnetization period. In another example, during the demagnetization period, the switch 1078 is closed and the switch 1079 is open, but outside the demagnetization period, the switch 1078 is open and the switch 1079 is closed.

In another embodiment, the transconductance amplifier 1074 includes terminals 1036 and 1038. For example, the terminal 1036 (e.g., the "+" terminal) receives a reference voltage 1047 (e.g., $V_{ref}$). In another example, the terminal 1038 (e.g., the "−" terminal) is connected to the capacitor 1044 through the closed switch 1078 during the demagnetization period, but the terminal 1038 (e.g., the "−" terminal) is biased to the ground through the closed switch 1079 outside the demagnetization period. In yet another example, the transconductance amplifier 1074 outputs a current 1075 (e.g., $I_c$) to charge or discharge the capacitor 1046.

According to one embodiment, the current 1075 (e.g., $I_c$) is determined as follows:

$$I_c = g_m[(V_{ref} - V_{CS\_mid}) \times T_{demag} + (V_{ref} - 0) \times (T - T_{demag})] \quad \text{(Equation 23)}$$

$$\text{so } I_c = g_m(V_{ref} \times T - V_{CS\_mid} \times T_{demag}) \quad \text{(Equation 24)}$$

where $I_c$ represents the current 1075 that charges or discharges the capacitor 1046, $g_m$ represents transconductance of the transconductance amplifier 1074, $V_{ref}$ represents the reference voltage 1047, and $V_{CS\_mid}$ represents the sampled voltage signal 1051 at the middle of the on time. Additionally, $T_{demag}$ represents the demagnetization period, and T represents the period of the drive signal 1031.

According to another embodiment, if the current 1075 (e.g., $I_c$) has a positive value according to Equation 24, the current 1075 flows from the transconductance amplifier 1074 to the capacitor 1046 and charges the capacitor 1046. According to yet another embodiment, if the current 1075 (e.g., $I_c$) has a negative value according to Equation 24, the current 1075 flows from the capacitor 1046 to the transconductance amplifier 1074 and discharges the capacitor 1046.

In one embodiment, if $$V_{CS\_mid} \times \frac{T_{demag}}{T} < V_{ref} \quad \text{(Equation 25)}$$

then $I_c > 0$ \quad (Equation 26)

where the current 1075 charges the capacitor 1046. For example, as shown in Equation 26, the voltage across the capacitor 1046 (e.g., a voltage 1117) is increased by the charging current 1075. In another example, after a time period for charging, the voltage across the capacitor 1046 (e.g., the voltage 1117) becomes so close to the internal supply voltage 1021 (e.g., AVDD) that the capability for the transconductance amplifier 1074 to serve as a current source also becomes close to zero, and eventually the charging current 1075 drops to zero in magnitude. In yet another example, if the current 1075 remains positive, then, according to Equations 18 and 20, the following is obtained:

$$I_0 < V_{ref} \times \frac{1}{R_{CS}} \times \frac{N_p}{N_s} \quad \text{(Equation 27)}$$

where $I_0$ represents the average output current of the power converter 1000 in the DCM mode and in the CCM mode; hence the OCP mechanism is not triggered.

In another embodiment, if $$V_{CS\_mid} \times \frac{T_{demag}}{T} > V_{ref} \quad \text{(Equation 28)}$$

then $I_c < 0$ \quad (Equation 29)

where the current 1075 discharges the capacitor 1046. For example, as shown in Equation 29, the voltage across the capacitor 1046 (e.g., the voltage 1117) is reduced by the discharging current 1075. In another example, after a time period for discharging, the voltage across the capacitor 1046 (e.g., the voltage 1117) becomes so close to zero that the capability for the transconductance amplifier 1074 to serve as a current sink also becomes close to zero, and eventually the discharging current 1075 drops to zero in magnitude. In yet another example, if the current 1075 remains negative for a time period and causes the voltage across the capacitor 1046 (e.g., the voltage 1117) to decrease, approaching zero, then, according to Equations 18 and 22, the following is obtained:

$$I_0 > V_{ref} \times \frac{1}{R_{CS}} \times \frac{N_p}{N_s} \quad \text{(Equation 30)}$$

where $I_0$ represents the average output current in the DCM mode and in the CCM mode; hence the OCP mechanism is triggered.

As shown in FIG. 10, the comparator 1014 receives a threshold voltage 1115 (e.g., $V_{th1}$) and the voltage 1117, and generates an output signal 1119. In one embodiment, if the voltage 1117 becomes smaller than the threshold voltage 1115 (e.g., 3.6 volts), the comparator 1014 changes the output signal 1119 (e.g., from a logic low level to a logic high level). In another embodiment, the timer component 1076 receives the output signal 1119 and generates the signal 1088.

According to one embodiment, in response to the change in the output signal 1119 (e.g., from the logic low level to the logic high level), the timer component 1076 starts counting time to determine whether the output signal 1119 remains unchanged (e.g., at the logic high level) for a predetermined period of time. For example, if the output signal 1119 is determined to have remained unchanged (e.g., at the logic high level) for the predetermined period of time since the output signal 1119 changed (e.g., from the logic low level to the logic high level), the timer component 1076 changes the signal 1088 (e.g., from the logic low level to the logic high level). In another example, if the output signal 1119 is determined not to have remained unchanged (e.g., not to have remained at the logic high level) for the predetermined period of time since the output signal 1119 changed (e.g., from the logic low level to the logic high level), the timer component 1076 does not change the signal 1088 (e.g., the signal 1088 remaining at the logic low level).

According to another embodiment, if the output signal 1119 is determined to have changed from the logic high level back to the logic low level during the predetermined period of time since the output signal 1119 changed from the logic low level to the logic high level, the timer component 1076 resets the timer and the signal 1088 remains at the logic low level. For example, after the output signal 1119 is determined have changed from the logic high level back to the logic low level, if the output signal 1119 again changes from the logic low level to the logic high level, the timer component 1076 again determines whether the output signal 1119 remains unchanged at the logic high level for the predetermined period of time since the output signal 1119 changed from the logic low level to the logic high level. In another example, if the output signal 1119 is determined to have remained unchanged at the logic high level for the predetermined period of time, the timer component 1076 changes the signal 1088 from the logic low level to the logic high level. In yet another example, if the output signal 1119 is determined not to have remained unchanged at the logic high level for the predetermined period of time, the timer component 1076 does not change the signal 1088 and the signal 1088 remains at the logic low level.

In yet another embodiment, the signal 1088 is received by the logic control component 1028. For example, if the signal 1088 is at the logic high level, the logic control component 1028 causes the power converter 1000 to shut down and causes the switch 1040 to be kept open. In another example, after being shut down, the power converter 1000 restarts (e.g., automatically or manually) and starts modulation again. In yet another example, the switch 1040 is kept open for a predetermined time period that is larger in duration than a switching period of the power converter 1000. In yet another example, the switch 1040 is kept open for a predetermined time period that is larger in duration than an auto-recovery period of the power converter 1000.

According to one embodiment, if the temperature of the power converter 1000 exceeds a temperature threshold, the OTP is triggered, and the chip 1080 (e.g., a system controller) outputs, at the terminal 1086, the drive signal 1031 to open (e.g., turn off) the switch 1040. For example, the power converter 1000 is shut down and the switch 1040 is kept open. In another example, after being shut down, the power converter 1000 restarts (e.g., automatically or manually) and starts modulation again. In yet another example, the switch 1040 is kept open for a first predetermined time period that is larger in duration than a switching period of the power converter 1000.

According to another embodiment, if the voltage signal 1142 exceeds a voltage threshold, the OVP is triggered, and the chip 1080 (e.g., a system controller) outputs the drive signal 1031 to open (e.g., turn off) the switch 1040. For example, the power converter 1000 is shut down and the switch 1040 is kept open. In another example, after being shut down, the power converter 1000 restarts (e.g., automatically or manually) and starts modulation again. In yet another example, the switch 1040 is kept open for a second predetermined time period that is larger in duration than a switching period of the power converter 1000.

Figure 11:
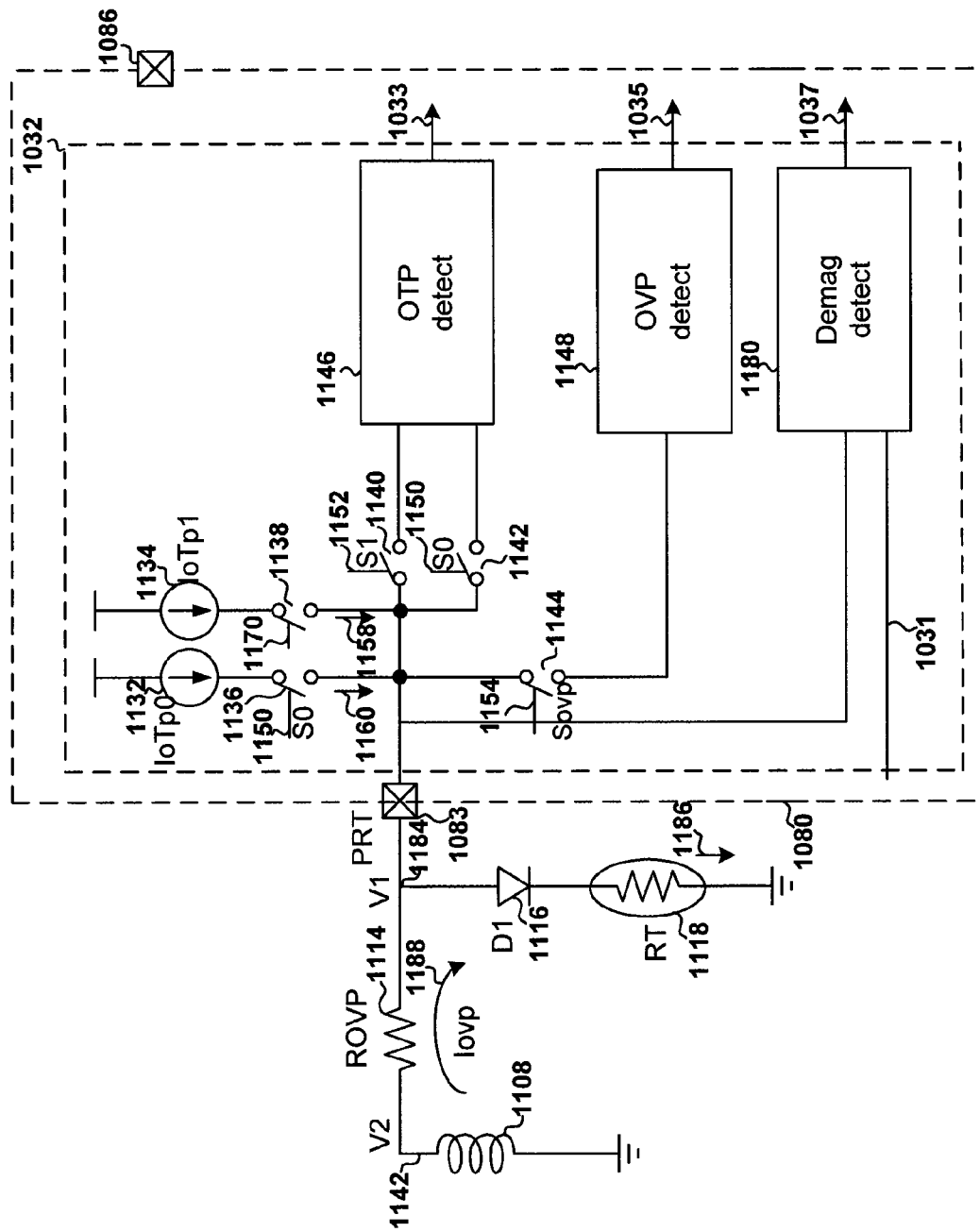
FIG. 11 is a simplified diagram showing certain components of the power converter as shown in FIG. 10 according to one embodiment of the present invention.

FIG. 11 is a simplified diagram showing certain components of the power converter 1000 according to one embodiment of the present invention. This diagram is merely an example, which should not unduly limit the scope of the claims. One of ordinary skill in the art would recognize many variations, alternatives, and modifications. As shown in FIG. 11, the detection component 1032 includes current-source components 1132 and 1134, switches 1136, 1138, 1140, 1142 and 1144, an OTP detector 1146, an OVP detector 1148, and a demagnetization detector 1180.

According to one embodiment, the switches 1136 and 1142 are closed or opened in response to a switching signal 1150 (e.g., $S_0$), and the switches 1138 and 1140 are closed or opened in response to a switching signal 1152 (e.g., $S_1$). For example, the switch 1144 is closed or opened in response to a switching signal 1154 (e.g., $S_{ovp}$). The OVP detection and the OTP detection are performed during different switching periods by controlling the switches 1136, 1138, 1140, 1142 and 1144 in some embodiments.

Figure 12:
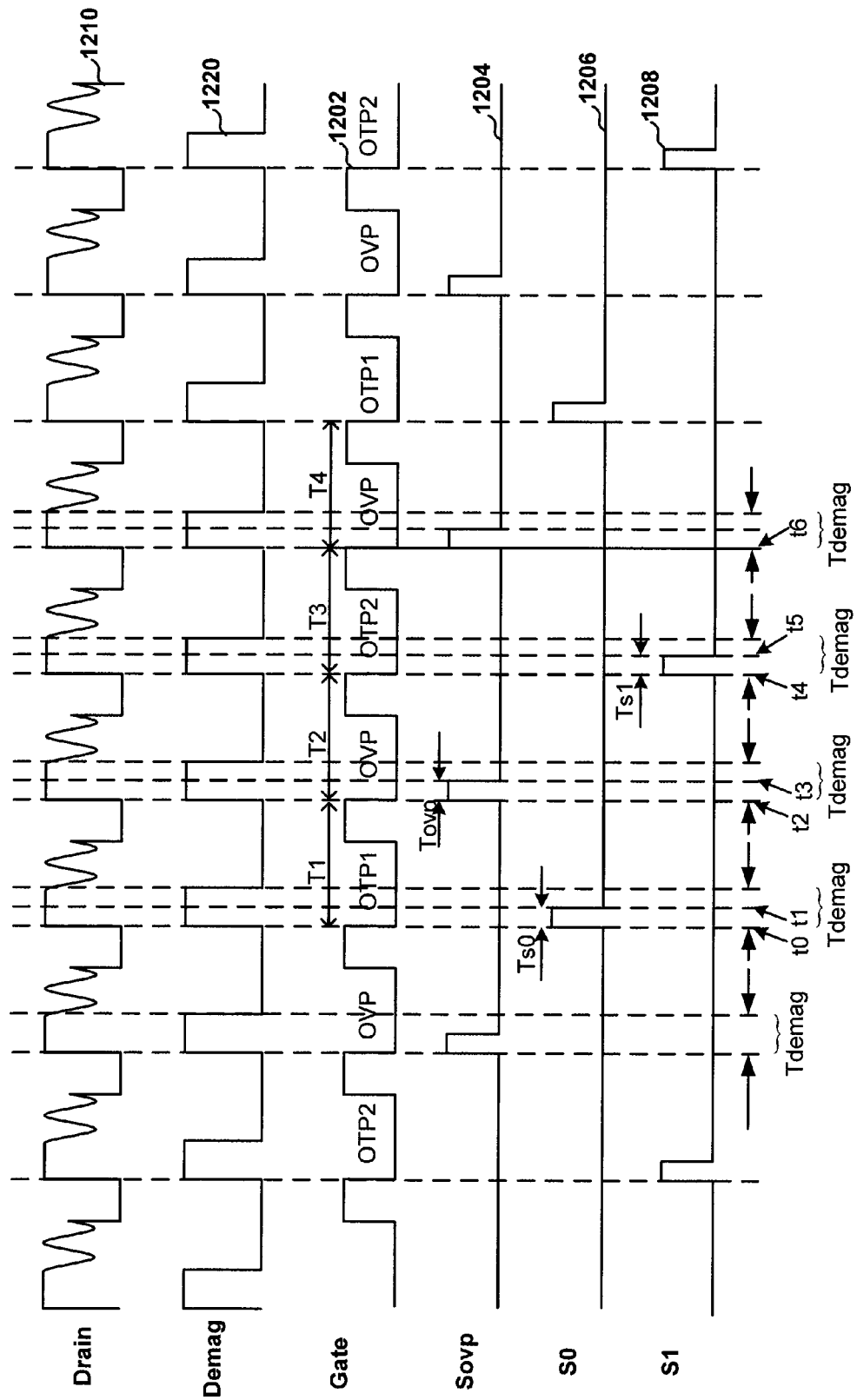
FIG. 12 is a simplified timing diagram for the power converter as shown in FIG. 10 in the DCM mode according to one embodiment of the present invention.

FIG. 12 is a simplified timing diagram for the power converter 1000 in the DCM mode according to one embodiment of the present invention. This diagram is merely an example, which should not unduly limit the scope of the claims. One of ordinary skill in the art would recognize many variations, alternatives, and modifications. The waveform 1202 represents the drive signal 1031 as a function of time, the waveform 1204 represents the switching signal 1154 (e.g., $S_{ovp}$) as a function of time, the waveform 1206 represents the switching signal 1150 (e.g., $S_0$) as a function of time, and the waveform 1208 represents the switching signal 1152 (e.g., $S_1$) as a function of time. Additionally, the waveform 1210 represents the drain voltage of the switch 1040 as a function of time, and the waveform 1220 represents the demagnetization signal 1037 as a function of time.

As shown in FIG. 12, there are at least three switching periods $T_1$, $T_2$, and $T_3$. For example, the switching period $T_1$ starts at time $t_0$ and ends at time $t_2$, the switching period $T_2$ starts at the time $t_2$ and ends at time $t_4$, and the switching period $T_3$ starts at the time $t_4$ and ends at time $t_6$. In another example, a time period $T_{S0}$ within the first switching period $T_1$ starts at the time $t_0$ and ends at time $t_1$, a time period $T_{OVP}$ within the second switching period $T_2$ starts at the time $t_2$ and ends at time $t_3$, and a time period $T_{S1}$ within the third switching period $T_3$ starts at the time $t_4$ and ends at time $t_5$. In another example, $t_0 \leq t_1 \leq t_2 \leq t_3 \leq t_4 \leq t_5 \leq t_6$.

In one embodiment, the OVP detection and the OTP detection are performed alternately during different switching periods, and the demagnetization detection is performed in every switching period. For example, the OTP detection is performed during the switching periods $T_1$ and $T_3$, the OVP detection is performed during the switching period $T_2$, and the demagnetization detection is performed during each of these switching periods $T_1$, $T_2$, and $T_3$. In another example, after the switching periods $T_1$, $T_2$, and $T_3$, the OVP detection, the OTP detection, and the demagnetization detection are also performed during the next three switching periods in the same way as during the switching periods $T_1$, $T_2$, and $T_3$. In yet another example, as shown by the waveform 1220, the demagnetization signal 1037 is at the logic high level during each of the demagnetization periods (e.g., during each $T_{demag}$), and the demagnetization signal 1037 is at the logic low level outside the demagnetization periods.

As shown by the waveform 1202, at the beginning of the switching period $T_1$ (e.g., at $t_0$), the drive signal 1031 changes from a logic high level to a logic low level, and the switch 1040 is opened (e.g., being turned off) according to one embodiment. For example, as shown by the waveform 1206, at the beginning of the switching period $T_1$ (e.g., at $t_0$), the switching signal 1150 (e.g., $S_0$) changes from the logic low level to the logic high level and then remains at the logic high level during the time period $T_{S0}$ (e.g., until $t_1$) so that the switches 1136 and 1142 are closed (e.g., being turned on). In another example, as shown in FIG. 11, the current-source component 1132 provides a current 1160 (e.g., $I_{OTP0}$) for OTP detection when the switches 1136 and 1142 are closed (e.g., being turned on).

As shown by the waveform 1202, at the beginning of the switching period $T_2$ (e.g., at $t_2$), the drive signal 1031 changes from the logic high level to the logic low level, and the switch 1040 is opened (e.g., being turned off) according to another embodiment. For example, when the drive signal 1031 is at the logic low level, the voltage signal 1142 is related to the output voltage 1067. In another example, as shown by the waveform 1204, at the beginning of the switching period $T_2$ (e.g., at $t_2$), the switching signal 1154 (e.g., $S_{ovp}$) changes from the logic low level to the logic high level and then remains at the logic high level during the time period $T_{OVP}$ (e.g., until $t_3$) so that the switch 1144 is closed (e.g., being turned on). In yet another example, the current 1188 flows through the resistor 1114 and the terminal 1083 (e.g., PRT), and is received by the OVP detector 1148 for OVP detection.

As shown by the waveform 1202, at the beginning of the switching period $T_3$ (e.g., at $t_4$), the drive signal 1031 changes from the logic high level to the logic low level, and the switch 1040 is opened (e.g., being turned off) according to yet another embodiment. For example, as shown by the waveform 1208, at the beginning of the switching period $T_3$ (e.g., at $t_4$), the switching signal 1152 (e.g., $S_1$) changes from the logic low level to the logic high level and then remains at the logic high level during the time period $T_{S1}$ (e.g., until $t_5$) so that the switches 1138 and 1140 are closed (e.g., being turned on). In yet another example, the current-source component 1134 provides a current 1158 (e.g., $I_{OTP1}$) for OTP detection when the switches 1138 and 1140 are closed (e.g., being turned on).

In one embodiment, the OTP detection is achieved based on at least information associated with a voltage signal 1184. For example, the current 1188 (e.g., $I_{OVP}$) is determined as follows:

$$I_{OVP} = \frac{V_2 - V_1}{R_{OVP}} \qquad \text{(Equation 31)}$$

where $V_1$ represents the voltage signal 1184, $V_2$ represents the voltage signal 1142, and $R_{OVP}$ represents the resistance of the resistor 1114. In another example, the voltage signal 1184 is determined as follows:

$$V_1 = V_D + (I_{OVP} + I_{OTP}) \times R_T \qquad \text{(Equation 32)}$$

where $V_D$ represents a turn-on voltage (e.g., a forward voltage) of the diode 1116, $I_{OTP}$ represents the current 1186, and $R_T$ represents the resistance of the resistor 1118. In yet another example, combining Equations 31 and 32, the voltage signal 1184 is determined as follows:

$$V_1 = \qquad \text{(Equation 33)}$$
$$\frac{R_{OVP}}{R_{OVP} + R_T} \times V_D + \frac{R_T}{R_{OVP} + R_T} \times V_2 + \frac{R_T \times R_{OVP}}{R_{OVP} + R_T} \times I_{OTP}$$

Assuming the turn-on voltage (e.g., a forward voltage) of the diode 1116 does not change with the current 1186, a change of the voltage signal 1184 between different time periods for OTP detection is determined as follows, according to certain embodiments:

$$\Delta V_1 = V_1(S_0) - V_1(S_1) = \frac{R_T \times R_{OVP}}{R_{OVP} + R_T} \times \Delta I_{OTP} \qquad \text{(Equation 34)}$$

where $V_1(S_0)$ represents a magnitude of the voltage signal 1184 during the time period $T_{S0}$, $V_1(S_1)$ represents a magnitude of the voltage signal 1184 during the time period $T_{S1}$, and $\Delta I_{OTP}$ represents a change of the current 1186 between the time periods $T_{S0}$ and $T_{S1}$. For example, the change of the current 1186 between the time periods $T_{S0}$ and $T_{S1}$ is determined as follows:

$$\Delta I_{OTP} = I_{OTP0} - I_{OTP1} \qquad \text{(Equation 35)}$$

where $I_{OTP0}$ represents the current 1160, and $I_{OTP1}$ represents the current 1158.

Figure 13:
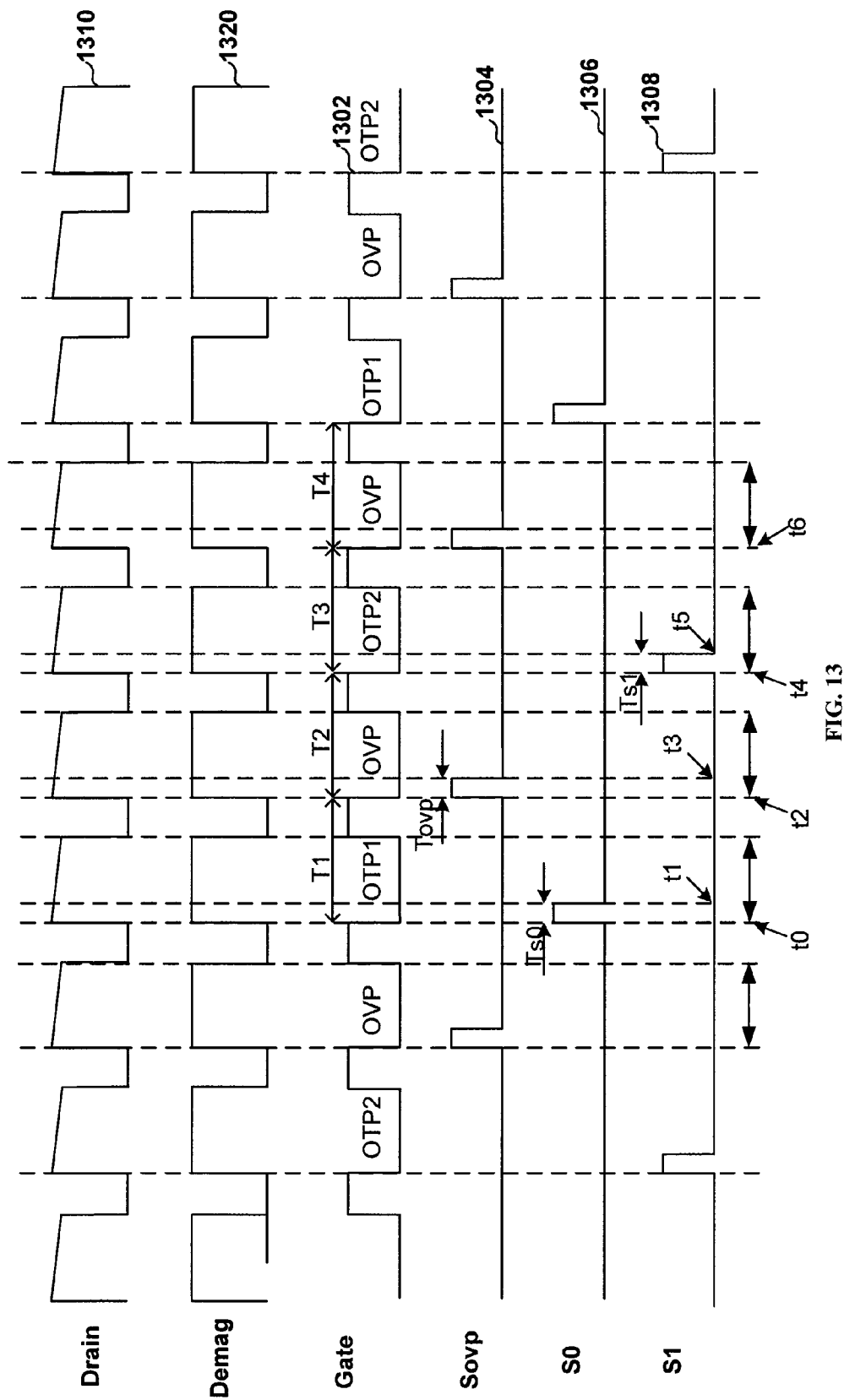
FIG. 13 is a simplified timing diagram for the power converter as shown in FIG. 10 in the CCM mode according to another embodiment of the present invention.

FIG. 13 is a simplified timing diagram for the power converter 1000 in the CCM mode according to another embodiment of the present invention. This diagram is merely an example, which should not unduly limit the scope of the claims. One of ordinary skill in the art would recognize many variations, alternatives, and modifications. The waveform 1302 represents the drive signal 1031 as a function of time, the waveform 1304 represents the switching signal 1154 (e.g., $S_{ovp}$) as a function of time, the waveform 1306 represents the switching signal 1150 (e.g., $S_0$) as a function of time, and the waveform 1308 represents the switching signal 1152 (e.g., $S_1$) as a function of time.

Additionally, the waveform 1310 represents the drain voltage of the switch 1040 as a function of time, and the waveform 1320 represents the demagnetization signal 1037 as a function of time.

As shown in FIG. 13, there are at least three switching periods $T_1$, $T_2$, and $T_3$. For example, the switching period $T_1$ starts at time $t_0$ and ends at time $t_2$, the switching period $T_2$ starts at the time $t_2$ and ends at time $t_4$, and the switching period $T_3$ starts at the time $t_4$ and ends at time $t_6$. In another example, a time period $T_{S0}$ within the first switching period $T_1$ starts at the time $t_0$ and ends at time $t_1$, a time period $T_{OVP}$ within the second switching period $T_2$ starts at the time $t_2$ and ends at time $t_3$, and a time period $T_{S1}$ within the third switching period $T_3$ starts at the time $t_4$ and ends at time $t_5$. In another example, $t_0 \leq t_1 \leq t_2 \leq t_3 \leq t_4 \leq t_5 \leq t_6$.

In one embodiment, the OVP detection and the OTP detection are performed alternately during different switching periods, and the demagnetization detection is performed in every switching period. For example, the OTP detection is performed during the switching periods $T_1$ and $T_3$, the OVP detection is performed during the switching period $T_2$, and the demagnetization detection is performed during each of these switching periods $T_1$, $T_2$, and $T_3$. In another example, after the switching periods $T_1$, $T_2$, and $T_3$, the OVP detection, the OTP detection, and the demagnetization detection are also performed during the next three switching periods in the same way as during the switching periods $T_1$, $T_2$, and $T_3$. In yet another example, as shown by the waveform 1320, the demagnetization signal 1037 is at the logic high level during each of the demagnetization periods (e.g., during each $T_{demag}$), and the demagnetization signal 1037 is at the logic low level outside the demagnetization periods.

As shown by the waveform 1302, at the beginning of the switching period $T_1$ (e.g., at $t_0$), the drive signal 1031 changes from a logic high level to a logic low level, and the switch 1040 is opened (e.g., being turned off) according to one embodiment. For example, as shown by the waveform 1306, at the beginning of the switching period $T_1$ (e.g., at $t_0$), the switching signal 1150 (e.g., $S_0$) changes from the logic low level to the logic high level and then remains at the logic high level during the time period $T_{S0}$ (e.g., until $t_1$) so that the switches 1136 and 1142 are closed (e.g., being turned on). In another example, as shown in FIG. 11, the current-source component 1132 provides a current 1160 (e.g., $I_{OTP0}$) for OTP detection when the switches 1136 and 1142 are closed (e.g., being turned on).

As shown by the waveform 1302, at the beginning of the switching period $T_2$ (e.g., at $t_2$), the drive signal 1031 changes from the logic high level to the logic low level, and the switch 1040 is opened (e.g., being turned off) according to another embodiment. For example, when the drive signal 1031 is at the logic low level, the voltage signal 1142 is related to the output voltage 1067. In another example, as shown by the waveform 1304, at the beginning of the switching period $T_2$ (e.g., at $t_2$), the switching signal 1154 (e.g., $S_{ovp}$) changes from the logic low level to the logic high level and then remains at the logic high level during the time period $T_{OVP}$ (e.g., until $t_3$) so that the switch 1144 is closed (e.g., being turned on). In yet another example, the current 1188 flows through the resistor 1114 and the terminal 1083 (e.g., PRT), and is received by the OVP detector 1148 for OVP detection.

As shown by the waveform 1302, at the beginning of the switching period $T_3$ (e.g., at $t_4$), the drive signal 1031 changes from the logic high level to the logic low level, and the switch 1040 is opened (e.g., being turned off) according to yet another embodiment. For example, as shown by the waveform 1308, at the beginning of the switching period $T_3$ (e.g., at $t_4$), the switching signal 1152 (e.g., $S_1$) changes from the logic low level to the logic high level and then remains at the logic high level during the time period $T_{S1}$ (e.g., until $t_5$) so that the switches 1138 and 1140 are closed (e.g., being turned on). In yet another example, the current-source component 1134 provides a current 1158 (e.g., $I_{OTP1}$) for OTP detection when the switches 1138 and 1140 are closed (e.g., being turned on).

In one embodiment, the OTP detection is achieved based on at least information associated with the voltage signal 1184. For example, the current 1188 (e.g., $I_{OVP}$) is determined according to Equation 31. In another example, the voltage signal 1184 is determined according to Equation 32. In yet another example, combining Equations 31 and 32, the voltage signal 1184 is determined according to Equation 33. In another embodiment, assuming the turn-on voltage (e.g., a forward voltage) of the diode 1116 does not change with the current 1186, a change of the voltage signal 1184 between different time periods for OTP detection is determined according to Equation 34. For example, the change of the current 1186 between the time periods $T_{S0}$ and $T_{S1}$ is determined according to Equation 35.

As discussed above and further emphasized here, FIGS. 11, 12, and 13 are merely examples, which should not unduly limit the scope of the claims. One of ordinary skill in the art would recognize many variations, alternatives, and modifications. For example, the time period $T_{OVP}$ precedes both the time period $T_{S0}$ and the time period $T_{S1}$. In another example, the time period $T_{OVP}$ follows both the time period $T_{S0}$ and the time period $T_{S1}$. In yet another example, the switching period $T_3$ that includes the time period $T_{S1}$ immediately follows the switching period $T_1$ that includes the time period $T_{S0}$. In yet another example, the switching period $T_1$ that includes the time period $T_{S0}$ immediately follows the switching period $T_3$ that includes the time period $T_{S1}$. In yet another example, the switching period $T_3$ that includes the time period $T_{S1}$ is separated from the switching period $T_1$ that includes the time period $T_{S0}$ by one or more switching periods. In yet another example, the switching period $T_2$ that includes the time period $T_{OVP}$ immediately follows the switching period $T_3$ that includes the time period $T_{S1}$. In yet another example, the switching period $T_2$ that includes the time period $T_{OVP}$ is separated from the switching period $T_1$ that includes the time period $T_{S0}$ by one or more switching periods. In yet another example, the switching period $T_2$ that includes the time period $T_{OVP}$ is separated from the switching period $T_3$ that includes the time period $T_{S1}$ by one or more switching periods.

Figure 14:
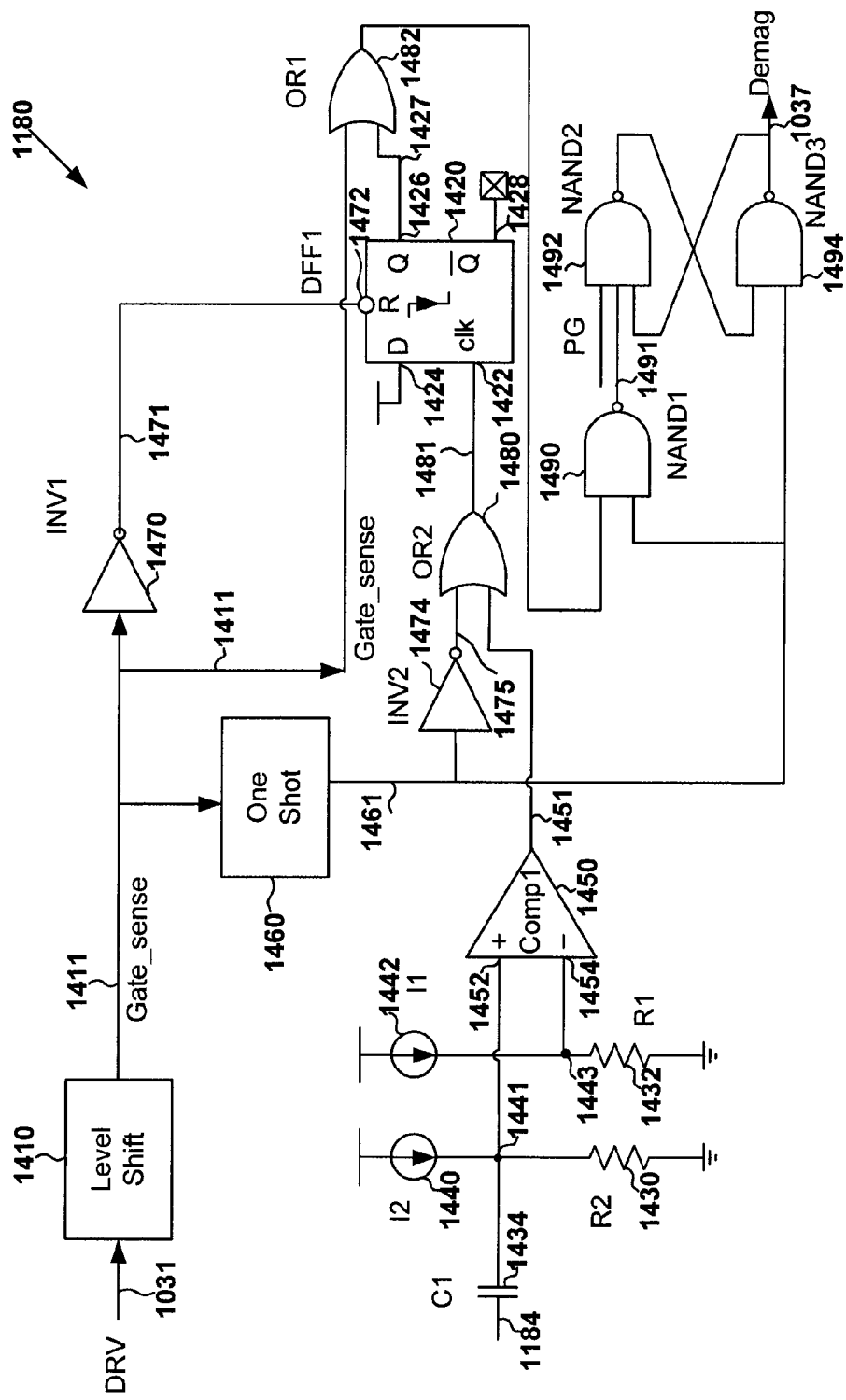
FIG. 14 is a simplified diagram showing certain components of the demagnetization detector as part of the detection component of the power converter as shown in FIG. 10 according to one embodiment of the present invention.

FIG. 14 is a simplified diagram showing certain components of the demagnetization detector 1180 as part of the detection component 1032 of the power converter 1000 according to one embodiment of the present invention. This diagram is merely an example, which should not unduly limit the scope of the claims. One of ordinary skill in the art would recognize many variations, alternatives, and modifications. The demagnetization detector 1180 includes a level shift component 1410, a flip flop component 1420, resistors 1430 and 1432, a capacitor 1434, current sources 1440 and 1442, a comparator 1450, a one-shot signal generator 1460, NOT gates 1470 and 1474, OR gates 1480 and 1482, and NAND gates 1490, 1492, and 1494. For example, a signal differential component includes the capacitor 1434 and the resistor 1430. In another example, a signal processing component includes the level shift component 1410, the flip flop component 1420, the one-shot signal generator 1460, the NOT gates 1470 and 1474, the OR gates 1480 and 1482, and the NAND gates 1490, 1492, and 1494.

In one embodiment, the level shift component 1410 receives the drive signal 1031 and generates a signal 1411. For example, the drive signal 1031 is a high-voltage signal, which is converted to a low-voltage signal, and the low-voltage signal is the signal 1411. In another example, the signal 1411 is received by the one-shot signal generator 1460, the NOT gate 1470, and the OR gate 1482. In another embodiment, the one-shot signal generator 1460 receives the signal 1411 and generates a pulse signal 1461. For example, if the signal 1411 changes from a logic high level to a logic low level, the one-shot signal generator 1460 generates a pulse (e.g., a negative pulse) in the pulse signal 1461. In another example, the pulse signal 1461 is at the logic high level outside any pulse, and is at the logic low level within a pulse. In yet another example, a pulse (e.g., a negative pulse) of the pulse signal 1461 is used to screen a high-frequency oscillation component of the voltage signal 1184. In another example, this high-frequency oscillation component of the voltage signal 1184 is generated by the leakage inductance and the parasitic capacitance of the switch 1040 when the switch 1040 is just opened (e.g., turned off).

In another embodiment, the pulse signal 1461 is received by the NOT gate 1474 and the NAND gates 1490 and 1494. For example, the NOT gate 1474 generates a signal 1475 in response to the pulse signal 1461, and outputs the signal 1475 to the OR gate 1480. In another example, the OR gate 1480 receives the signal 1475 and also receives a comparison signal 1451 from the comparator 1450, and generates a signal 1481.

As shown in FIG. 14, for both the DCM mode and the CCM mode, the beginning of the demagnetization period is determined by detecting the falling edge of the drive signal 1031. For example, under the DCM mode, the end of the demagnetization period is determined by using at least the capacitor 1434, the resistors 1430 and 1432, the current sources 1440 and 1442, the comparator 1450, the OR gate 1480, and the flip flop component 1420 to output a signal 1427 to the OR gate 1482. In another example, under the CCM mode, the end of the demagnetization period is determined by using the signal 1411 that is received by the OR gate 1482.

According to one embodiment, under the DCM mode, the capacitor 1434, the resistors 1430 and 1432, the current sources 1440 and 1442, and the comparator 1450 are used to determine the end of the demagnetization period within each switching period. For example, the comparator 1450 includes a terminal 1452 (e.g., the "+" terminal) and a terminal 1454 (e.g., the "−" terminal). In another example, the terminal 1452 (e.g., the "+" terminal) receives a voltage signal 1441, and the terminal 1454 (e.g., the "−" terminal) receives a voltage signal 1443. In yet another example, the comparator 1450, in response, outputs the comparison signal 1451 to the OR gate 1480, which generates the signal 1481.

According to another embodiment, during the demagnetization period, the voltage signal 1441 is larger than the voltage signal 1443 in magnitude. For example, during the demagnetization period, $$V_A = I_2 \times R_2 \quad \text{(Equation 36)}$$

$$V_B = I_1 \times R_1 \quad \text{(Equation 37)}$$

$$V_A - V_B = V_{os} > 0 \quad \text{(Equation 38)}$$

where $V_A$ represents the voltage signal 1441, and $V_B$ represents the voltage signal 1443. Additionally, $I_2$ represents the current that is provided by the current source 1440, and I₁ represents the current that is provided by the current source 1442. Also, $V_{os}$ represents the voltage signal 1441 subtracted by the voltage signal 1443. In another example, during the demagnetization period, $V_{os}$ is larger than zero (e.g., about 150 mV), and the comparison signal 1451 is at the logic high level.

According to yet another embodiment, at the end of the demagnetization period, the differential circuit that includes the capacitor 1434 and the resistor 1430 generates a negative pulse, which has a negative magnitude. For example, this negative pulse causes the comparison signal 1451 to change from the logic high level to the logic low level. In another example, the comparison signal 1451 is received by the OR gate 1480, which also generates the signal 1481. In yet another example, the change of the comparison signal 1451 from the logic high level to the logic low level causes the signal 1481 to change from the logic high level to the logic low level.

As shown in FIG. 14, the flip flop component 1420 (e.g., a falling-edge-triggered D flip flop that is reset at the logic low level) includes a terminal 1422 (e.g., the "clk" terminal), a terminal 1424 (e.g., the "D" terminal), a terminal 1426 (e.g., the "Q" terminal), a terminal 1428 (e.g., the "$\overline{Q}$" terminal), and a terminal 1472 (e.g., the "R" terminal). For example, the terminal 1472 receives a signal 1471 from the NOT gate 1470, which also receives the signal 1411. In another example, the terminal 1424 receives a predetermined voltage at the logic high level. In yet another example, the terminal 1422 receives the signal 1481.

In one embodiment, if the terminal 1424 receives the predetermined voltage at the logic high level and if the signal 1481 changes from the logic high level to the logic low level, the flip flop component 1420 (e.g., a falling-edge-triggered D flip flop) outputs the signal 1427 at the logic high level through the terminal 1426. In another embodiment, the signal 1427 at the logic high level is received by the OR gate 1482 and is used by the OR gate 1482 and the NAND gate 1490 to reset an RS flip flop that includes the NAND gates 1492 and 1494 in order to indicate the end of the demagnetization period under the DCM mode. For example, the NAND gate 1494 outputs the demagnetization signal 1037.

According to another embodiment, under the CCM mode, the comparison signal 1451 of the comparator 1450 remains at the logic high level during the entire time period when the drive signal 1031 is at the logic low level. For example, when the drive signal 1031 changes from the logic low level to the logic high level, the signal 1411 also changes from the logic low level to the logic high level, and is used by the OR gate 1482 and the NAND gate 1490 to reset an RS flip flop that includes the NAND gates 1492 and 1494 in order to indicate the end of the demagnetization period under the CCM mode. In another example, the NAND gate 1494 outputs the demagnetization signal 1037.

As discussed above and further emphasized here, FIG. 14 is merely an example, which should not unduly limit the scope of the claims. One of ordinary skill in the art would recognize many variations, alternatives, and modifications. For example, for both the DCM mode and the CCM mode, the beginning of the demagnetization period is determined by detecting the rising edge of the voltage signal 1184.

Figure 15:
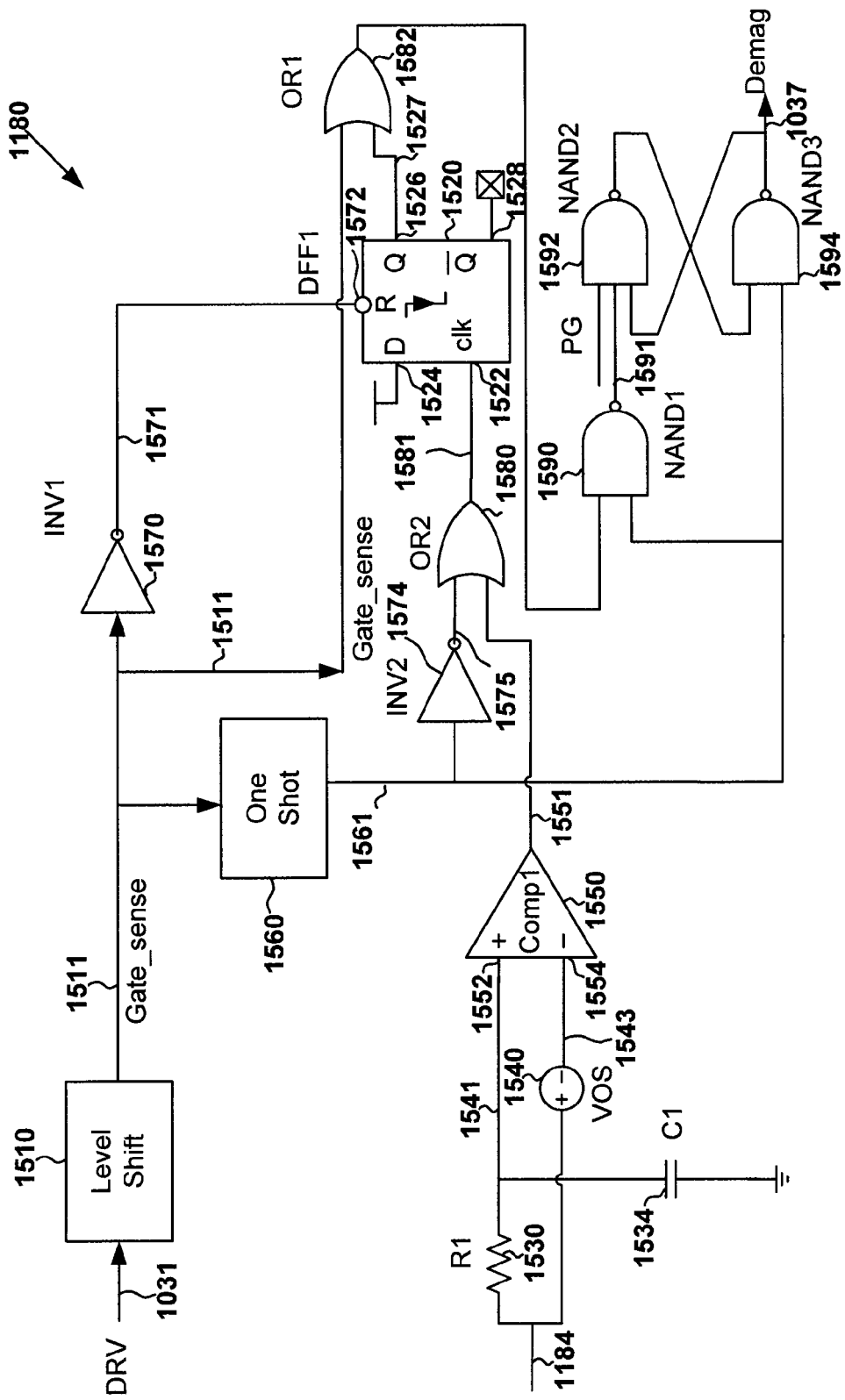
FIG. 15 is a simplified diagram showing certain components of the demagnetization detector as part of the detection component of the power converter as shown in FIG. 10 according to another embodiment of the present invention.

FIG. 15 is a simplified diagram showing certain components of the demagnetization detector 1180 as part of the detection component 1032 of the power converter 1000 according to another embodiment of the present invention. This diagram is merely an example, which should not unduly limit the scope of the claims. One of ordinary skill in the art would recognize many variations, alternatives, and modifications. The demagnetization detector 1180 includes a level shift component 1510, a flip flop component 1520, a resistor 1530, a capacitor 1534, a voltage compensation component 1540, a comparator 1550, a one-shot signal generator 1560, NOT gates 1570 and 1574, OR gates 1580 and 1582, and NAND gates 1590, 1592, and 1594. For example, a signal processing component includes the level shift component 1510, the flip flop component 1520, the one-shot signal generator 1560, the NOT gates 1570 and 1574, the OR gates 1580 and 1582, and the NAND gates 1590, 1592, and 1594.

In one embodiment, the level shift component 1510 receives the drive signal 1031 and generates a signal 1511. For example, the drive signal 1031 is a high-voltage signal, which is converted to a low-voltage signal, and the low-voltage signal is the signal 1511. In another example, the signal 1511 is received by the one-shot signal generator 1560, the NOT gate 1570, and the OR gate 1582. In another embodiment, the one-shot signal generator 1560 receives the signal 1511 and generates a pulse signal 1561. For example, if the signal 1511 changes from a logic high level to a logic low level, the one-shot signal generator 1560 generates a pulse (e.g., a negative pulse) in the pulse signal 1561. In another example, the pulse signal 1561 is at the logic high level outside any pulse, and is at the logic low level within a pulse. In yet another example, a pulse (e.g., a negative pulse) of the pulse signal 1561 is used to screen a high-frequency oscillation component of the voltage signal 1184. In another example, this high-frequency oscillation component of the voltage signal 1184 is generated by the leakage inductance and the parasitic capacitance of the switch 1040 when the switch 1040 is just opened (e.g., turned off).

In another embodiment, the pulse signal 1561 is received by the NOT gate 1574 and the NAND gates 1590 and 1594. For example, the NOT gate 1574 generates a signal 1575 in response to the pulse signal 1561, and outputs the signal 1575 to the OR gate 1580. In another example, the OR gate 1580 receives the signal 1575 and also receives a comparison signal 1551 from the comparator 1550, and generates a signal 1581.

As shown in FIG. 15, for both the DCM mode and the CCM mode, the beginning of the demagnetization period is determined by detecting the falling edge of the drive signal 1031. For example, under the DCM mode, the end of the demagnetization period is determined by using at least the capacitor 1534, the resistor 1530, the voltage compensation component 1540, the comparator 1550, the OR gate 1580, and the flip flop component 1520 to output a signal 1527 to the OR gate 1582. In another example, under the CCM mode, the end of the demagnetization period is determined by using the signal 1511 that is received by the OR gate 1582.

According to one embodiment, under the DCM mode, the capacitor 1534, the resistor 1530, the voltage compensation component 1540, and the comparator 1550 are used to determine the end of the demagnetization period within each switching period. For example, the comparator 1550 includes a terminal 1552 (e.g., the "+" terminal) and a terminal 1554 (e.g., the "−" terminal). In another example, the terminal 1552 (e.g., the "+" terminal) receives a voltage signal 1541, and the terminal 1554 (e.g., the "−" terminal) receives a voltage signal 1543. In yet another example, the comparator 1550, in response, outputs the comparison signal 1551 to the OR gate 1580, which generates the signal 1581.

According to another embodiment, the voltage signal 1184 is received by the resistor 1530 and is delayed by the resistor 1530 and the capacitor 1534 to generate the voltage signal 1541. For example, the voltage signal 1541 represents the delayed signal 1184. In another example, the voltage signal 1541 is received by the terminal 1552 of the comparator 1550. According to yet another embodiment, the voltage signal 1184 is received by the voltage compensation component 1540 and is reduced by a predetermined magnitude (e.g., $V_{os}$) to generate the voltage signal 1543. For example, $V_{os}$ is equal to about 150 mV. In another example, the voltage signal 1543 represents the reduced signal 1184. In another example, the voltage signal 1543 is received by the terminal 1554 of the comparator 1550.

As shown in FIG. 15, the comparator 1550 receives the voltage signals 1541 and 1543, and generates the comparison signal 1551. For example, at the end of the demagnetization period, the later voltage 1184 becomes smaller than the earlier voltage 1184 by the predetermined magnitude (e.g., $V_{os}$), and the comparison signal 1551 changes from the logic high level to the logic low level. In another example, the comparison signal 1551 is received by the OR gate 1580, which also generates the signal 1581. In yet another example, the change of the comparison signal 1551 from the logic high level to the logic low level causes the signal 1581 to change from the logic high level to the logic low level.

As shown in FIG. 15, the flip flop component 1520 (e.g., a falling-edge-triggered D flip flop that is reset at the logic low level) includes a terminal 1522 (e.g., the "clk" terminal), a terminal 1524 (e.g., the "D" terminal), a terminal 1526 (e.g., the "Q" terminal), a terminal 1528 (e.g., the "Q" terminal), and a terminal 1572 (e.g., the "R" terminal). For example, the terminal 1572 receives a signal 1571 from the NOT gate 1570, which also receives the signal 1511. In another example, the terminal 1524 receives a predetermined voltage at the logic high level. In yet another example, the terminal 1522 receives the signal 1581.

In one embodiment, if the terminal 1524 receives the predetermined voltage at the logic high level and if the signal 1581 changes from the logic high level to the logic low level, the flip flop component 1520 (e.g., a falling-edge-triggered D flip flop) outputs the signal 1527 at the logic high level through the terminal 1526. In another embodiment, the signal 1527 at the logic high level is received by the OR gate 1582 and is used by the OR gate 1582 and the NAND gate 1590 to reset an RS flip flop that includes the NAND gates 1592 and 1594 in order to indicate the end of the demagnetization period under the DCM mode. For example, the NAND gate 1594 outputs the demagnetization signal 1037.

According to another embodiment, under the CCM mode, the comparison signal 1551 of the comparator 1550 remains at the logic high level during the entire time period when the drive signal 1031 is at the logic low level. For example, when the drive signal 1031 changes from the logic low level to the logic high level, the signal 1511 also changes from the logic low level to the logic high level, and is used by the OR gate 1582 and the NAND gate 1590 to reset an RS flip flop that includes the NAND gates 1592 and 1594 in order to indicate the end of the demagnetization period under the CCM mode. In another example, the NAND gate 1594 outputs the demagnetization signal 1037.

As discussed above and further emphasized here, FIG. 15 is merely an example, which should not unduly limit the scope of the claims. One of ordinary skill in the art would recognize many variations, alternatives, and modifications. For example, for both the DCM mode and the CCM mode, the beginning of the demagnetization period is determined by detecting the rising edge of the voltage signal 1184. In another example, the level shift component 1510, the flip flop component 1520, the comparator 1550, the one-shot signal generator 1560, the NOT gates 1570 and 1574, the OR gates 1580 and 1582, and the NAND gates 1590, 1592, and 1594 as shown in FIG. 15 are the same as, respectively, the level shift component 1410, the flip flop component 1420, the comparator 1450, the one-shot signal generator 1460, the NOT gates 1470 and 1474, the OR gates 1480 and 1482, and the NAND gates 1490, 1492, and 1494 as shown in FIG. 14.

Figure 16:
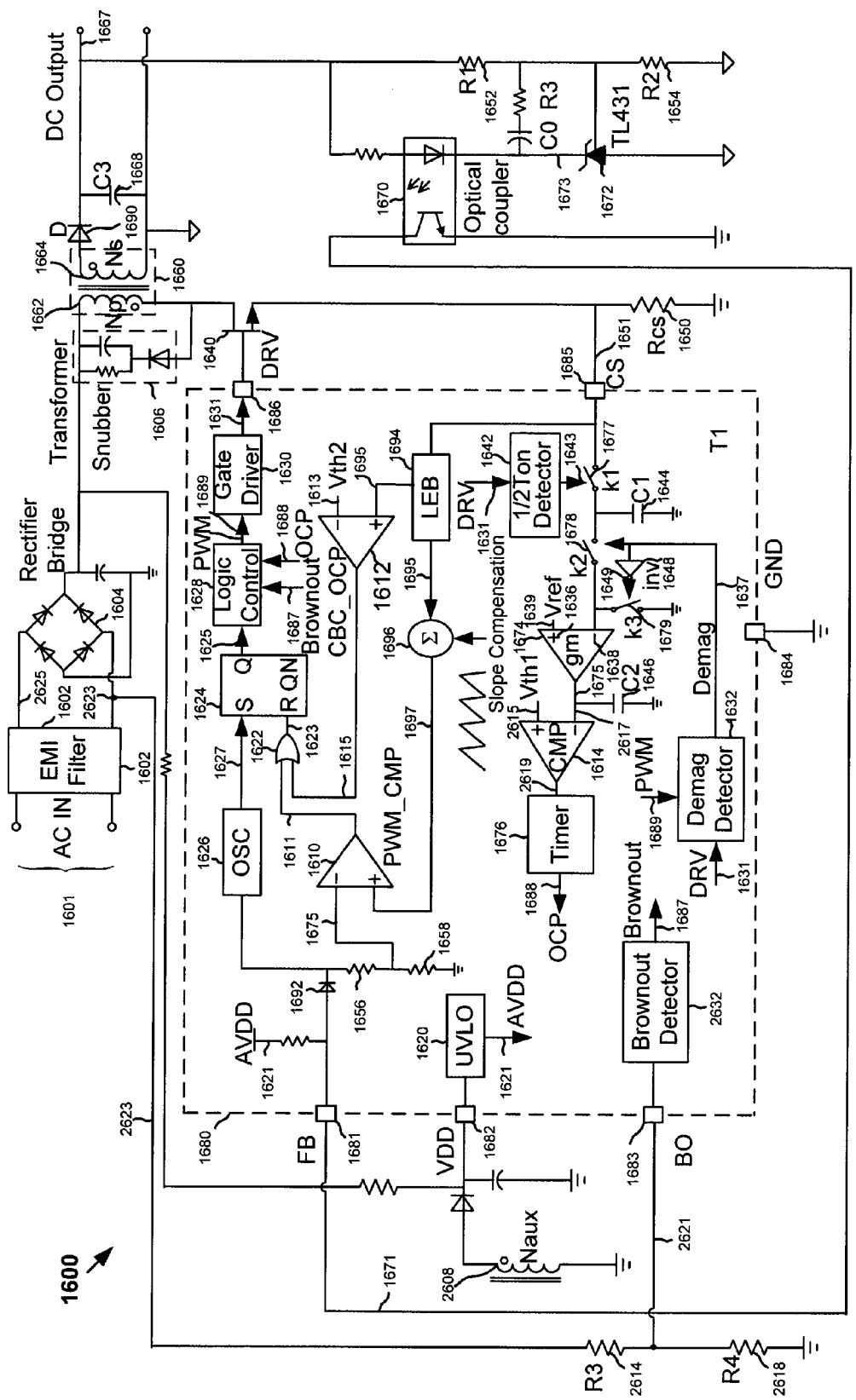
FIG. 16 is a simplified power converter with over-current protection according to another embodiment of the present invention.

FIG. 16 is a simplified power converter with over-current protection according to another embodiment of the present invention. This diagram is merely an example, which should not unduly limit the scope of the claims. One of ordinary skill in the art would recognize many variations, alternatives, and modifications. The power converter 1600 (e.g., a power conversion system) includes an EMI filer 1602, a rectifier bridge 1604, a snubber circuit 1606, comparators 1610, 1612, and 1614, an under-voltage lock-out (UVLO) component 1620, an OR gate 1622, a flip flop component 1624, an oscillator 1626, and a logic control component 1628, a gate driver 1630, a demagnetization detector 1632, a switch 1640, a detector component 1642, capacitors 1644 and 1646, a NOT gate 1648, resistors 1650, 1652, 1654, 1656, and 1658, a transformer 1660, an output capacitor 1668, an optical coupler 1670, an adjustable regulator 1672 (e.g., TL431), a transconductance amplifier 1674, a timer component 1676, switches 1677, 1678, and 1679, diodes 1690 and 1692, a leading-edge-blanking (LEB) component 1694, a slope compensation component 1696, an auxiliary winding 2608, and a detection component 2632.

For example, the switch 1640 includes a field effect transistor (e.g., a power MOSFET). In another example, the switch 1640 includes a bipolar junction transistor. In yet another example, the resistor 1650 is used as a current-sensing resistor. In yet another example, the transformer 1660 includes a primary winding 1662 and a secondary winding 1664, and the secondary winding 1664 is coupled to both the primary winding 1662 and the auxiliary winding 2608. In yet another example, the diode 1690 is used as a rectifying diode. In yet another example, the LEB component 1694 is removed from the power converter 1600.

In one embodiment, the comparators 1610, 1612, and 1614, the resistors 1656 and 1658, the under-voltage lock-out (UVLO) component 1620, the OR gate 1622, the flip flop component 1624, the oscillator 1626, the logic control component 1628, the gate driver 1630, the demagnetization detector 1632, the detector component 1642, the capacitors 1644 and 1646, the NOT gate 1648, the transconductance amplifier 1674, the timer component 1676, the switches 1677, 1678, and 1679, the diode 1692, the slope compensation component 1696, and the detection component 2632 are parts of a chip 1680 (e.g., a system controller) for PWM control.

In another embodiment, the chip 1680 for PWM control includes a terminal 1681 (e.g., FB), a terminal 1682 (e.g., VDD), a terminal 1683 (e.g., BO), a terminal 1684 (e.g., GND), a terminal 1685 (e.g., CS), and a terminal 1686 (e.g., DRV). For example, the under-voltage lock-out (UVLO) component 1620 of the chip 1680 receives a chip supply voltage at the terminal 1682, and in response, generates an internal supply voltage 1621 (e.g., AVDD). In another example, the internal supply voltage is equal to about 5 volts. In yet another embodiment, the chip 1680 (e.g., a system controller) includes a modulation component that includes the flip flop component 1624 and the logic control component 1628, and the chip 1080 also includes a drive component that includes the gate driver 1630.

In yet another embodiment, the chip 1680 (e.g., a system controller) includes a modulation component that includes the flip flop component 1624 and the logic control component 1628, and the chip 1680 also includes a drive component that includes the gate driver 1630. In yet another embodiment, the chip 1680 (e.g., a system controller) includes an over-current-protection component that includes the comparator 1614, the detector component 1642, the capacitors 1644 and 1646, the NOT gate 1648, the transconductance amplifier 1674, the timer component 1676, and the switches 1677, 1678, and 1679. For example, a sample-and-hold component includes the detector component 1642, the capacitor 1644, and the switch 1677. In another example, an integration component includes the capacitor 1646, the NOT gate 1648, the transconductance amplifier 1674, and the switches 1678 and 1679.

According to one embodiment, the power converter 1600 generates an output voltage 1667 (e.g., a DC output voltage). For example, if the output voltage 1667 changes, this change of the output voltage 1667 is processed by a voltage divider including the resistors 1652 and 1654, and is conveyed to the adjustable regulator 1672 (e.g., TL431). In response, the adjustable regulator 1672 (e.g., TL431) generates a current signal 1673, which is received by the optical coupler 1670 according to one embodiment. The optical coupler 1670, in response, outputs a feedback signal 1671 to the chip 1680 through the terminal 1681 (e.g., FB) according to another embodiment. In another example, the feedback signal 1671 is converted into a signal 1675 by the diode 1692 and a voltage divider including the resistors 1656 and 1658.

According to another embodiment, when the switch 1640 is closed (e.g., turned on), the primary current of the primary winding 1662 flows through the resistor 1650 (e.g., a current-sensing resistor), which in response generates a voltage signal 1651. For example, the voltage signal 1651 is received by the LEB component 1694 of the chip 1680 through the terminal 1685 (e.g., CS). In another example, the LEB component 1694, in response, generates a signal 1695. According to yet another embodiment, the signal 1695 is received by both the comparator 1612 and the slope compensation component 1696. For example, the slope compensation component 1696 processes the signal 1695 and generates a signal 1697. In another example, the signals 1675 and 1697 are received by the comparator 1610, and the signal 1695 and a threshold voltage 1613 (e.g., $V_{th2}$) are received by the comparator 1612.

As shown in FIG. 16, in response, the comparator 1610 generates a comparison signal 1611, and the comparator 1612 generates a comparison signal 1615. For example, the comparison signals 1611 and 1615 are received by the OR gate 1622, which sends a signal 1623 to the flip flop component 1624. In another example, the flip flop component 1624 also receives a clock signal 1627 from the oscillator 1626, and sends a signal 1625 to the logic control component 1628.

In one embodiment, the logic control component 1628 also receives signals 1687 and 1688, and generates a signal 1689 (e.g. a PWM signal). For example, the signal 1689 is sent to the gate driver 1630, which in response generates a drive signal 1631. In another example, the drive signal 1631 is sent to the switch 1640 and used to drive (e.g., turn on or off) the switch 1640. In another embodiment, the comparison signals 1611 and 1615 are used to generate the signal 1623 to control duty cycle of the drive signal 1631. For example, the comparison signal 1611 is used to make the output voltage 1667 (e.g., a DC output voltage) stable. In another example, the comparison signal 1615 is used to ensure the peak magnitude of the primary current that flows through the switch 1640 and the resistor 1650 does not exceed a predetermined threshold during each switching cycle.

As shown in FIG. 16, the EMI filter 1602 receives an AC input voltage 1601 and generates voltage signals 2623 and 2625. For example, the voltage signals 2623 and 2625 are received by the rectifier bridge 1604. In another example, the voltage signal 2623 is also received by a voltage divider that includes the resistors 2614 and 2618. In yet another example, the voltage divider generates a signal 2621.

According to one embodiment, the terminal 1683 of the chip 1680 (e.g., a system controller) is used to achieve brownout protection (BO). For example, the terminal 1683 is configured to receive the signal 2621 (e.g., a voltage signal) from the voltage divider that includes the resistors 2614 and 2618. In another example, the detection component 2632 receives the signal 2621 through the terminal 1683, and outputs a signal 1687 to indicate whether the BO mechanism is triggered based on at least information associated with the signal 2621. In yet another example, the signal 1687 is at the logic high level if the BO mechanism is triggered, and the signal 1687 is at the logic low level if the BO mechanism is not triggered. In yet another example, the brownout protection (BO) is performed to protect the power converter 1600 when the amplitude of the AC input voltage 1601 becomes too small.

According to another embodiment, if the BO mechanism is triggered, the chip 1680 (e.g., a system controller) outputs, at the terminal 1686, the drive signal 1631 to open (e.g., turn off) the switch 1640. For example, the power converter 1600 is shut down and the switch 1640 is kept open. In another example, after being shut down, the power converter 1600 restarts (e.g., automatically or manually) and starts modulation again. In yet another example, the switch 1640 is kept open for a predetermined time period that is larger in duration than a switching period of the power converter 1600.

As shown in FIG. 16, the detection component 1642 receives the drive signal 1631 and generates a signal 1643. For example, the detection component 1642 processes the drive signal 1631 in one or more previous cycles to determine the middle of the on time of a current cycle of the drive signal 1631, and the detection component 1642 also generates a pulse in the signal 1643 at the determined middle of the on time. In another example, the signal 1643 is received by the switch 1677, which is closed during the pulse of the signal 1643 in order to sample the voltage signal 1651 at the middle of the on time. In yet another example, the sampled voltage signal 1651 at the middle of the on time (e.g., $V_{CS\_mid}$) is held on the capacitor 1644.

In one embodiment, the demagnetization detector 1632 receives the signal 1689 and the drive signal 1631 and generates the demagnetization signal 1637. In another example, the demagnetization signal 1637 is received by the switch 1678 and the NOT gate 1648, and in response, the NOT gate 1648 outputs a signal 1649 to the switch 1679. For example, the demagnetization signal 1637 is at a logic high level during the demagnetization period, and is at a logic low level outside the demagnetization period. In yet another example, during the demagnetization period, the switch 1678 is closed and the switch 1679 is open, but outside the demagnetization period, the switch 1678 is open and the switch 1679 is closed.

In another embodiment, the transconductance amplifier 1674 includes terminals 1636 and 1638. For example, the terminal 1636 (e.g., the "+" terminal) receives a reference voltage 1639 (e.g., $V_{ref}$). In another example, the terminal 1638 (e.g., the "−" terminal) is connected to the capacitor 1644 through the closed switch 1678 during the demagnetization period, but the terminal 1638 (e.g., the "−" terminal) is biased to the ground through the closed switch 1679 outside the demagnetization period. In yet another example, the transconductance amplifier 1674 outputs a current 1675 (e.g., $I_c$) to charge or discharge the capacitor 1646.

According to one embodiment, the current 1675 (e.g., $I_c$) is determined as follows:

$$i \; I_c = g_m \lfloor (V_{ref} - V_{CS\_mid}) \times T_{demag} \times (V_{ref} - 0) \times (T - T_{demag}) \rfloor \quad \text{(Equation 39)}$$

$$\text{so } I_c = g_m (V_{ref} \times T - V_{CS\_mid} \times T_{demag}) \quad \text{(Equation 40)}$$

where $I_c$ represents the current 1675 that charges or discharges the capacitor 1646, $g_m$ represents transconductance of the transconductance amplifier 1674, $V_{ref}$ represents the reference voltage 1639, and $V_{CS\_mid}$ represents the sampled voltage signal 1651 at the middle of the on time. Additionally, $T_{demag}$ represents the demagnetization period, and T represents the period of the drive signal 1631.

According to another embodiment, if the current 1675 (e.g., $I_c$) has a positive value according to Equation 40, the current 1675 flows from the transconductance amplifier 1674 to the capacitor 1646 and charges the capacitor 1646. According to yet another embodiment, if the current 1675 (e.g., $I_c$) has a negative value according to Equation 40, the current 1675 flows from the capacitor 1646 to the transconductance amplifier 1674 and discharges the capacitor 1646.

In one embodiment, if $$V_{CS\_mid} \times \frac{T_{demag}}{T} < V_{ref} \quad \text{(Equation 41)}$$

$$\text{then } I_c > 0 \quad \text{(Equation 42)}$$

where the current 1675 charges the capacitor 1646. For example, as shown in Equation 42, the voltage across the capacitor 1646 (e.g., a voltage 2617) is increased by the charging current 1675. In another example, after a time period for charging, the voltage across the capacitor 1646 (e.g., the voltage 2617) becomes so close to the internal supply voltage 1621 (e.g., AVDD) that the capability for the transconductance amplifier 1674 to serve as a current source also becomes close to zero, and eventually the charging current 675 drops to zero in magnitude. In yet another example, if the current 1675 remains positive, then, according to Equations 18 and 20, the following is obtained:

$$I_0 < V_{ref} \times \frac{1}{R_{CS}} \times \frac{N_p}{N_s} \quad \text{(Equation 43)}$$

where $I_0$ represents the average output current of the power converter 1600 in the DCM mode and in the CCM mode; hence the OCP mechanism is not triggered.

In another embodiment, if $$V_{CS\_mid} \times \frac{T_{demag}}{T} > V_{ref} \quad \text{(Equation 44)}$$

$$\text{then } I_c < 0 \quad \text{(Equation 45)}$$

where the current 1675 discharges the capacitor 1646. For example, as shown in Equation 45, the voltage across the capacitor 1646 (e.g., the voltage 2617) is reduced by the discharging current 1675. In another example, after a time period for discharging, the voltage across the capacitor 1646 (e.g., the voltage 2617) becomes so close to zero that the capability for the transconductance amplifier 1674 to serve as a current sink also becomes close to zero, and eventually the discharging current 1675 drops to zero in magnitude. In yet another example, if the current 1675 remains negative for a time period and causes the voltage across the capacitor 1646 (e.g., the voltage 2617) to decrease, approaching zero, then, according to Equations 18 and 22, the following is obtained:

$$I_0 > V_{ref} \times \frac{1}{R_{CS}} \times \frac{N_p}{N_s} \quad \text{(Equation 46)}$$

where $I_0$ represents the average output current in the DCM mode and in the CCM mode; hence the OCP mechanism is triggered.

As shown in FIG. 16, the comparator 1614 receives a threshold voltage 2615 (e.g., $V_{th1}$) and the voltage 2617, and generates an output signal 2619. In one embodiment, if the voltage 2617 becomes smaller than the threshold voltage 2615 (e.g., 3.6 volts), the comparator 1614 changes the output signal 2619 (e.g., from a logic low level to a logic high level). In another embodiment, the timer component 1676 receives the output signal 2619 and generates the signal 1688.

According to one embodiment, in response to the change in the output signal 2619 (e.g., from the logic low level to the logic high level), the timer component 1676 starts counting time to determine whether the output signal 2619 remains unchanged (e.g., at the logic high level) for a predetermined period of time. For example, if the output signal 2619 is determined to have remained unchanged (e.g., at the logic high level) for the predetermined period of time since the output signal 2619 changed (e.g., from the logic low level to the logic high level), the timer component 1676 changes the signal 1688 (e.g., from the logic low level to the logic high level). In another example, if the output signal 2619 is determined not to have remained unchanged (e.g., not to have remained at the logic high level) for the predetermined period of time since the output signal 2619 changed (e.g., from the logic low level to the logic high level), the timer component 1676 does not change the signal 1688 (e.g., the signal 1688 remaining at the logic low level).

According to another embodiment, if the output signal 2619 is determined to have changed from the logic high level back to the logic low level during the predetermined period of time since the output signal 2619 changed from the logic low level to the logic high level, the timer component 1676 resets the timer and the signal 1688 remains at the logic low level. For example, after the output signal 2619 is determined have changed from the logic high level back to the logic low level, if the output signal 2619 again changes from the logic low level to the logic high level, the timer component 1676 again determines whether the output signal 2619 remains unchanged at the logic high level for the predetermined period of time since the output signal 2619 changed from the logic low level to the logic high level. In another example, if the output signal 2619 is determined to have remained unchanged at the logic high level for the predetermined period of time, the timer component 1676 changes the signal 1688 from the logic low level to the logic high level. In yet another example, if the output signal 2619 is determined not to have remained unchanged at the logic high level for the predetermined period of time, the timer component 1676 does not change the signal 1688 and the signal 1688 remains at the logic low level.

According to one embodiment, the signal 1688 is received by the logic control component 1628. For example, if the signal 1688 is at the logic high level, the logic control component 1628 causes the power converter 1600 to shut down and causes the switch 1640 to be kept open. In another example, after being shut down, the power converter 1600 restarts (e.g., automatically or manually) and starts modulation again. In yet another example, the switch 1640 is kept open for a predetermined time period that is larger in duration than a switching period of the power converter 1600. In yet another example, the switch 1640 is kept open for a predetermined time period that is larger in duration than an auto-recovery period of the power converter 1600.

According to another embodiment, the signal 1687 is received by the logic control component 1628. For example, if the signal 1687 is at the logic high level, the logic control component 1628 causes the power converter 1600 to shut down and causes the switch 1640 to be kept open. In another example, after being shut down, the power converter 1600 restarts (e.g., automatically or manually) and starts modulation again. In yet another example, the switch 1640 is kept open for a predetermined time period that is larger in duration than a switching period of the power converter 1600.

As discussed above and further emphasized here, FIG. 16 is merely an example, which should not unduly limit the scope of the claims. One of ordinary skill in the art would recognize many variations, alternatives, and modifications. For example, the voltage signal 2625, instead of the voltage signal 2623, is received by the voltage divider that includes the resistors 2614 and 2618, and the voltage divider generates the signal 2621.

Figure 17:
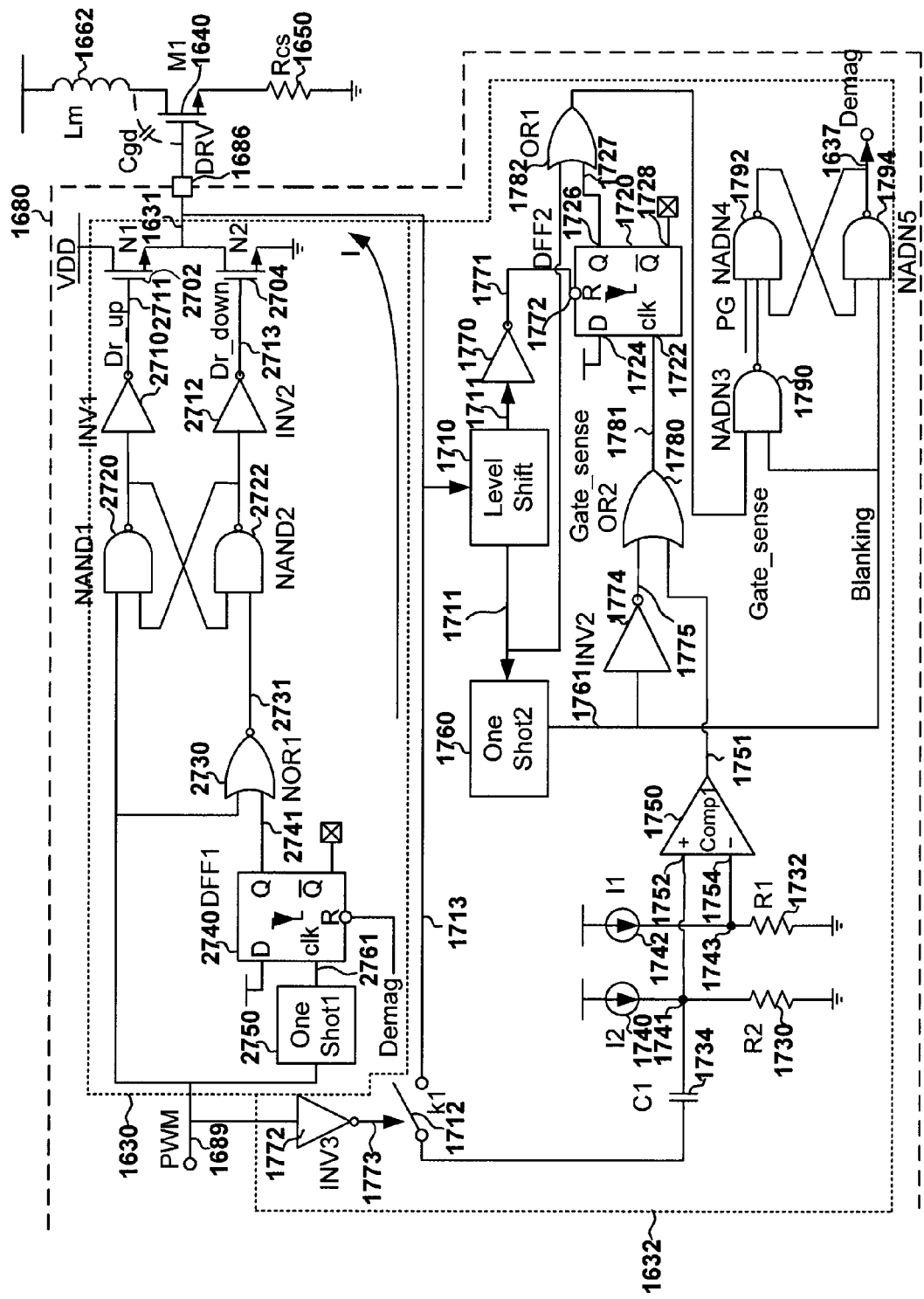
FIG. 17 is a simplified diagram showing certain components of the power converter as shown in FIG. 16 according to one embodiment of the present invention.

FIG. 17 is a simplified diagram showing certain components of the power converter 1600 according to one embodiment of the present invention. This diagram is merely an example, which should not unduly limit the scope of the claims. One of ordinary skill in the art would recognize many variations, alternatives, and modifications. The gate driver 1630 of the power converter 1600 includes transistors 2702 and 2704, NOT gates 2710 and 2712, NAND gates 2720 and 2722, a NOR gate 2730, a flip flop component 2740, and a one-shot signal generator 2750. The demagnetization detector 1632 includes a level shift component 1710, a switch 1712, a flip flop component 1720, resistors 1730 and 1732, a capacitor 1734, current sources 1740 and 1742, a comparator 1750, a one-shot signal generator 1760, NOT gates 1770, 1772 and 1774, OR gates 1780 and 1782, and NAND gates 1790, 1792, and 1794. For example, a signal differential component includes the capacitor 1734 and the resistor 1730. In another example, a signal processing component includes the level shift component 1710, the flip flop component 1720, the one-shot signal generator 1760, the NOT gates 1770 and 1774, the OR gates 1780 and 1782, and the NAND gates 1790, 1792, and 1794.

In one embodiment, the gate driver 1630 receives the signal 1689 and generates the drive signal 1631, and the demagnetization detector 1632 receives the signal 1689 and the drive signal 1631 and generates the demagnetization signal 1637. For example, the transistor 2702 of the gate driver 1630 receives a signal 2711 from the NOT gate 2710, and the transistor 2704 of the gate driver 1630 receives a signal 2713 from the NOT gate 2712. In another example, the source of the transistor 2702 and the drain of the transistor 2704 is connected to the terminal 1686 (e.g., DRV), which is connected to the gate of the field effect transistor 1640. In yet another example, the transistors 2702 and 2704 generate the drive signal 1631 received by the field effect transistor 1640 and the level shift component 1710. In yet another example, the drive signal 1631 is also received by the capacitor 1734 when the switch 1712 is closed.

In another embodiment, the level shift component 1710 receives the drive signal 1631 and generates a signal 1711. For example, the drive signal 1631 is a high-voltage signal, which is converted to a low-voltage signal, and the low-voltage signal is the signal 1711. In another example, the signal 1711 is received by the one-shot signal generator 1760, the NOT gate 1770, and the OR gate 1782.

In yet another embodiment, the one-shot signal generator 1760 receives the signal 1711 and generates a pulse signal 1761 (e.g., with one or more negative pulses). For example, the one or more negative pulses of the pulse signal 1761 are used to screen a high-frequency oscillation signal component. In another example, this high-frequency oscillation signal component is generated by the leakage inductance and the parasitic capacitance of the switch 1640 when the switch 1640 is just opened (e.g., turned off).

In yet another embodiment, the pulse signal 1761 is received by the NOT gate 1774 and the NAND gates 1790 and 1794. For example, the NOT gate 1774 generates a signal 1775 in response to the pulse signal 1761, and outputs the signal 1775 to the OR gate 1780. In another example, the OR gate 1780 receives the signal 1775 and also receives a comparison signal 1751 from the comparator 1750, and generates a signal 1781.

Figure 18:
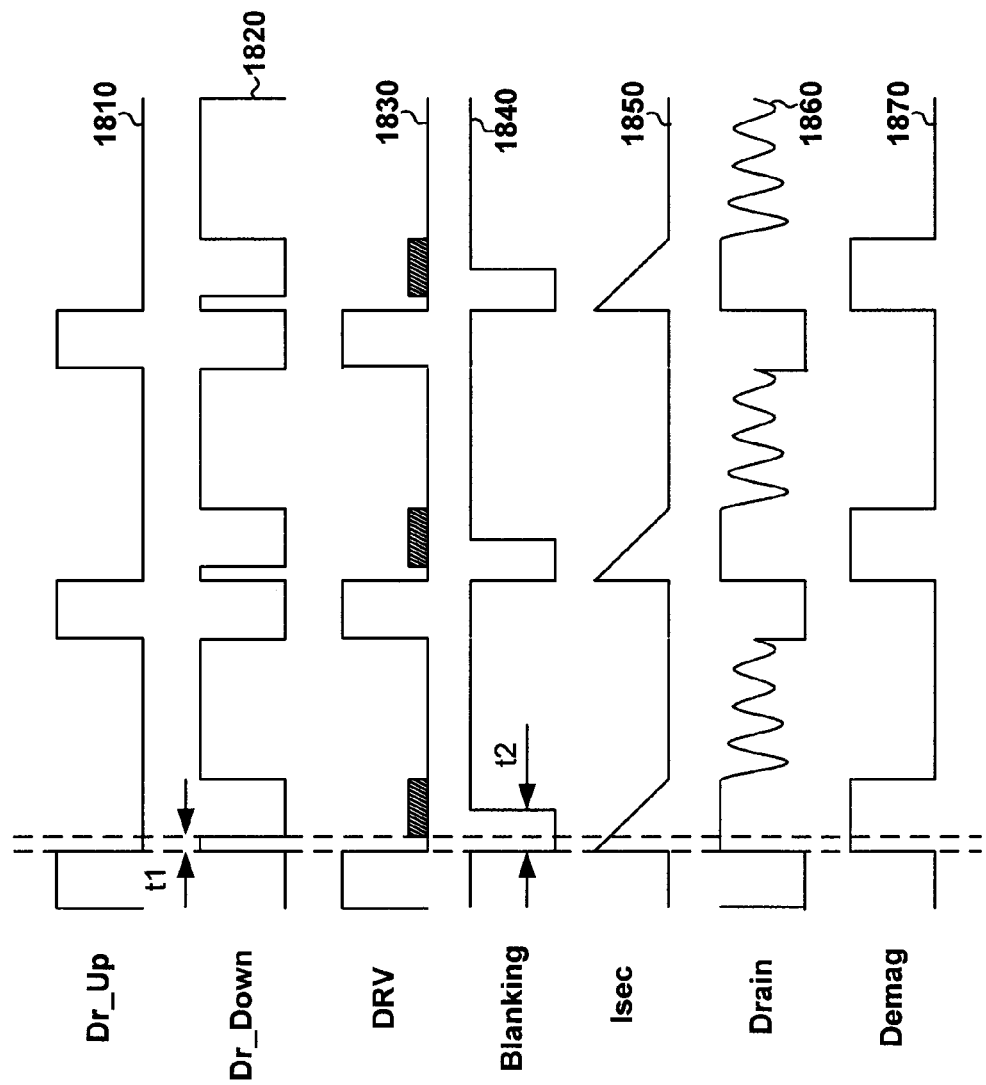
FIG. 18 is a simplified timing diagram in the DCM mode for certain components of the power converter as shown in FIGS. 16 and 17 according to one embodiment of the present invention.

FIG. 18 is a simplified timing diagram in the DCM mode for certain components of the power converter 1600 as shown in FIGS. 16 and 17 according to one embodiment of the present invention. This diagram is merely an example, which should not unduly limit the scope of the claims. One of ordinary skill in the art would recognize many variations, alternatives, and modifications. The waveform 1810 represents the signal 2711 as a function of time, the waveform 1820 represents the signal 2713 as a function of time, the waveform 1830 represents the drive signal 1631 as a function of time, and the waveform 1840 represents the pulse signal 1761 as a function of time. Additionally, the waveform 1850 represents a current that flows through the secondary winding 1664, the waveform 1860 represents the drain voltage of the switch 1640 as a function of time, and the waveform 1870 represents the demagnetization signal 1637 as a function of time.

For example, a switching period includes an on-time period and an off-time period, and the off-time period includes a demagnetization period. In another example, the waveform 1810 is at the logic high level during the on-time period, and at the logic low level during the off-time period. In yet another example, the waveform 1870 is the logic high level during the demagnetization period, and at the logic low level outside the demagnetization period.

Figure 19:
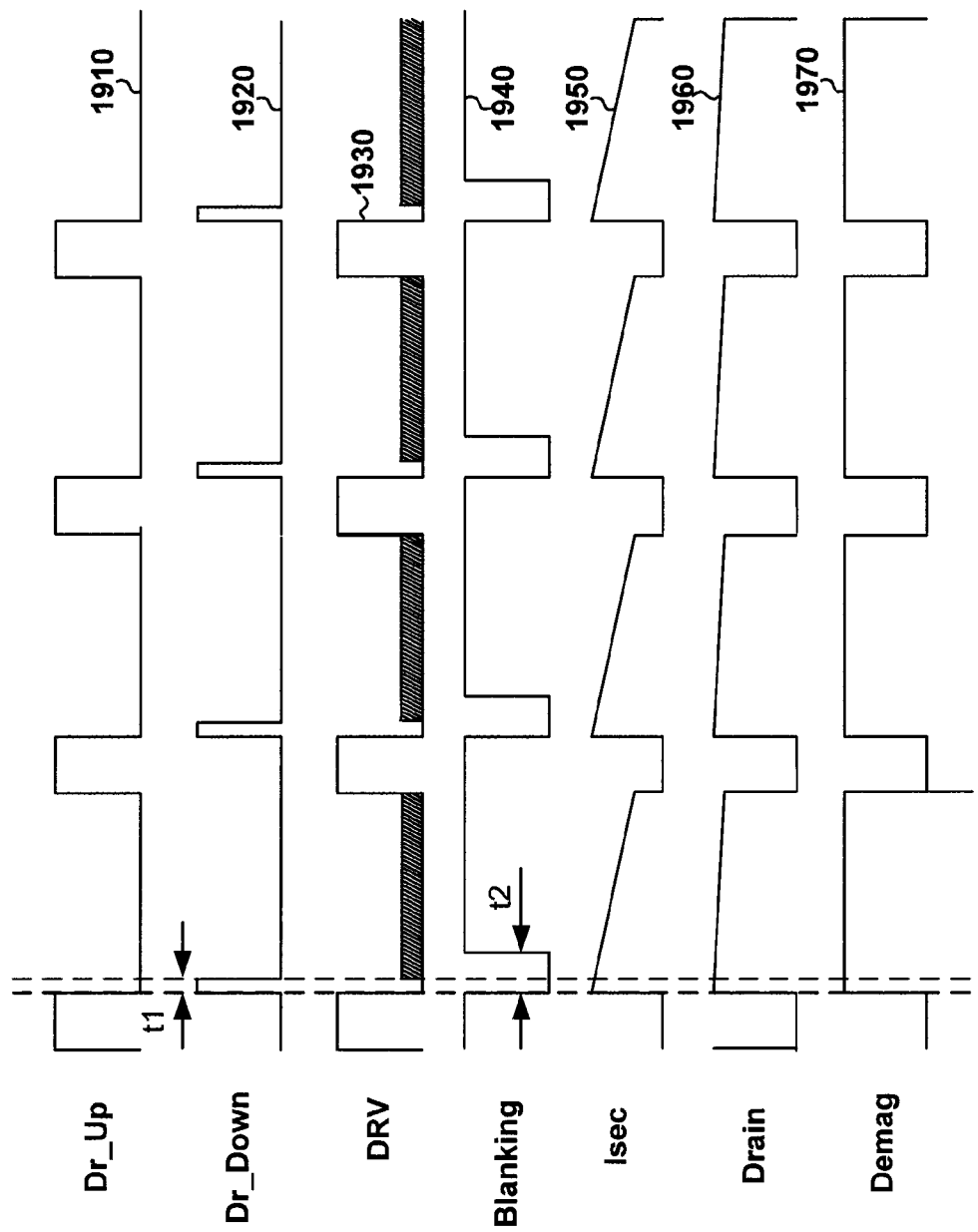
FIG. 19 is a simplified timing diagram in the CCM mode for certain components of the power converter as shown in FIGS. 16 and 17 according to another embodiment of the present invention.

FIG. 19 is a simplified timing diagram in the CCM mode for certain components of the power converter 1600 as shown in FIGS. 16 and 17 according to another embodiment of the present invention. This diagram is merely an example, which should not unduly limit the scope of the claims. One of ordinary skill in the art would recognize many variations, alternatives, and modifications. The waveform 1910 represents the signal 2711 as a function of time, the waveform 1920 represents the signal 2713 as a function of time, the waveform 1930 represents the drive signal 1631 as a function of time, and the waveform 1940 represents the pulse signal 1761 as a function of time. Additionally, the waveform 1950 represents a current that flows through the secondary winding 1664, the waveform 1960 represents the drain voltage of the switch 1640 as a function of time, and the waveform 1970 represents the demagnetization signal 1637 as a function of time.

For example, a switching period includes an on-time period and an off-time period, and the off-time period includes a demagnetization period. In another example, the waveform 1910 is at the logic high level during the on-time period, and at the logic low level during the off-time period. In yet another example, the waveform 1970 is the logic high level during the demagnetization period, and at the logic low level outside the demagnetization period.

Returning to FIG. 17, the one-shot signal generator 1760 receives the signal 1711 and generates the pulse signal 1761. For example, if the signal 1711 changes from a logic high level to a logic low level, the one-shot signal generator 1760 generates a negative pulse in the pulse signal 1761 (e.g., as shown by the waveform 1840 and/or the waveform 1940). In another example, without the negative pulse, the pulse signal 1761 is at the logic high level (e.g., as shown by the waveform 1840 and/or the waveform 1940). In yet another example, the negative pulse of the pulse signal 1761 has a pulse width of $t_2$ as shown by the waveform 1840 and/or the waveform 1940.

In one embodiment, the one-shot signal generator 2750 receives the signal 1689 and generates a pulse signal 2761. For example, if the signal 1689 changes from the logic high level to the logic low level, the one-shot signal generator 2750, in response to the falling edge of the signal 1689, generates a positive pulse in the pulse signal 2761. In another example, without the positive pulse, the pulse signal 2761 is at the logic low level.

In another embodiment, the pulse signal 2761 is received by the flip flop component 2740, which generates a signal 2741. For example, the signal 2741 is received by the NOR gate 2730, and the NOR gate 2730 also receives the signal 1689 and generates a signal 2731. In another example, the signal 2731 is received by the NAND gate 2722, which is also connected to the NAND gate 2720 and the NOT gates 2710 and 2712. In yet another example, in response to the negative pulse of the pulse signal 2761, the NOT gate 2712 generates, at the falling edge of the signal 1689, a positive pulse in the signal 2713 (e.g., as shown by the waveform 1820 and/or the waveform 1920). In yet another example, the positive pulse of the signal 2713 has a pulse width of $t_1$ (e.g., 1 μs) as shown by the waveform 1820 and/or the waveform 1920.

In yet another embodiment, a switching period includes an on-time period and an off-time period, and the off-time period includes a demagnetization period. For example, the signal 1689 is at the logic high level during the on-time period, and at the logic low level during the off-time period. In yet another example, the signal 1773 is at the logic low level during the on-time period, and at the logic high level during the off-time period.

According to one embodiment, if the signal 1689 remains at the logic high level, the transistor 2702 remains being turned on and the transistor 2704 remains being turned off, so that the drive signal 1631 remains at the logic high level and the switch 1640 remains reliably closed (e.g., being reliably turned on). For example, when the switch 1640 is turned on, the power converter 1600 stores energy on the primary side. In another example, when the signal 1689 is at the logic high level, the NOT gate 1772 receives the signal 1689 at the logic high level and generates a signal 1773 at the logic low level. In yet another example, if the signal 1773 is at the logic low level, the switch 1712 is open and the capacitor 1734 is disconnected from the terminal 1686 (e.g., DRV).

According to another embodiment, if the signal 1689 changes from the logic high level to the logic low level, the transistor 2702 is turned off, and the transistor 2704 is turned on during the positive pulse of the signal 2713 (e.g., as shown by the waveform 1820 and/or the waveform 1920). For example, during the positive pulse of the signal 2713, the drive signal 1631 is reliably pulled from the logic high level to the logic low level (e.g., as shown by the waveform 1830 and/or the waveform 1930), so that the switch 1640 is opened (e.g., being turned off).

As shown in FIG. 17, for both the DCM mode and the CCM mode, the beginning of the demagnetization period is determined by detecting the falling edge of the drive signal 1631. For example, under the DCM mode, the end of the demagnetization period is determined by using at least the capacitor 1734, the resistors 1730 and 1732, the current sources 1740 and 1742, the comparator 1750, the OR gate 1780, and the flip flop component 1720 to output a signal 1727 to the OR gate 1782. In another example, under the CCM mode, the end of the demagnetization period is determined by using the signal 1711 that is received by the OR gate 1782.

According to one embodiment, under the DCM mode, the capacitor 1734, the resistors 1730 and 1732, the current sources 1740 and 1742, and the comparator 1750 are used to determine the end of the demagnetization period within each switching period. For example, the comparator 1750 includes a terminal 1752 (e.g., the "+" terminal) and a terminal 1754 (e.g., the "−" terminal). In another example, the terminal 1752 (e.g., the "+" terminal) receives a voltage signal 1741, and the terminal 1754 (e.g., the "−" terminal) receives a voltage signal 1743. In yet another example, the comparator 1750, in response, outputs the comparison signal 1751 to the OR gate 1780, which generates the signal 1781.

According to another embodiment, during the demagnetization period, the voltage signal 1741 is larger than the voltage signal 1743 in magnitude. For example, during the demagnetization period, $$V_A = I_2 \times R_2 \qquad \text{(Equation 47)}$$

$$V_B = I_1 \times R_1 \qquad \text{(Equation 48)}$$

$$V_A - V_B = V_{os} > 0 \qquad \text{(Equation 49)}$$

where $V_A$ represents the voltage signal 1741, and $V_B$ represents the voltage signal 1743. Additionally, $I_2$ represents the current that is provided by the current source 1740, and $I_1$ represents the current that is provided by the current source 1742. Also, $V_{os}$ represents the voltage signal 1741 subtracted by the voltage signal 1743. In another example, during the demagnetization period, $V_{os}$ is larger than zero (e.g., about 150 mV), and the comparison signal 1751 is at the logic high level.

As shown in FIG. 18, after the positive pulse of the signal 2713 (e.g., as shown by the waveform 1820), both the transistors 2702 and 2704 are turned off (e.g., as shown by the waveforms 1810 and 1820 during at least part of the off-time period), so the terminal 1686 is at the high-resistance state. For example, the high-resistance state of the terminal 1686 starts when both the transistors 2702 and 2704 become turned off, and ends at the end of the demagnetization process. In another example, at the end of the demagnetization process, when the terminal 1686 is still at the high-resistance state, the drain voltage of the switch 1640 starts resonance oscillation (e.g., as shown by the waveform 1860), and a small current 1713 flows from the capacitor 1734 through the switch 1712 and the terminal 1686 when the terminal 1686 is still at the high-resistance state, to charge the parasitic capacitor $C_{gd}$ of the switch 1640. In yet another example, the small current 1713 affects the drive signal 1631 only when the terminal 1686 is at the high-resistance state.

In yet another example, the switch 1640 is a MOS transistor, and the parasitic capacitor $C_{gd}$ is the parasitic capacitor between the gate and the drain of the MOS transistor. In yet another example, the current 1713 causes the voltage signal 1741 to drop suddenly, such that the comparator 1752 changes the comparison signal 1751 from the logic high level to the logic low level. In yet another example, the comparison signal 1751 is received by the OR gate 1780, which also generates the signal 1781. In yet another example, the change of the comparison signal 1751 from the logic high level to the logic low level causes the signal 1781 to change from the logic high level to the logic low level.

As shown in FIG. 17, the flip flop component 1720 (e.g., a falling-edge-triggered D flip flop that is reset at the logic low level) includes a terminal 1722 (e.g., the "clk" terminal), a terminal 1724 (e.g., the "D" terminal), a terminal 1726 (e.g., the "Q" terminal), a terminal 1728 (e.g., the "$\overline{Q}$" terminal), and a terminal 1772 (e.g., the "R" terminal). For example, the terminal 1772 receives a signal 1771 from the NOT gate 1770, which also receives the signal 1711. In another example, the terminal 1724 receives a predetermined voltage at the logic high level. In yet another example, the terminal 1722 receives the signal 1781.

In one embodiment, if the terminal 1724 receives the predetermined voltage at the logic high level and if the signal 1781 changes from the logic high level to the logic low level, the flip flop component 1720 (e.g., a falling-edge-triggered D flip flop) outputs the signal 1727 at the logic high level through the terminal 1726. In another embodiment, the signal 1727 at the logic high level is received by the OR gate 1782 and is used by the OR gate 1782 and the NAND gate 1790 to reset an RS flip flop that includes the NAND gates 1792 and 1794 in order to indicate the end of the demagnetization period under the DCM mode. For example, the NAND gate 1794 outputs the demagnetization signal 1637. In another example, the demagnetization signal 1637 is at the logic high level during the demagnetization period, and is at the logic low level outside the demagnetization period (e.g., as shown by the waveform 1870).

In another embodiment, under the CCM mode, the comparison signal 1751 of the comparator 1750 remains at the logic high level during the entire time period when the drive signal 1631 is at the logic low level. For example, when the drive signal 1631 changes from the logic low level to the logic high level, the signal 1711 also changes from the logic low level to the logic high level, and is used by the OR gate 1782 and the NAND gate 1790 to reset an RS flip flop that includes the NAND gates 1792 and 1794 in order to indicate the end of the demagnetization period under the CCM mode. In another example, the NAND gate 1794 outputs the demagnetization signal 1637. In yet another example, the demagnetization signal 1637 is at the logic high level during the demagnetization period, and is at the logic low level outside the demagnetization period (e.g., as shown by the waveform 1970).

As shown in FIG. 17, the NAND gate 1794 also outputs the demagnetization signal 1637 to the flip flop component 2740. In one embodiment, under the DCM mode, at the end of the demagnetization period, the demagnetization signal 1637 changes from the logic high level to the logic low level and resets the flip flop component 2740, so that the transistor 2704 is turned on (e.g., as shown by the waveform 1820) and the switch 1640 is reliably opened (e.g., turned off). For example, without such reset of the flip flop component 2740, the switch 1640 may be closed (e.g., turned on) mistakenly by the resonance signal generated by the primary winding 1662 and the parasitic capacitor $C_{gd}$.

In another embodiment, under the CCM mode, at the end of the demagnetization period that is also the end of the off-time period, the demagnetization signal 1637 changes from the logic high level to the logic low level and the drive signal 1631 changes from the logic low level to the logic high level. For example, during the demagnetization period but outside the positive pulse (e.g., with a pulse width of $t_1$), the signal 2713 remains at the logic low level (e.g., as shown by the waveform 1920), and the terminal 1686 is at the high-resistance state (e.g., as shown by the waveform 1930 when both the waveforms 1910 and 1920 are at the logic low levels so that both the transistors 2702 and 2704 are turned off during at least part of the off-time period).

For example, the high-resistance state of the terminal 1686 starts when both the transistors 2702 and 2704 become turned off, and ends at the end of the demagnetization process that is also the end of the off-time period. In another example, at the end of the demagnetization process, when the terminal 1686 is still at the high-resistance state, the drain voltage of the switch 1640 starts resonance oscillation (e.g., as shown by the waveform 1960), and a small current 1713 flows from the capacitor 1734 through the switch 1712 and the terminal 1686 when the terminal 1686 is still at the high-resistance state, to charge the parasitic capacitor $C_{gd}$ of the switch 1640. In yet another example, the small current 1713 affects the drive signal 1631 only when the terminal 1686 is at the high-resistance state. In yet another example, during the demagnetization period, the drain voltage of the switch 1640 decreases with time (e.g., as shown by the waveform 1960), so that, even though the terminal 1686 is at the high-resistance state (e.g., as shown by the waveform 1930), the switch 1640 is not mistakenly closed (e.g., turned on) during the demagnetization period.

Figure 20:
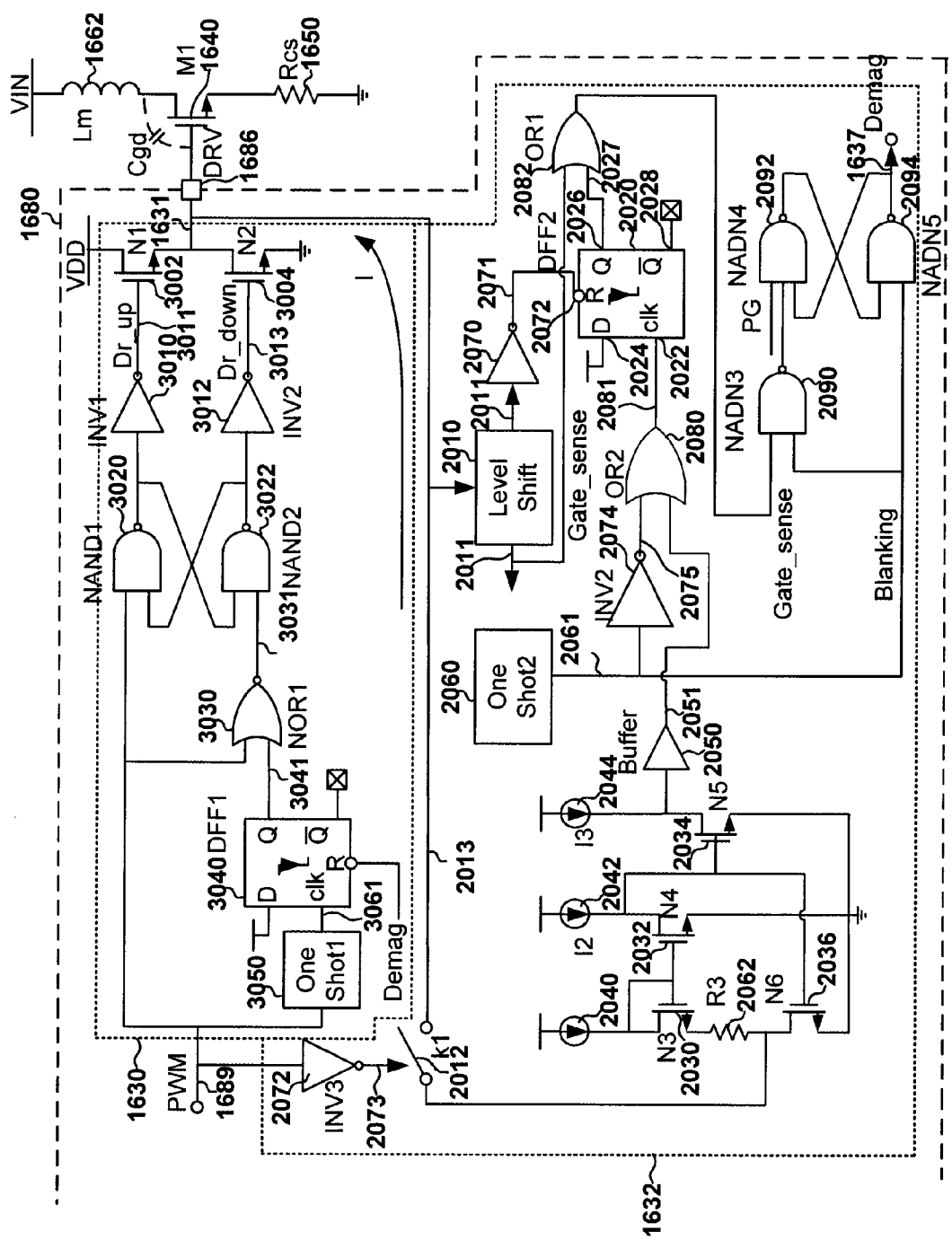
FIG. 20 is a simplified diagram showing certain components of the power converter as shown in FIG. 16 according to another embodiment of the present invention.

FIG. 20 is a simplified diagram showing certain components of the power converter 1600 according to another embodiment of the present invention. This diagram is merely an example, which should not unduly limit the scope of the claims. One of ordinary skill in the art would recognize many variations, alternatives, and modifications. The gate driver 1630 of the power converter 1600 includes transistors 3002 and 3004, NOT gates 3010 and 3012, NAND gates 3020 and 3022, a NOR gate 3030, a flip flop component 3040, and a one-shot signal generator 3050. The demagnetization detector 1632 includes a level shift component 2010, a switch 2012, a flip flop component 2020, transistors 2030, 2032, 2034, and 2036, current sources 2040, 2042, and 2044, a buffer 2050, a one-shot signal generator 2060, a resistor 2062, NOT gates 2070, 2072 and 2074, OR gates 2080 and 2082, and NAND gates 2090, 2092, and 2094. For example, a common gate comparator includes the transistors 2030, 2032, 2034, and 2036, the current sources 2040, 2042, and 2044, and the resistor 2062.

In another example, a signal processing component includes the level shift component 2010, the flip flop component 2020, the buffer 2050, the one-shot signal generator 2060, the NOT gates 2070 and 2074, the OR gates 2080 and 2082, and the NAND gates 2090, 2092, and 2094.

In one embodiment, the gate driver 1630 receives the signal 1689 and generates the drive signal 1631, and the demagnetization detector 1632 receives the signal 1689 and the drive signal 1631 and generates the demagnetization signal 1637. For example, the transistor 3002 of the gate driver 1630 receives a signal 3011 from the NOT gate 3010, and the transistor 3004 of the gate driver 1630 receives a signal 3013 from the NOT gate 3012. In another example, the transistors 3002 and 3004 generate the drive signal 1631. In yet another example, the drive signal 1631 is also received by the resistor 2062 and the transistor 2036 when the switch 2012 is closed.

In another embodiment, the level shift component 2010 receives the drive signal 1631 and generates a signal 2011. For example, the drive signal 1631 is a high-voltage signal, which is converted to a low-voltage signal, and the low-voltage signal is the signal 2011. In another example, the signal 2011 is received by the one-shot signal generator 2060, the NOT gate 2070, and the OR gate 2082.

According to one embodiment, the one-shot signal generator 2060 receives the signal 2011 and generates a pulse signal 2061 (e.g., with one or more negative pulses). For example, the one or more negative pulses of the pulse signal 2061 are used to screen a high-frequency oscillation signal component. In another example, this high-frequency oscillation signal component is generated by the leakage inductance and the parasitic capacitance of the switch 1640 when the switch 1640 is just opened (e.g., turned off).

According to another embodiment, the pulse signal 2061 is received by the NOT gate 2074 and the NAND gates 2090 and 2094. For example, the NOT gate 2074 generates a signal 2075 in response to the pulse signal 2061, and outputs the signal 2075 to the OR gate 2080. In another example, the OR gate 2080 receives the signal 2075 and also receives an output signal 2051 from the buffer 2050, and generates a signal 2081.

As shown in FIG. 20, the one-shot signal generator 2060 receives the signal 2011 and generates the pulse signal 2061. For example, if the signal 2011 changes from a logic high level to a logic low level, the one-shot signal generator 2060 generates a negative pulse in the pulse signal 2061. In another example, without the negative pulse, the pulse signal 2061 is at the logic high level.

In one embodiment, the one-shot signal generator 3050 receives the signal 1689 and generates a pulse signal 3061. For example, if the signal 1689 changes from the logic high level to the logic low level, the one-shot signal generator 3050, in response to the falling edge of the signal 1689, generates a positive pulse in the pulse signal 3061. In another example, without the positive pulse, the pulse signal 3061 is at the logic low level.

In another embodiment, the pulse signal 3061 is received by the flip flop component 3040, which generates a signal 3041. For example, the signal 3041 is received by the NOR gate 3030, and the NOR gate 3030 also receives the signal 1689 and generates a signal 3031. In another example, the signal 3031 is received by the NAND gate 3022, which is also connected to the NAND gate 3020 and the NOT gates 3010 and 3012. In yet another example, in response to the negative pulse of the pulse signal 3061, the NOT gate 3012 generates, at the falling edge of the signal 1689, a positive pulse in the signal 3013.

In yet another embodiment, a switching period includes an on-time period and an off-time period, and the off-time period includes a demagnetization period. For example, the signal 1689 is at the logic high level during the on-time period, and at the logic low level during the off-time period. In yet another example, the signal 2073 is at the logic low level during the on-time period, and at the logic high level during the off-time period.

According to one embodiment, if the signal 1689 remains at the logic high level, the transistor 3002 remains being turned on and the transistor 3004 remains being turned off, so that the drive signal 1631 remains at the logic high level and the switch 1640 remains reliably closed (e.g., being reliably turned on). For example, when the switch 1640 is turned on, the power converter 1600 stores energy on the primary side. In another example, when the signal 1689 is at the logic high level, the NOT gate 2072 receives the signal 1689 at the logic high level and generates a signal 2073 at the logic low level. In yet another example, if the signal 2073 is at the logic low level, the switch 2012 is open and the resistor 2062 and the transistor 2036 are disconnected from the terminal 1686 (e.g., DRV).

According to another embodiment, if the signal 1689 changes from the logic high level to the logic low level, the transistor 3002 is turned off, and the transistor 3004 is turned on during the positive pulse of the signal 3013. For example, during the positive pulse of the signal 3013, the drive signal 1631 is reliably pulled from the logic high level to the logic low level, so that the switch 1640 is opened (e.g., being turned off).

As shown in FIG. 20, for both the DCM mode and the CCM mode, the beginning of the demagnetization period is determined by detecting the falling edge of the drive signal 1631. For example, under the DCM mode, the end of the demagnetization period is determined by using at least the transistors 2030, 2032, 2034, and 2036, the current sources 2040, 2042, and 2044, the resistor 2062, the buffer 2050, the OR gate 2080, and the flip flop component 2020 to output a signal 2027 to the OR gate 2082. In another example, under the CCM mode, the end of the demagnetization period is determined by using the signal 2011 that is received by the OR gate 2082.

According to one embodiment, under the DCM mode, the transistors 2030, 2032, 2034, and 2036, the current sources 2040, 2042, and 2044, the resistor 2062, and the buffer 2050 are used to determine the end of the demagnetization period within each switching period. For example, after a positive pulse of the signal 3013, both the transistors 3002 and 3004 are turned off (e.g., during at least part of the off-time period), so the terminal 1686 is at the high-resistance state. In another example, the high-resistance state of the terminal 1686 starts when both the transistors 3002 and 3004 become turned off, and ends at the end of the demagnetization process. In yet another example, at the end of the demagnetization process, when the terminal 1686 is still at the high-resistance state, the drain voltage of the switch 1640 starts resonance oscillation, and a small current 2013 flows from the transistor 2030 and the resistor 2062 through the switch 2012 and the terminal 1686 when the terminal 1686 is still at the high-resistance state, to charge the parasitic capacitor $C_{gd}$ of the switch 1640. In yet another example, the small current 2013 affects the drive signal 1631 only when the terminal 1686 is at the high-resistance state.

In yet another example, when the drain voltage of the switch 1640 decreases, the drive signal 1631, due to existence of the parasitic capacitor $C_{gd}$ of the switch 1640, becomes a negative voltage and even smaller than $-i \times R$ , where $I_0$ represents a current that flows through the resistor 2062 and R represents resistance of the resistor 2062. In another example, the switch 1640 is a MOS transistor, and the parasitic capacitor $C_{gd}$ is the parasitic capacitor between the gate and the drain of the MOS transistor. In yet another example, if the drive signal 1631 becomes smaller than $-I_0 \times R$, the transistor 2032 is turned off and the transistor 2034 is turned on, so the buffer 2050 changes its output signal 2051 from the logic high level to the logic low level.

According to another embodiment, the output signal 2051 is received by the OR gate 2080, which also generates the signal 2081. In yet another example, the change of the output signal 2051 from the logic high level to the logic low level causes the signal 2081 to change from the logic high level to the logic low level.

As shown in FIG. 20, the flip flop component 2020 (e.g., a falling-edge-triggered D flip flop) includes a terminal 2022 (e.g., the "clk" terminal), a terminal 2024 (e.g., the "D" terminal), a terminal 2026 (e.g., the "Q" terminal), a terminal 2028 (e.g., the "Q̄" terminal), and a terminal 2072 (e.g., the "R" terminal). For example, the terminal 2072 receives a signal 2071 from the NOT gate 2070, which also receives the signal 2011. In another example, the terminal 2024 receives a predetermined voltage at the logic high level. In yet another example, the terminal 2022 receives the signal 2081.

In one embodiment, if the terminal 2024 receives the predetermined voltage at the logic high level and if the signal 2081 changes from the logic high level to the logic low level, the flip flop component 2020 (e.g., a falling-edge-triggered D flip flop) outputs the signal 2027 at the logic high level through the terminal 2026. In another embodiment, the signal 2027 at the logic high level is received by the OR gate 2082 and is used by the OR gate 2082 and the NAND gate 2090 to reset an RS flip flop that includes the NAND gates 2092 and 2094 in order to indicate the end of the demagnetization period under the DCM mode. For example, the NAND gate 2094 outputs the demagnetization signal 1637. In another example, the demagnetization signal 1637 is at the logic high level during the demagnetization period, and is at the logic low level outside the demagnetization period.

In another embodiment, under the CCM mode, the output signal 2051 of the buffer 2050 remains at the logic high level during the entire time period when the drive signal 1631 is at the logic low level. For example, when the drive signal 1631 changes from the logic low level to the logic high level, the signal 2011 also changes from the logic low level to the logic high level, and is used by the OR gate 2082 and the NAND gate 2090 to reset an RS flip flop that includes the NAND gates 2092 and 2094 in order to indicate the end of the demagnetization period under the CCM mode. In another example, the NAND gate 2094 outputs the demagnetization signal 1637. In yet another example, the demagnetization signal 1637 is at the logic high level during the demagnetization period, and is at the logic low level outside the demagnetization period.

As shown in FIG. 20, the NAND gate 2094 also outputs the demagnetization signal 1637 to the flip flop component 3040. In one embodiment, under the DCM mode, at the end of the demagnetization period, the demagnetization signal 1637 changes from the logic high level to the logic low level and resets the flip flop component 3040, so that the transistor 3004 is turned on and the switch 1640 is reliably opened (e.g., turned off). For example, without such reset of the flip flop component 3040, the switch 1640 may be closed (e.g., turned on) mistakenly by the resonance signal generated by the primary winding 1662 and the parasitic capacitor $C_{gd}$.

In another embodiment, under the CCM mode, at the end of the demagnetization period that is also the end of the off-time period, the demagnetization signal 1637 changes from the logic high level to the logic low level and the drive signal 1631 changes from the logic low level to the logic high level. For example, during the demagnetization period but outside the positive pulse, the signal 3013 remains at the logic low level and the terminal 1686 is at the high-resistance state (e.g., when both the transistors 3002 and 3004 are turned off during at least part of the off-time period). In another example, the high-resistance state of the terminal 1686 starts when both the transistors 3002 and 3004 become turned off, and ends at the end of the demagnetization process that is also the end of the off-time period. In yet another example, at the end of the demagnetization process, when the terminal 1686 is still at the high-resistance state, the drain voltage of the switch 1640 starts resonance oscillation, and a small current 2013 flows from the transistor 2030 and the resistor 2062 through the switch 2012 and the terminal 1686 when the terminal 1686 is still at the high-resistance state, to charge the parasitic capacitor $C_{gd}$ of the switch 1640. In yet another example, the small current 2013 affects the drive signal 1631 only when the terminal 1686 is at the high-resistance state. In yet another example, during the demagnetization period, the drain voltage of the switch 1640 decreases with time, and even though the terminal 1686 is at the high-resistance state, the switch 1640 is not mistakenly closed (e.g., not mistakenly turned on) during the demagnetization period.

According to another embodiment, a system controller for protecting a power converter includes a first controller terminal configured to output a drive signal to a switch to affect a first current flowing through a primary winding of a power converter. The power converter further includes a secondary winding coupled to the primary winding, and the drive signal is associated with one or more switching periods. Additionally, the system controller includes a second controller terminal configured to receive a sensing voltage from a sensing resistor. The sensing voltage represents a magnitude of the first current flowing through the primary winding of the power converter. The system controller is configured to process information associated with the sensing voltage and a reference voltage, determine whether an average output current of the power converter is larger than a current threshold, and in response to the average output current being larger than the threshold current, generate the drive signal to cause the switch open and remain open to protect the power converter. The average output current of the power converter is related to a second current flowing through the secondary winding. The current threshold is equal to a first ratio multiplied by a second ratio. The first ratio is equal to a first number of turns of the primary winding divided by a second number of turns of the secondary winding, and the second ratio is equal to the reference voltage divided by a resistance of the sensing resistor. For example, the system controller is implemented according to at least FIG. 10 and/or FIG. 16.

According to yet another embodiment, a system controller for protecting a power converter includes a modulation and drive component configured to generate a drive signal and output the drive signal to a switch to affect a first current flowing through a primary winding of a power converter. The power converter further includes a secondary winding coupled to the primary winding, and the drive signal is associated with one or more switching periods. Additionally, the system controller includes an over-current-protection component configured to receive the drive signal from the modulation and drive component, receive a sensing voltage from a sensing resistor, receive a demagnetization signal, and generate a protection signal based at least in part on the drive signal, the sensing voltage, and the demagnetization signal. The sensing voltage represents a magnitude of the first current flowing through the primary winding of the power converter, and the demagnetization signal is associated with one or more demagnetization periods. The over-current-protection component is further configured to determine whether an average output current of the power converter is larger than a current threshold based at least in part on the drive signal, the sensing voltage, and the demagnetization signal, and in response to the average output current of the power converter being determined to be larger than the current threshold, change the protection signal from a first logic level to a second logic level. The modulation and drive component is further configured to receive the protection signal, and in response to the protection signal being at the second logic level, generate the drive signal to cause the switch open and remain open to protect the power converter. The average output current of the power converter is related to a second current flowing through the secondary winding. For example, the system controller is implemented according to at least FIG. 10 and/or FIG. 16.

According to yet another embodiment, a system controller for a power converter includes a first controller terminal configured to provide a drive signal to a switch to affect a first current flowing through a primary winding of a power converter. The drive signal is associated with one or more switching periods. Additionally, the system controller includes a second controller terminal configured to receive one or more input signals during the one or more switching periods. The system controller is configured to process information associated with the one or more input signals, determine whether a temperature associated with the power converter is larger than a predetermined temperature threshold based at least in part on the one or more input signals, and in response to the temperature associated with the power converter being larger than the predetermined temperature threshold, generate the drive signal to cause the switch open and remain open to protect the power converter. Moreover, the system controller is further configured to process information associated with the one or more input signals, determine whether an output voltage associated with a secondary winding of the power converter is larger than a predetermined voltage threshold based at least in part on the one or more input signals, and in response to the output voltage associated with the secondary winding of the power converter being larger than the predetermined voltage threshold, generate the drive signal to cause the switch to open and remain open to protect the power converter. Also, the system controller is further configured to process information associated with the one or more input signals, and generate a demagnetization signal based at least in part on the one or more input signals. For each of the one or more switching periods, the demagnetization signal represents a demagnetization period related to a demagnetization process, and the demagnetization signal is at a first logic level during the demagnetization period and at a second logic level outside the demagnetization period. For example, the system controller is implemented according to at least FIG. 10, FIG. 11, FIG. 14, and/or FIG. 15.

According to yet another embodiment, a system controller for a power converter includes a modulation component configured to generate a modulation signal. The modulation signal is associated with one or more switching periods. Additionally, the system controller includes a drive component configured to receive the modulation signal and coupled to a first switch through a controller terminal in order to affect a first current flowing through a primary winding of a power converter, and a demagnetization detection component configured to receive the modulation signal from the modulation component, output a second current to the controller terminal, and generate a demagnetization signal based on at least information associated with the modulation signal and the second current. For each of the one or more switching periods, the demagnetization signal represents a demagnetization period related to a demagnetization process, and the demagnetization signal is at a first logic level during the demagnetization period and at a second logic level outside the demagnetization period. For example, the system controller is implemented according to at least FIG. 16, FIG. 17, and/or FIG. 20.

According to yet another embodiment, a method for protecting a power converter includes outputting a drive signal to a switch to affect a first current flowing through a primary winding of a power converter. The power converter further includes a secondary winding coupled to the primary winding, and the drive signal is associated with one or more switching periods. Additionally, the method includes receiving a sensing voltage from a sensing resistor. The sensing voltage represents a magnitude of the first current flowing through the primary winding of the power converter. The outputting a drive signal to a switch includes processing information associated with the sensing voltage and a reference voltage, determining whether an average output current of the power converter is larger than a current threshold, and in response to the average output current being larger than the threshold current, generating the drive signal to cause the switch open and remain open to protect the power converter. The average output current of the power converter is related to a second current flowing through the secondary winding. The current threshold is equal to a first ratio multiplied by a second ratio. The first ratio is equal to a first number of turns of the primary winding divided by a second number of turns of the secondary winding, and the second ratio is equal to the reference voltage divided by a resistance of the sensing resistor. For example, the method is implemented according to at least FIG. 10 and/or FIG. 16.

According to yet another embodiment, a method for protecting a power converter includes generating a drive signal. The drive signal is associated with one or more switching periods. Additionally, the method includes outputting the drive signal to a switch to affect a first current flowing through a primary winding of a power converter. The power converter further includes a secondary winding coupled to the primary winding. Moreover, the method includes receiving the drive signal, a sensing voltage, and a demagnetization signal. The sensing voltage is generated by a sensing resistor and represents a magnitude of the first current flowing through the primary winding of the power converter. The demagnetization signal is associated with one or more demagnetization periods. Also, the method includes generating a protection signal based at least in part on the drive signal, the sensing voltage, and the demagnetization signal. The generating a protection signal including determining whether an average output current of the power converter is larger than a current threshold based at least in part on the drive signal, the sensing voltage, and the demagnetization signal, and in response to the average output current of the power converter being determined to be larger than the current threshold, changing the protection signal from a first logic level to a second logic level. Additionally, the method includes receiving the protection signal, and in response to the protection signal being at the second logic level, generating the drive signal to cause the switch open and remain open to protect the power converter. The average output current of the power converter is related to a second current flowing through the secondary winding. For example, the method is implemented according to at least FIG. 10 and/or FIG. 16.

According to yet another embodiment, a method for a power converter includes providing a drive signal to a switch to affect a first current flowing through a primary winding of a power converter. The drive signal is associated with one or more switching periods. Additionally, the method includes receiving one or more input signals during the one or more switching periods, processing information associated with the one or more input signals, determining whether a temperature associated with the power converter is larger than a predetermined temperature threshold based at least in part on the one or more input signals, and in response to the temperature associated with the power converter being larger than the predetermined temperature threshold, generating the drive signal to cause the switch open and remain open to protect the power converter. Moreover, the method includes determining whether an output voltage associated with a secondary winding of the power converter is larger than a predetermined voltage threshold based at least in part on the one or more input signals, and in response to the output voltage associated with the secondary winding of the power converter being larger than the predetermined voltage threshold, generating the drive signal to cause the switch to open and remain open to protect the power converter. Also, the method includes generating a demagnetization signal based at least in part on the one or more input signals. For each of the one or more switching periods, the demagnetization signal represents a demagnetization period related to a demagnetization process, and the demagnetization signal is at a first logic level during the demagnetization period and at a second logic level outside the demagnetization period. For example, the method is implemented according to at least FIG. 10, FIG. 11, FIG. 14, and/or FIG. 15.

According to yet another embodiment, a method for a power converter includes generating a modulation signal associated with one or more switching periods, receiving the modulation signal in order to affect a first current flowing through a primary winding of a power converter, outputting a second current based at least in part on the modulation signal, and generating a demagnetization signal based on at least information associated with the modulation signal and the second current. For each of the one or more switching periods, the demagnetization signal represents a demagnetization period related to a demagnetization process, and the demagnetization signal is at a first logic level during the demagnetization period and at a second logic level outside the demagnetization period. For example, the method is implemented according to at least FIG. 16, FIG. 17, and/or FIG. 20.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for protecting a power converter, the system controller comprising:
   a first controller terminal configured to output a drive signal to a switch to affect a first current flowing through a primary winding of a power converter, the power converter further including a secondary winding coupled to the primary winding, the drive signal being associated with one or more switching periods; and
   a second controller terminal configured to receive a sensing voltage from a sensing resistor, the sensing voltage representing a magnitude of the first current flowing through the primary winding of the power converter;
   wherein the system controller is configured to:
      process information associated with the sensing voltage and a reference voltage;
      determine whether an average output current of the power converter is larger than a current threshold, the average output current of the power converter being related to a second current flowing through the secondary winding; and
      in response to the average output current being larger than the threshold current, generate the drive signal to cause the switch open and remain open to protect the power converter;
   wherein the current threshold is equal to a first ratio multiplied by a second ratio, the first ratio being equal to a first number of turns of the primary winding divided by a second number of turns of the secondary winding, the second ratio being equal to the reference voltage divided by a resistance of the sensing resistor.

2. The system controller of claim 1 is further configured to, in response to the average output current being larger than the threshold current, generate the drive signal to cause the switch to be opened without any modulation.

3. The system controller of claim 1 is further configured to, in response to the average output current being larger than the threshold current, generate the drive signal to cause the switch to remain open for a period of time larger in duration than one of the one or more switching periods.

4. A system controller for protecting a power converter, the system controller comprising:
   a modulation and drive component configured to generate a drive signal and output the drive signal to a switch to affect a first current flowing through a primary winding of a power converter, the power converter further including a secondary winding coupled to the primary winding, the drive signal being associated with one or more switching periods; and
   an over-current-protection component configured to receive the drive signal from the modulation and drive component, receive a sensing voltage from a sensing resistor, receive a demagnetization signal, and generate a protection signal based at least in part on the drive signal, the sensing voltage, and the demagnetization signal, the sensing voltage representing a magnitude of the first current flowing through the primary winding of the power converter, the demagnetization signal being associated with one or more demagnetization periods; wherein:

the over-current-protection component is further configured to determine whether an average output current of the power converter is larger than a current threshold based at least in part on the drive signal, the sensing voltage, and the demagnetization signal, and in response to the average output current of the power converter being determined to be larger than the current threshold, change the protection signal from a first logic level to a second logic level; and the modulation and drive component is further configured to receive the protection signal, and in response to the protection signal being at the second logic level, generate the drive signal to cause the switch open and remain open to protect the power converter;

wherein the average output current of the power converter is related to a second current flowing through the secondary winding.

5. The system controller of claim 4 wherein the current threshold is equal to a first ratio multiplied by a second ratio, the first ratio being equal to a first number of turns of the primary winding divided by a second number of turns of the secondary winding, the second ratio being equal to a reference voltage divided by a resistance of the sensing resistor.

6. The system controller of claim 4 wherein the modulation and drive component is further configured to, in response to the protection signal being at the second logic level, generate the drive signal to cause the switch to be opened without any modulation.

7. The system controller of claim 4 wherein the modulation and drive component is further configured to, in response to the protection signal being at the second logic level, generate the drive signal to cause the switch to remain open for a period of time larger in duration than one of the one or more switching periods.

8. The system controller of claim 4 wherein the over-current-protection component includes:

a sample-and-hold component configured to receive the drive signal and the sensing signal and generate a first signal based at least in part on the drive signal and the sensing signal;

an integration component configured to receive the first signal and the demagnetization signal and generate a second signal based at least in part on the first signal, the demagnetization signal, and a reference voltage;

a comparator configured to receive the second signal and a threshold signal and generate a comparison signal based at least in part on the second signal and the threshold signal; and a timer component configured to receive the comparison signal and generate the protection signal based at least in part on the comparison signal.

9. A system controller for a power converter, the system controller comprising:

a first controller terminal configured to provide a drive signal to a switch to affect a first current flowing through a primary winding of a power converter, the drive signal being associated with one or more switching periods; and a second controller terminal configured to receive one or more input signals during the one or more switching periods;

wherein the system controller is configured to:

process information associated with the one or more input signals;

determine whether a temperature associated with the power converter is larger than a predetermined temperature threshold based at least in part on the one or more input signals; and in response to the temperature associated with the power converter being larger than the predetermined temperature threshold, generate the drive signal to cause the switch open and remain open to protect the power converter;

wherein the system controller is further configured to:

process information associated with the one or more input signals;

determine whether an output voltage associated with a secondary winding of the power converter is larger than a predetermined voltage threshold based at least in part on the one or more input signals; and in response to the output voltage associated with the secondary winding of the power converter being larger than the predetermined voltage threshold, generate the drive signal to cause the switch to open and remain open to protect the power converter;

wherein the system controller is further configured to:

process information associated with the one or more input signals; and generate a demagnetization signal based at least in part on the one or more input signals;

wherein, for each of the one or more switching periods, the demagnetization signal represents a demagnetization period related to a demagnetization process; and the demagnetization signal is at a first logic level during the demagnetization period and at a second logic level outside the demagnetization period.

10. The system controller of claim 9 is further configured to:

process information associated with the one or more input signals and the drive signal; and generate the demagnetization signal based at least in part on the one or more input signals and the drive signal.

11. The system controller of claim 9 wherein:

the first logic level is a logic high level; and the second logic level is a logic low level.

12. The system controller of claim 9 is further configured to, in response to the temperature associated with the power converter being larger than the predetermined temperature threshold, generate the drive signal to cause the switch to be opened without any modulation.

13. The system controller of claim 9 is further configured to, in response to the temperature associated with the power converter being larger than the predetermined temperature threshold, generate the drive signal to cause the switch to remain open for a first period of time larger in duration than one of the one or more switching periods.

14. The system controller of claim 9 is further configured to, in response to the output voltage associated with the secondary winding of the power converter being larger than the predetermined voltage threshold, generate the drive signal to cause the switch to be opened without any modulation.

15. The system controller of claim 9 is further configured to, in response to the output voltage associated with the secondary winding of the power converter being larger than the predetermined voltage threshold, generate the drive signal to cause the switch to remain open for a first period of time larger in duration than one of the one or more switching periods.

16. The system controller of claim 9, and further comprising a demagnetization detection component configured to:
process information associated with the one or more input signals; and
generate the demagnetization signal based at least in part on the one or more input signals.

17. The system controller of claim 16 wherein the demagnetization detection component includes:
a signal differential component configured to receive the one or more input signals and generate a first output signal;
a comparator component configured to receive the first output signal and a reference signal and generate a comparison signal based at least in part on the first output signal and the reference signal; and
a signal processing component configured to receive the comparison signal and generate the demagnetization signal based at least in part on the comparison signal.

18. The system controller of claim 17 wherein the signal processing component is further configured to receive the drive signal and generate the demagnetization signal based at least in part on the comparison signal and the drive signal.

19. The system controller of claim 16 wherein the demagnetization detection component includes:
a comparator configured to receive a first processed signal and a second processed signal and generate a first output signal based at least in part on the first processed signal and the second processed signal, both the first processed signal and the second processed signal being related to the one or more input signals; and
a signal processing component configured to receive the comparison signal and generate the demagnetization signal based at least in part on the comparison signal.

20. The system controller of claim 19 wherein the signal processing component is further configured to receive the drive signal and generate the demagnetization signal based at least in part on the comparison signal and the drive signal.

21. A system controller for a power converter, the system controller comprising:
a modulation component configured to generate a modulation signal, the modulation signal being associated with one or more switching periods;
a drive component configured to receive the modulation signal and coupled to a first switch through a controller terminal in order to affect a first current flowing through a primary winding of a power converter; and
a demagnetization detection component configured to receive the modulation signal from the modulation component, output a second current to the controller terminal, and generate a demagnetization signal based on at least information associated with the modulation signal and the second current;
wherein, for each of the one or more switching periods,
the demagnetization signal represents a demagnetization period related to a demagnetization process; and
the demagnetization signal is at a first logic level during the demagnetization period and at a second logic level outside the demagnetization period.

22. The system controller of claim 21 wherein the each of the one or more switching periods includes an on-time period and an off-time period, the off-time period including the demagnetization period.

23. The system controller of claim 22 wherein the drive component is further configured to make the controller terminal into a high-resistance state during at least a part of the off-time period.

24. The system controller of claim 23 wherein:
the demagnetization detection component is further configured to output the second current to the controller terminal in response to an end of the demagnetization period; and
the second current flows from the demagnetization detection component to the controller terminal to affect a drive signal received by the first switch if the controller terminal is in the high-resistance state.

25. The system controller of claim 22 wherein:
the drive component includes a first transistor and a second transistor, the first transistor including a first transistor terminal, the second transistor including a second transistor terminal, the first transistor terminal and the second transistor terminal being connected to the controller terminal; and
the drive component is further configured to turn off both the first transistor and the second transistor during at least a part of the off-time period.

26. The system controller of claim 25 wherein:
the demagnetization detection component is further configured to output the second current to the controller terminal in response to an end of the demagnetization period; and
the second current flows from the demagnetization detection component to the controller terminal to affect a drive signal received by the first switch if the controller terminal is in the high-resistance state.

27. The system controller of claim 26 wherein the first switch is a third transistor including a gate terminal connected to the controller terminal.

28. The system controller of claim 21 wherein:
the first logic level is a logic high level; and
the second logic level is a logic low level.

29. The system controller of claim 21 wherein the demagnetization detection component includes:
a NOT gate configured to receive the modulation signal and generate a first input signal;
a second switch configured to received the first input signal and coupled to the controller terminal;
a signal differential component coupled to the second switch and configured to generate a second input signal;
a comparator component configured to receive the second input signal and a reference signal and generate a comparison signal based at least in part on the second input signal and the reference signal; and
a signal processing component configured to receive the comparison signal and generate the demagnetization signal based at least in part on the comparison signal.

30. The system controller of claim 29 wherein:
the drive component is configured to receive the modulation signal from the modulation component and the demagnetization signal from the signal processing component, generate a drive signal based at least in part on the modulation signal and the demagnetization signal, and output the drive signal to the first switch through the controller terminal in order to affect the first current flowing through the primary winding of the power converter; and the signal differential component is configured to receive the drive signal through the second switch if the second switch is closed.

31. The system controller of claim 29 wherein:

the each of the one or more switching periods includes an on-time period and an off-time period, the off-time period including the demagnetization period; and the second switch is further configured to be closed during the off-time period in response to the first input signal to allow the second current to flow from the demagnetization detection component to the controller terminal in response to an end of the demagnetization period.

32. The system controller of claim 21 wherein the demagnetization detection component includes:

a NOT gate configured to receive the modulation signal and generate a first input signal;

a second switch configured to received the first input signal and coupled to the controller terminal;

a common gate comparator coupled to the second switch and configured to generate a second input signal; and a signal processing component configured to receive the second input signal and generate the demagnetization signal based at least in part on the second input signal.

33. The system controller of claim 32 wherein:

the drive component configured to receive the modulation signal from the modulation component and the demagnetization signal from the signal processing component, generate a drive signal based at least in part on the modulation signal and the demagnetization signal, and output the drive signal to the first switch through the controller terminal in order to affect the first current flowing through the primary winding of the power converter; and the common gate comparator is configured to receive the drive signal through the second switch if the second switch is closed.

34. The system controller of claim 32 wherein:

the each of the one or more switching periods includes an on-time period and an off-time period, the off-time period including the demagnetization period; and the second switch is further configured to be closed during the off-time period in response to the first input signal to allow the second current to flow from the demagnetization detection component to the controller terminal in response to an end of the demagnetization period.

35. A method for protecting a power converter, the method comprising:

outputting a drive signal to a switch to affect a first current flowing through a primary winding of a power converter, the power converter further including a secondary winding coupled to the primary winding, the drive signal being associated with one or more switching periods; and receiving a sensing voltage from a sensing resistor, the sensing voltage representing a magnitude of the first current flowing through the primary winding of the power converter;

wherein the outputting a drive signal to a switch includes:

processing information associated with the sensing voltage and a reference voltage;

determining whether an average output current of the power converter is larger than a current threshold, the average output current of the power converter being related to a second current flowing through the secondary winding; and in response to the average output current being larger than the threshold current, generating the drive signal to cause the switch open and remain open to protect the power converter;

wherein the current threshold is equal to a first ratio multiplied by a second ratio, the first ratio being equal to a first number of turns of the primary winding divided by a second number of turns of the secondary winding, the second ratio being equal to the reference voltage divided by a resistance of the sensing resistor.

36. A method for protecting a power converter, the method comprising:

generating a drive signal, the drive signal being associated with one or more switching periods;

outputting the drive signal to a switch to affect a first current flowing through a primary winding of a power converter, the power converter further including a secondary winding coupled to the primary winding;

receiving the drive signal, a sensing voltage, and a demagnetization signal, the sensing voltage being generated by a sensing resistor and representing a magnitude of the first current flowing through the primary winding of the power converter, the demagnetization signal being associated with one or more demagnetization periods;

generating a protection signal based at least in part on the drive signal, the sensing voltage, and the demagnetization signal, wherein the generating a protection signal including: determining whether an average output current of the power converter is larger than a current threshold based at least in part on the drive signal, the sensing voltage, and the demagnetization signal, and in response to the average output current of the power converter being determined to be larger than the current threshold, changing the protection signal from a first logic level to a second logic level;

receiving the protection signal; and in response to the protection signal being at the second logic level, generating the drive signal to cause the switch open and remain open to protect the power converter;

wherein the average output current of the power converter is related to a second current flowing through the secondary winding.

37. A method for a power converter, the method comprising:

providing a drive signal to a switch to affect a first current flowing through a primary winding of a power converter, the drive signal being associated with one or more switching periods;

receiving one or more input signals during the one or more switching periods;

processing information associated with the one or more input signals;

determining whether a temperature associated with the power converter is larger than a predetermined temperature threshold based at least in part on the one or more input signals;

in response to the temperature associated with the power converter being larger than the predetermined temperature threshold, generating the drive signal to cause the switch open and remain open to protect the power converter;

determining whether an output voltage associated with a secondary winding of the power converter is larger than a predetermined voltage threshold based at least in part on the one or more input signals;

in response to the output voltage associated with the secondary winding of the power converter being larger than the predetermined voltage threshold, generating the drive signal to cause the switch to open and remain open to protect the power converter; and generating a demagnetization signal based at least in part on the one or more input signals;

wherein, for each of the one or more switching periods,
the demagnetization signal represents a demagnetization period related to a demagnetization process; and
the demagnetization signal is at a first logic level during the demagnetization period and at a second logic level outside the demagnetization period.

38. A method for a power converter, the method comprising:

generating a modulation signal associated with one or more switching periods;

receiving the modulation signal in order to affect a first current flowing through a primary winding of a power converter;

outputting a second current based at least in part on the modulation signal; and generating a demagnetization signal based on at least information associated with the modulation signal and the second current;

wherein, for each of the one or more switching periods,
the demagnetization signal represents a demagnetization period related to a demagnetization process; and
the demagnetization signal is at a first logic level during the demagnetization period and at a second logic level outside the demagnetization period.

* * * * *